(12) United States Patent (10) Patent No.: US 8,355,958 B2
Fushimi et al. (45) Date of Patent: Jan. 15, 2013

(54) INFORMATION PROVIDING SYSTEM FOR PROVIDING STORE INFORMATION REGARDING SPECIFIED STORES TO A TERMINAL DEVICE

(75) Inventors: Kazuo Fushimi, Tokyo (JP); Tomohisa Hamano, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 13/312,209

(22) Filed: Dec. 6, 2011

(65) Prior Publication Data

US 2012/0143687 A1 Jun. 7, 2012

Related U.S. Application Data

(62) Division of application No. 12/747,613, filed as application No. PCT/JP2007/074474 on Dec. 13, 2007, now Pat. No. 8,082,189.

(51) Int. Cl.
*G06Q 30/00* (2006.01)

(52) U.S. Cl. ...................................... 705/26.9

(58) Field of Classification Search .................. 705/26.9
See application file for complete search history.

(56) References Cited

U.S. PATENT DOCUMENTS

| | | | |
|---|---|---|---|
| 6,026,375 A | 2/2000 | Hall | |
| 6,317,718 B1 | 11/2001 | Fano | |
| 6,526,335 B1 | 2/2003 | Treyz et al. | |
| 7,233,861 B2 | 6/2007 | Van Buer | |
| 7,565,157 B1 | 7/2009 | Ortega et al. | |
| 2001/0029183 A1 | 10/2001 | Ito | |
| 2002/0143490 A1 | 10/2002 | Maeda et al. | |
| 2005/0125148 A1 | 6/2005 | Van Buer et al. | |
| 2008/0147484 A1 | 6/2008 | Davis | |
| 2008/0249969 A1 | 10/2008 | Tsui et al. | |
| 2009/0106085 A1 | 4/2009 | Raimbeault | |
| 2010/0023382 A1 | 1/2010 | Fushimi et al. | |
| 2011/0320518 A1* | 12/2011 | Tsui et al. | ............... 709/202 |

FOREIGN PATENT DOCUMENTS

| | | |
|---|---|---|
| EP | 1 143 367 A2 | 10/2001 |
| EP | 1 193 663 A2 | 4/2002 |
| JP | 9-153027 A | 6/1997 |
| JP | 2000-3394 A | 1/2000 |
| JP | 2000-155757 A | 6/2000 |
| JP | 2001-229285 A | 8/2001 |

(Continued)

OTHER PUBLICATIONS

Supplementary European Search Report dated Jan. 18, 2012 for EP Application No. 07872112.3-2201.

(Continued)

*Primary Examiner* — Thomas Dixon
(74) *Attorney, Agent, or Firm* — Ladas & Parry LLP

(57) ABSTRACT

The information providing system accurately predicts a behavior pattern of a user, selects and provides the optimal information at individual points in time. Provision information files for a number of stores are stored. When a user from a cellular phone transmits a retrieval condition including the position information and a keyword, a file is retrieved whose degree of accordance to the retrieval condition is a certain reference level. Tables show statistical degrees of interest of users in association with respective geographical areas, respective time periods, and respective store genres. The degree of accordance of the retrieved file is corrected based on the corresponding degrees of interest in the tables, and a list is presented, in which stores are sorted in the large order of the corrected degree of accordance, to the phone. The store information selected by the user from the list is distributed to the phone.

28 Claims, 25 Drawing Sheets

FOREIGN PATENT DOCUMENTS

| | | |
|---|---|---|
| JP | 2001-290727 A | 10/2001 |
| JP | 2002-108918 A | 4/2002 |
| JP | 2002-319089 A | 10/2002 |
| JP | 2003-50135 A | 2/2003 |
| JP | 2003-196284 A | 7/2003 |
| JP | 2003-248681 A | 9/2003 |
| JP | 2003-296358 A | 10/2003 |
| JP | 2004-295624 A | 10/2004 |
| JP | 2004-326211 A | 11/2004 |
| JP | 2007-193352 A | 8/2007 |

OTHER PUBLICATIONS

International Preliminary Report on Patentability and Written Opinion issued in connection with counterpart International Application No. PCT/JP2007/074474.

espacenet English abstract of JP 2004-295624 A.
espacenet English abstract of JP 2000-3394 A.
espacenet English abstract of JP 2001-229285 A.
espacenet English abstract of JP 2003-248681 A.
espacenet English abstract of JP 2000-155757 A.
espacenet English abstract of JP 9-153027 A.
espacenet English abstract of JP 2003-50135 A.
espacenet English abstract of JP 2001-290727 A.
espacenet English abstract of JP 2003-296358 A.
espacenet English abstract of JP 2004-326211 A.
espacenet English abstract of JP 2002-108918 A.
espacenet English abstract of JP 2007-193352 A.

* cited by examiner

FIG. 4

```
RETRIEVAL CONDITION

"ETHNIC"  +  "(N35. 6221, E139. 7310)"
```

FIG. 5

| RETRIEVAL RESULT | | | |
|---|---|---|---|
| RANKING | DEGREE OF ACCORDANCE | INFORMATION ID CODE | STORE GENRE CODE |
| 1 | 85 | DDD111111 | EAT/INDIAN FOOD |
| 2 | 79 | DDD222222 | BUY/PERSONAL ACCESSORIES |
| 3 | 64 | DDD333333 | PLAY/THEME PARK |
| 4 | 61 | DDD444444 | BUY/FURNITURE |
| 5 | 58 | DDD555555 | SEE/ART |
| 6 | 56 | DDD666666 | EAT/INDIAN FOOD |

FIG. 6

RETRIEVAL RESULTS

1. INDIAN RESTAURANT: XXX IN TOKYO
2. ASIAN SHOP
3. ETHNIC LAND ZZZ
4. TROPICAL FURNITURE
5. BUDDHIST ART GANDHARA
6. CURRY SHOP: YYY

INDIAN RESTAURANT: XXX IN TOKYO

PROVIDES REGULAR INDIAN CURRY.
LUNCH TIME SERVICE IS AVAILABLE
FROM 11:00 THROUGH 14:00 ON WEEKDAYS.
THE INTERIOR IS DECORATED WITH
BUDDHIST ART,

FIG. 10

| DESCRIPTIVE EXAMPLE OF INTEREST DEGREE TABLE ||
|---|---|
| UNIT SECTION 1A SUNDAY 14 | EAT : 20% |
| | BUY : 60% |
| | SEE : 15% |
| | PLAY : 5% |

FIG. 11

| DESCRIPTIVE EXAMPLE OF INTEREST DEGREE TABLE |||
|---|---|---|
| UNIT SECTION 1A  SUNDAY 14 | EAT | FRENCH FOOD : 2% |
| | | ITALIAN FOOD : 3% |
| | | CHINESE FOOD : 1% |
| | | JAPANESE FOOD : 2% |
| | | INDIAN FOOD : 1% |
| | | ⋮ |
| | BUY | WEAR : 35% |
| | | PERSONAL ACCESSORIES : 13% |
| | | FURNITURE : 1% |
| | | ⋮ |

| INFORMATION ID CODE | DEGREE OF ACCORDANCE | DEGREE OF INTEREST | CORRECTED DEGREE OF ACCORDANCE |
|---|---|---|---|
| DDD111111 | 85 | 20% | 17.0 |
| DDD222222 | 79 | 60% | 47.4 |
| DDD333333 | 64 | 5% | 3.2 |
| DDD444444 | 61 | 60% | 36.6 |
| DDD555555 | 58 | 15% | 8.7 |
| DDD666666 | 56 | 20% | 11.2 |
| | | | |

FIG. 14

| CORRECTED RETRIEVAL RESULT | | | |
|---|---|---|---|
| RANKING | CORRECTED DEGREE OF ACCORDANCE | INFORMATION ID CODE | STORE GENRE CODE |
| 1 | 47.4 | DDD222222 | BUY/PERSONAL ACCESSORIES |
| 2 | 36.6 | DDD444444 | BUY/FURNITURE |
| 3 | 17.0 | DDD111111 | EAT/INDIAN FOOD |
| 4 | 11.2 | DDD666666 | EAT/INDIAN FOOD |
| 5 | 8.7 | DDD555555 | SEE/ART |
| 6 | 3.2 | DDD333333 | PLAY/THEME PARK |

FIG. 15

RETRIEVAL RESULT

1. ASIAN SHOP
2. TROPICAL FURNITURE
3. INDIAN RESTAURANT: XXX IN TOKYO
4. CURRY SHOP: YYY
5. BUDDHIST ART GANDHARA
6. ETHNIC LAND ZZZ

FIG. 21

| PASSING POINT | TIME | NEIGHBORING STORE | DISTANCE |
|---|---|---|---|
| P1 | 14:01 | S1 | 40m |
| | | S2 | 28m |
| | | S4 | 56m |
| P2 | 14:02 | S1 | 33m |
| | | S2 | 35m |
| | | S4 | 35m |
| P3 | 14:03 | S3 | 22m |
| | | S4 | 20m |
| | | S5 | 45m |
| P4 | 14:04 | S3 | 25m |
| | | S4 | 15m |
| | | S5 | 41m |
| P5 | 14:05 | S3 | 25m |
| | | S4 | 22m |
| | | S5 | 37m |
| P6 | 14:06 | S4 | 39m |
| | | S5 | 35m |
| | | S6 | 29m |
| P7 | 14:07 | S4 | 44m |
| | | S5 | 26m |
| | | S6 | 22m |
| P8 | 14:08 | S5 | 55m |
| | | S6 | 43m |
| | | S7 | 27m |

FIG. 22

| COMMON NEIGHBORING STORE | PASSING POINT | TIME | DISTANCE | STAYING COEFFICIENT |
|---|---|---|---|---|
| S1 | P1 | 14:01 | 40m | $\dfrac{60}{40+33}$ |
| | P2 | 14:02 | 33m | |
| S2 | P1 | 14:01 | 28m | $\dfrac{60}{28+35}$ |
| | P2 | 14:02 | 35m | |
| S3 | P3 | 14:03 | 22m | $\dfrac{120}{22+25+25}$ |
| | P4 | 14:04 | 25m | |
| | P5 | 14:05 | 25m | |
| S4 | P1 | 14:01 | 56m | $\dfrac{360}{\begin{pmatrix}56+35\\+20+15\\+22+39\\+44\end{pmatrix}}$ |
| | P2 | 14:02 | 35m | |
| | P3 | 14:03 | 20m | |
| | P4 | 14:04 | 15m | |
| | P5 | 14:05 | 22m | |
| | P6 | 14:06 | 39m | |
| | P7 | 14:07 | 44m | |
| S5 | P3 | 14:03 | 41m | $\dfrac{300}{\begin{pmatrix}41+45\\+37+35\\+26+55\end{pmatrix}}$ |
| | P4 | 14:04 | 45m | |
| | P5 | 14:05 | 37m | |
| | P6 | 14:06 | 35m | |
| | P7 | 14:07 | 26m | |
| | P8 | 14:08 | 55m | |
| S6 | P6 | 14:06 | 29m | $\dfrac{120}{29+22+43}$ |
| | P7 | 14:07 | 22m | |
| | P8 | 14:08 | 43m | |
| S7 | P8 | 14:08 | 27m | 0/27 |

| COMMON NEIGHBORING STORE | PASSING POINT | TIME | DISTANCE | STAYING COEFFICIENT |
|---|---|---|---|---|
| Sj | P(i−2) | t(i−2) | L(i−2) | $\dfrac{t(i+n+3)-t(i-2)}{\left(\begin{array}{c}L(i-2)\\+L(i-1)\\+L(i)\\+\vdots\\+L(i+n+3)\end{array}\right)}$ |
| | P(i−1) | t(i−1) | L(i−1) | |
| | P(i) | t(i) | L(i) | |
| | ⋮ | ⋮ | ⋮ | |
| | P(i+n) | t(i+n) | L(i+n) | |
| | P(i+n+1) | t(i+n+1) | L(i+n+1) | |
| | P(i+n+2) | t(i+n+2) | L(i+n+2) | |
| | P(i+n+3) | t(i+n+3) | L(i+n+3) | |

T4(DDD111111)

| USER EVALUATION VALUE TABLE ||
|---|---|
| USER ID | INDIVIDUAL EVALUATION VALUE E |
| U000X | 3 |
| U000Y | 5 |
| U000Z | 2 |

$$R(x, y) = \frac{Sxy}{\sqrt{Sxx} \cdot \sqrt{Syy}}$$

$$\begin{cases} Sxx = \sum_{i=1}^{n} (Exi - Exa)^2 \\ Syy = \sum_{i=1}^{n} (Eyi - Eya)^2 \\ Sxy = \sum_{i=1}^{n} (Exi - Exa)(Eyi - Eya) \end{cases}$$

$$\gamma = \frac{\sum_{k=1}^{K} (Ek \times Rk)}{\sum_{k=1}^{K} Rk}$$

| INDIVIDUAL INTEREST DEGREE TABLE | | |
|---|---|---|
| EAT | : | 50% |
| BUY | : | 10% |
| SEE | : | 40% |
| PLAY | : | 0% |

INFORMATION PROVIDING SYSTEM FOR PROVIDING STORE INFORMATION REGARDING SPECIFIED STORES TO A TERMINAL DEVICE

RELATED APPLICATION

This application is a divisional of application Ser. No. 12/747,613 filed on Jun. 11, 2010 now U.S. Pat. No. 8,082,189, which is a 371 of International Application No. PCT/JP2007/074474 filed on Dec. 13, 2007, and claims the benefit thereof, the entire contents of which are incorporated herein by reference.

TECHNICAL FIELD

The present invention relates to an information providing system, and in particular, to a system for providing store information of specified stores to a mobile terminal device having a function of recognizing the position of itself.

BACKGROUND ART

In recent years, the means for providing information has undergone a change from old information providing methods utilizing television and radio broadcasting systems to novel information providing methods utilizing web pages on the Internet. In particular, based on the popularization of portable terminal devices such as a cellar phone, a user is able to access necessary information from an arbitrary location, and therefore, convenience has been greatly increased. Also, from a business side that provides commodities and services, store advertisements and guide information can be widely provided to users via web pages. When a user is in transit, the user is able to obtain a variety of information regarding stores, which the user plans to utilize, by browsing such web pages using a mobile terminal device.

Thus, when accessing information via the Internet, it is important to extract information matched with one's own requests from the great abundance of information. Therefore, the user carries out retrieval using a desired keyword, and accesses a web page on which necessary information is presented. For example, where the user goes out to have a meal or goes out shopping, the user is able to browse web pages of Italian food restaurants or women's clothing shops by using retrieval keywords such as [Italian food] and [women's clothing].

In addition, in order to efficiently provide appropriate information to individual users, various types of technologies are proposed. For example, Japanese Unexamined Patent Publication No. 2003-296358A discloses an information distribution system, in which information showing the tastes of individual users is collected in advance, for providing information that matches with the tastes of individuals, and Japanese Unexamined Patent Publication No. 2004-326211A discloses a manner in which the degrees of taste of respective users are stored as a profile based on situation information including an accompanying person. Further, Japanese Unexamined Patent Publication No. 2002-108918A discloses a taste learning apparatus for learning the tastes of a specified user based on the behavior history of the user, and Japanese Unexamined Patent Publication No. 2007-193352A discloses a method for distributing advertisement information having further higher utilization value by using terminal position information obtained by the mobile terminal device.

As has been disclosed in the respective Patent Documents described above, several proposals have already been provided, which grasp the tastes of individual users and the present positions thereof and provide appropriate information to the individual users. However, since, in either technology described above, it is difficult to accurately predict which type of behavior individual users plan to perform at individual points in time, it is difficult to provide information on which the behavior pattern of a user is reflected.

Accordingly, the present invention has an object to provide an information providing system that is able to predict the behavior patterns of individual users as accurately as possible and to select and provide the information most suitable for the users.

DISCLOSURE OF THE INVENTION (1) The first feature of the present invention resides in an information providing system for providing store information regarding specified stores to a mobile terminal device having a function of recognizing a position of itself, comprising:

a provision information file storage section in which a number of provision information files having store information main data to compose store information becoming an object to be provided and metadata incidental to the store information main data are stored;

a retrieval condition enter section for entering a retrieval condition including at least terminal position information showing a position of a mobile terminal device itself when an access is made from the mobile terminal device;

a retrieval executing section for retrieving provision information files a degree of accordance of which becomes a predetermined reference level or more with respect to said retrieval condition among a number of provision information files stored in the provision information file storage section;

a list presentation section for transmitting a list of provision information files retrieved by the retrieval executing section to the mobile terminal device; and an information distribution section for reading out store information main data in a provision information file pertaining to a selection instruction from the provision information file storage section when said selection instruction to select one in the list is given from the mobile terminal device, and distributing said read out store information main data to the mobile terminal device;

wherein the metadata includes an information identification code to identify a provision information file, a store genre code showing a genre of a store pertaining to a provision information file, a store position code showing a position of a store pertaining to a provision information file;

the retrieval executing section carries out retrieval with reference to at least a [degree of accordance between terminal position information included in the retrieval condition and a store position code included in the metadata] and delivers, as a retrieval result, information in which an information identification code of retrieved provision information files and a degree of accordance showing a degree of accordance of said retrieved provision information files are associated with each other to the list presentation section;

the list presentation section includes:

a retrieval result storage section in which the retrieval result delivered from the retrieval executing section is stored;

a table storage section for storing interest degree tables in which degrees of interest corresponding to respective store genres are set for each of unit sections set with individual time periods of individual zonal areas with a map divided into a plurality of zonal areas;

a correction processing section for obtaining a corrected degree of accordance by recognizing a degree of interest for respective store genres set for a unit section corresponding to a present point in time with respect to a zonal area including a position shown by the terminal position information with reference to the interest degree tables when the retrieval result is delivered from the retrieval executing section and by correcting a [degree of accordance of respective provision information files] stored in the retrieval result storage section using a degree of interest recognized with respect to a store genre pertaining to said respective provision information files;

a correction result storage section for storing information which is obtained by making substitution so that the degree of accordance in the retrieval result stored in the retrieval result storage section is substituted by the corrected degree of accordance; and a list transmission section for sorting information identification codes in a large order of the corrected degree of accordance based on information stored in the correction result storage section, creating a list in which headers of store information are arranged in a sorted order, and transmitting the list to the mobile terminal device.

(2) The second feature of the present invention resides in an information providing system according to the first feature, wherein the metadata includes a keyword code including a keyword associated with the store information main data and weighting points given to the corresponding keyword;

the retrieval condition enter section enters a retrieval condition including terminal position information and a keyword designated by a user; and the retrieval executing section carries out retrieval with reference to both a position degree of accordance showing a degree of accordance between the terminal position information included in the retrieval condition and the store position code included in the metadata and a keyword degree of accordance showing a degree of accordance, which is calculated by taking into consideration the weighting point between the keyword included in the retrieval condition and the keyword included in the metadata, and delivers, as the retrieval result, the degree of accordance, in which both of the position degree of accordance and the keyword degree of accordance are taken into consideration.

(3) The third feature of the present invention resides in an information providing system according to the first or second feature, wherein the list transmission section creates a list by arranging character strings of the headers in the store information main data in a sorted order.

(4) The fourth feature of the present invention resides in an information providing system according to the first to the third features, wherein the interest degree tables in which time periods for each of the days of the week are made into separate unit sections are used.

(5) The fifth feature of the present invention resides in an information providing system according to the first to the fourth features, wherein the correction processing section obtains a corrected degree of accordance by multiplying the degrees of interest by the degree of accordance stored in the retrieval result storage section or adding the degrees of interest thereto.

(6) The sixth feature of the present invention resides in an information providing system according to the first to the fourth features, wherein the table storage section stores a plurality of interest degree tables, and the correction processing section recognizes a plurality of degrees of interest with reference to the plurality of interest degree tables and obtains a corrected degree of accordance by using the plurality of degrees of interest thus recognized.

(7) The seventh feature of the present invention resides in an information providing system according to the sixth feature, wherein the correction processing section has a function of setting weighting parameters for each of the recognized plurality of degrees of interest and obtains a corrected degree of accordance by multiplying a value, which is obtained by multiplying the respective degrees of interest by the weighting parameters, by the degree of accordance or adding the value to the degree of accordance.

(8) The eighth feature of the present invention resides in an information providing system according to the first to the seventh features, wherein the system further comprising an interest degree table creating section for newly creating an interest degree table based on information obtained from mobile terminal devices held by a number of users, and updating the interest degree table in the table storage section.

(9) The ninth feature of the present invention resides in an information providing system according to the eighth, feature, wherein the information distribution section includes a function of delivering, to the interest degree table creating section, interest information including terminal position information of a mobile terminal device, time information showing a point in time when a selection instruction is given, and store genre information showing a store genre of a provision information file pertaining to the selection instruction when the selection instruction is received from the mobile terminal device; and the interest degree table creating section includes a frequency adding-up section for recording, based on the delivered interest information, a fact that a user is interested in a store genre shown by the store genre information for a unit section corresponding to the time information with respect to a zonal area including a position shown by the terminal position information and for adding-up frequencies at which the users are interested in respective store genres in regard to individual unit sections, and the interest degree table creating section creates a plan scheduling interest degree table based on an adding-up result.

(10) The tenth feature of the present invention resides in an information providing system according to the eighth feature, wherein the interest degree table creating section includes:

a neighboring store recognition section for recognizing passing points on a moving route of individual mobile terminal devices based on position changing information which shows positional changes of the individual mobile terminals devices for each of predetermined sampling times, calculating distances to respective stores for each of the passing points by referencing the store position code in the provision information files stored in the provision information file storage section, and recognizing a predetermined number "m" of stores in the ascending order of distance as neighboring stores in regard to the corresponding passing points;

a staying time recognition section for recognizing a time period from passing time of a first passing point to passing time of a final passing point for common neighboring stores common to continuous passing points on the moving route as a staying time a staying coefficient calculation section for obtaining a sum of distances to all the passing points from the first passing point to the final passing point for each of the common neighboring stores and calculating a value, which is obtained by dividing the staying time by the sum, as a staying coefficient; and a staying coefficient adding-up section for adding-up the staying coefficient calculated in regard to an individual common neighboring store as a value showing a degree of interest for a store genre of the common neighboring store with respect to a unit section corresponding to the staying time recognized for the common neighboring store for the zonal area including a position of the common neighboring store;

wherein the interest degree table creating section creates a visit and utilization interest degree table based on an adding-up result by the staying coefficient adding-up section.

(11) The eleventh feature of the present invention resides in an information providing system according to the tenth feature, wherein when a staying time includes a time period extending over a plurality of unit sections, partial staying coefficients, which are obtained by a proportional division in accordance with an overlapping degree of the staying time and a partial time period of individual unit sections, are adding-up for each of the unit sections.

(12) The twelfth feature of the present invention resides in an information providing system according to the first to the eleventh features, wherein the table storage section stores an advertising sponsor intention degree table corresponding to each of the provision information files, unit sections corresponding to those in the interest degree tables are provided in said advertising sponsor intention degree table, and a degree of intention of an advertising sponsor who provides respective store information is set in the individual unit sections; and said information providing system further includes an advertising sponsor intention degree table creating section which creates an advertising sponsor intention degree table for each of the respective provision information files based on an enter operation from outside in accordance with an instruction of an advertising sponsor, and stores said advertising sponsor intention degree table in the table storage section;

wherein the correction processing section recognizes the degree of intention set in the corresponding unit sections by referencing the advertising sponsor intention degree table in regard to a provision information file which becomes an object to be corrected for the degree of accordance and obtains a corrected degree of accordance by correcting the degree of accordance by using both the degrees of interest and the degree of intention.

(13) The thirteenth feature of the present invention resides in an information providing system according to the twelfth feature, wherein the advertising sponsor intention degree table creating section includes a function of setting a degree of intention of a specified unit section in regard to a specified provision information file based on an enter operation of an advertising sponsor and a function of recognizing a degree of interest set in association with a store genre of said specified provision information file with respect to said specified unit section with reference to the interest degree table in the table storage section and presenting the recognized degree of interest to the advertising sponsor.

(14) The fourteenth feature of the present invention resides in an information providing system according to the thirteenth feature, wherein the advertising sponsor intention degree table creating section presents an [enter column into which a desired degree of intention is entered in association with the individual unit sections] to an advertising sponsor, and displays respective enter columns in a display pattern responsive to the degrees of interest recognized with respect to the individual unit sections.

(15) The fifteenth feature of the present invention resides in an information providing system according to the twelfth feature, wherein the advertising sponsor intention degree table creating section includes a function of setting a degree of intention of individual unit sections in regard to a specified provision information file based on an enter operation of an advertising sponsor and a function of recognizing a degree of interest set in association with a store genre of said specified provision information file with respect to the respective unit sections with reference to the interest degree table in the table storage section and presenting the respective unit sections to the advertising sponsor in accordance with the priority order in which an intensity of the degree of interest is taken into consideration.

(16) The sixteenth feature of the present invention resides in an information providing system according to the twelfth to the fifteenth features, wherein the correction processing section has a function of setting weighting parameters in association with the degree of interest and the degree of intention, respectively, and obtains a corrected degree of accordance by multiplying a value, which is obtained by multiplying the degree of interest by its weighting parameter, and a value, which is obtained by multiplying the degree of intention by its weighting parameter, by the degree of accordance or adding the values to the degree of accordance, respectively.

(17) The seventeenth feature of the present invention resides in an information providing system according to the first to the sixteenth features, wherein the table storage section stores a user evaluation degree table in association with each of the provision information files, and evaluation degrees of users for respective stores corresponding to respective provision information files are recorded in the user evaluation value table; and said information providing system further includes a user evaluation value table creating section which creates the user evaluation value table in regard to the respective provision information files by collecting evaluation values for respective stores from users, and stores the user evaluation value table in the table storage section;

wherein the correction processing section recognizes an evaluation value for a provision information file which becomes an object to be corrected for a degree of accordance by referencing a user evaluation value table with respect to said provision information file and obtains a corrected degree of accordance by correcting the degree of accordance by using both of the degree of interest and the evaluation value.

(18) The eighteenth feature of the present invention resides in an information providing system according to the seventeenth feature, wherein the correction processing section has a function of setting weighting parameters in association with the degree of interest and the evaluation value, respectively, and obtains a corrected degree of accordance by multiplying a value, which is obtained by multiplying the degrees of interest by its weighting parameter, and a value, which is obtained by multiplying the evaluation value by its weighting parameter, by the degree of accordance or adding the values to the degree of accordance, respectively.

(19) The nineteenth feature of the present invention resides in an information providing system according to the seventeenth feature or the eighteenth feature, wherein the user evaluation value table creating section creates a user evaluation value table in which individual evaluation values of individual users are recorded;

the retrieval condition enter section enters information to identify an accessing user along with a retrieval condition; and the correction processing section recognizes a user inclined to have a similar evaluation to that of the accessing user as a user having similar taste, and carries out correction using an individual evaluation value of said user having similar taste.

(20) The twentieth feature of the present invention resides in an information providing system according to the nineteenth feature, wherein the correction processing section recognizes the accessing user himself/herself as a user having similar taste when an individual evaluation value of the accessing user himself/herself is described in the user evaluation value table with respect to a provision information file which becomes an object to be corrected for the degree of accordance, and carries out correction using the individual evaluation value of the accessing user himself/herself.

(21) The twenty-first feature of the present invention resides in an information providing system according to the nineteenth feature or the twentieth feature, wherein the correction processing section includes:

first means for extracting user evaluation value tables in regard to provision information files having the same store genre as a provision information file which becomes an object to be corrected for the degree of accordance;

second means for extracting a table or tables, in which an individual evaluation value of an accessing user is described, from the user evaluation value tables extracted by the first means;

third means for calculating a correlation degree between the accessing user and the other users by using the user evaluation value table or tables extracted by the second means;

fourth means for recognizing a user whose correlation degree calculated by the third means is a predetermined reference value or more, or recognizing a predetermined number of users who are selected in descending order of the correlation degree calculated by the third means, as a user or users having similar taste with respect to the accessing user; and fifth means for determining an evaluation value used for correction by using an individual evaluation value of the user or users having similar taste recorded in the user evaluation value table in regard to the provision information file which becomes an object to be corrected for the degree of accordance.

(22) The twenty-second feature of the present invention resides in an information providing system according to the twenty-first feature, wherein the third means calculates a correlation degree R(X, Y) between user X and user Y, the third means selects a table in which both of an individual evaluation value of user X and an individual evaluation value of user Y are described, from the user evaluation value tables extracted by the second means and, based on "n" tables selected, performs a calculation of $$Sxx = \Sigma_{i=1 \text{ through } n}(Exi - Exa)^2$$

$$Syy = \Sigma_{i=1 \text{ through } n}(Eyi - Eya)^2$$

$$Sxy = \Sigma_{i=1 \text{ through } n}(Exi - Exa)(Eyi - Eya)$$

(where, Exi is an individual evaluation value of user X in an i-th table selected, Eyi is an individual evaluation value of user Y in an i-th table selected, Exa is an average value of the individual evaluation values of user X in the "n" tables selected, and Eya is an average value of the individual evaluation values of user Y in the "n" tables selected), and further performs a calculation of $$R(X,Y) = Sxy/(\sqrt{Sxx} \cdot \sqrt{Syy})$$

to obtain the correlation degree R(X,Y), so as to calculates correlation degrees between the accessing user and "K" users having similar taste, and the fifth means obtains the evaluation value γ used for correction by executing a calculation of $$\gamma = \Sigma_{k=1 \text{ through } K}(Ek \times Rk)/\Sigma_{k=1 \text{ through } K}(Rk)$$

where an individual evaluation value of a k-th user having similar taste recorded in the user evaluation value table with respect to the provision information file which becomes an object to be corrected for the degree of accordance is Ek and a correlation degree with the k-th user having similar taste is Rk (where the individual evaluation value of the k-th user having similar taste is not recorded in the user evaluation value table for the provision information file which becomes an object to be corrected for degree of accordance, Ek=0 and Rk=0 are adopted).

(23) The twenty-third feature of the present invention resides in an information providing system according to the first to the twenty-second features, wherein the table storage section stores individual interest degree tables for respective users, and degrees of interest in regard to respective store genres of the respective users are set in the individual interest degree tables;

the information providing system further includes an individual interest degree table creating section which creates the individual interest degree tables for respective users by collecting information regarding the respective users and stores the tables in the table storage section; and the correction processing section recognizes an individual degree of interest of a user, to whom the list is presented, in regard to a store genre of a provision information file, which becomes an object to be corrected for the degree of accordance, with reference to an individual interest degree table for said user, and obtains a corrected degree of accordance by correcting the degree of accordance using both of the degree of interest and the individual degree of interest.

(24) The twenty-fourth feature of the present invention resides in an information providing system according to the twenty-third feature, wherein the individual interest degree table creating section creates an individual interest degree table for a specified user, who has entered a retrieval condition, based on the retrieval condition acquired from the retrieval condition enter section.

(25) The twenty-fifth feature of the present invention resides in an information providing system according to the twenty-third feature, wherein the individual interest degree table creating section collects [store genres of store information distributed to a specified user] acquired from the information distribution section as individual interest information for the specified user, and creates an individual interest degree table in association with the specified user.

(26) The twenty-sixth feature of the present invention resides in an information providing system according to the twenty-third to the twenty-fifth features, wherein the individual interest degree table creating section creates individual interest degree tables, in which individual degrees of interest are set in regard to respective store genres, for each of the unit sections set in association with individual time periods of individual zonal areas, and the correction processing section carries out correction by referencing an individual degree of interest, in association with the respective store genres set for a unit section corresponding to a present point in time in regard to a zonal area including a position shown by the terminal position information, of the individual interest degree table.

(27) The twenty-seventh feature of the present invention resides in an information providing system according to the twenty-third to the twenty-sixth features, wherein the correction processing section has a function of setting weighting parameters in association with the degrees of interest and the individual degree of interest, respectively, and obtains a corrected degree of accordance by multiplying a value, which is obtained by multiplying the degree of interest by its weighting parameter, and a value, which is obtained by multiplying the individual degree of interest by its weighting parameter, by the degree of accordance or adding the values to the degree of accordance, respectively.

(28) The twenty-eighth feature of the present invention resides in embodying an information providing system according to the first to the twenty-seventh features by a computer with a dedicated program.

According to the information providing system of the present invention, a plurality of unit sections are defined by geographical division and time division, and a degree of interest to respective store genres are set for the respective unit sections. The degree of interest functions as a barometer showing which store genre general users are interested in for the respective unit sections based on past behavior patterns of a lot of users. In the information providing system of the present invention, posting order of store information list, which is presented as a retrieval result, is corrected by taking the degree of interest into consideration. Therefore, it is possible to accurately predict a behavior pattern of a user, and select and provide the optimal information depending on a geographical point and time of user's access.

BRIEF DESCRIPTION OF THE DRAWINGS

FIG. 4 is a view showing one example of retrieval conditions entered by a retrieval condition enter section 130 shown in FIG. 1;

FIG. 5 is a view showing one example of a retrieval result obtained by a retrieval work by a retrieval executing section 120 shown in FIG. 1;

FIG. 6 is a view of a terminal screen on which a list created by using the retrieval result shown in FIG. 5 as it is displayed;

FIG. 7 is a view of a terminal screen showing one example of store information provided by selecting the uppermost item in the list shown in FIG. 6;

FIG. 10 is a view showing a detailed example of the degree of interest stored in a single unit section of the interest degree table shown in FIG. 9;

FIG. 11 is a view showing another detailed example of information stored in a single unit section of the interest degree table shown in FIG. 9;

FIG. 14 is a view showing a state in which respective information identification codes are sorted in descending order of corrected degrees of accordance in the example shown in FIG. 13;

FIG. 15 is a view of a terminal screen on which a list created by using an after-sorted retrieval result shown in FIG. 14 is displayed;

FIG. 21 is a view showing a state of recognizing neighboring stores and distances thereto at respective passing points in the process for creating the interest degree table for visit and utilization;

FIG. 22 is a view showing a state of grasping common neighboring stores and having calculated the staying coefficients therein based on the recognition results shown in FIG. 21;

FIG. 37 is a view showing a detailed example of an individual interest degree table created by an individual interest degree table creating section 180 shown in FIG. 36.

BEST MODE FOR CARRYING OUT THE INVENTION

Figure 1:
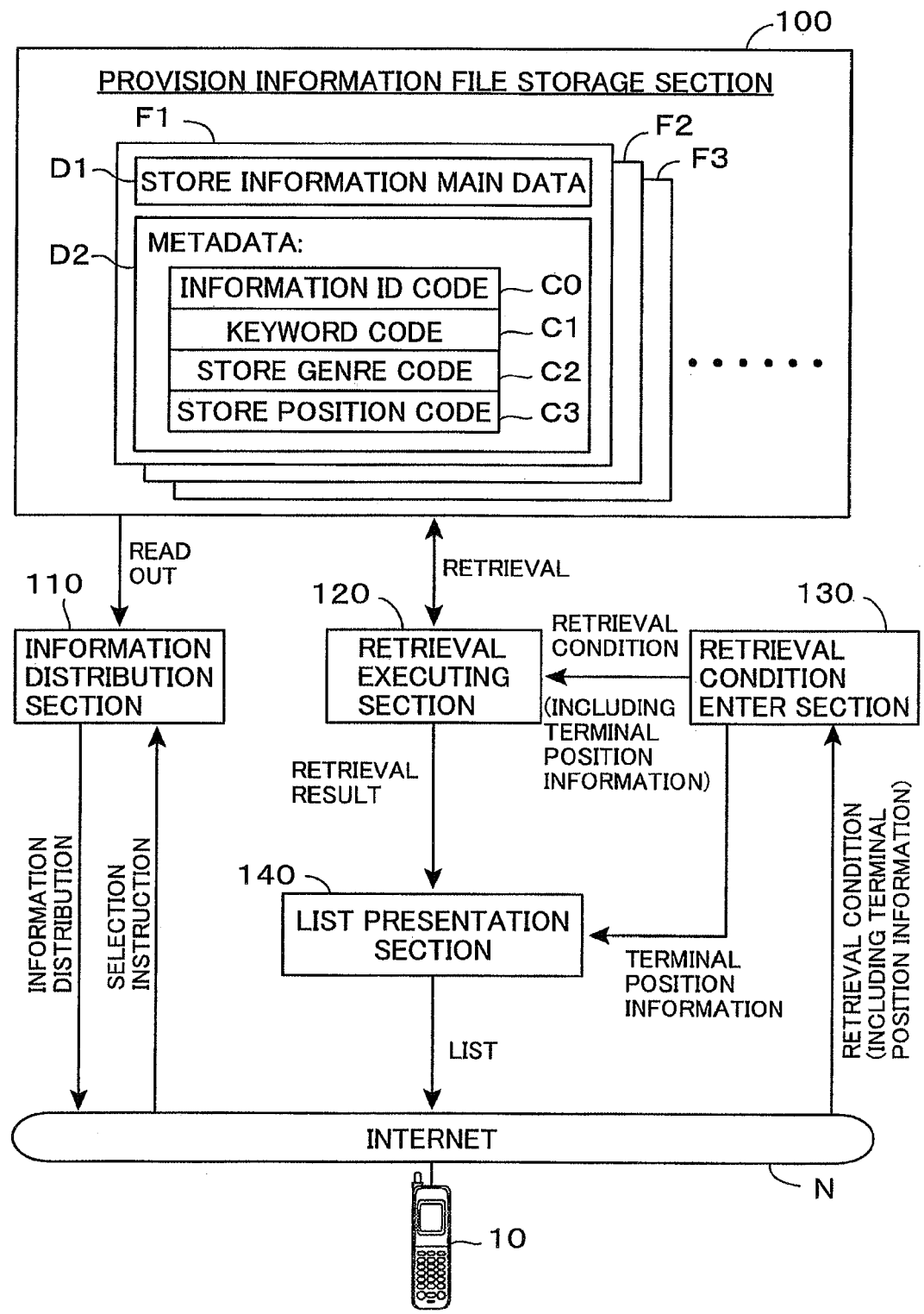
FIG. 1 is a block diagram showing a configuration of an information providing system according to a basic embodiment of the present invention.

Hereinafter, a description is given of an embodiment illustrating the present invention.
<<<Section 1>>>
Basic Configuration of a System According to the Present Invention FIG. 1 is a block diagram showing a configuration of an information providing system according to a basic embodiment of the present invention. As shown in the drawing, the system is composed of a provision information file storage section 100, an information distribution section 110, a retrieval executing section 120, a retrieval condition enter section 130, and a list presentation section 140, and the system can be accessed from a mobile terminal device 10 via the Internet N.

An information providing system according to the present invention is a system for providing store information regarding specified stores to a mobile terminal device 10 having a function for recognizing the position of itself. A typical example of the mobile terminal device 10 that can be used for the present invention is equipment such as a cellular phone, a small-sized personal computer, a PDA, etc., which each has a GPS function. The equipment is able to obtain the information on latitude and longitude showing the position of the user using the GPS. Here, the information on latitude and longitude thus obtained is called "Terminal position information."

Accessing the system according to the present invention from the mobile terminal device 10 may be carried out by any method. However, in the embodiment shown herein, a description is given of a typical example of accessing the system using a web browser function equipped in the mobile terminal device 10 via the Internet N.

The provision information file storage section 100 shown in the drawing is a component in which a number of provision information files F1, F2, F3, etc., are stored, and in actuality, it is composed of a file server unit. Individual provision information files, respectively, accommodate store information (advertisement information of stores which are distributed to users) regarding specified stores. As illustrated, one provision information file F1 is composed of a store information main data D1 which composes store information being the object to be provided and a metadata D2 associated with the store information main data D1. Here, the metadata D2 includes an information identification code C0 to specify the provision information file F1, a keyword code C1 related to the store information main data D1, a store genre code C2 showing the genre of a store related to the provision information file F1 and a store position code C3 showing the position of a store related to the provision information file F1.

Figure 2:
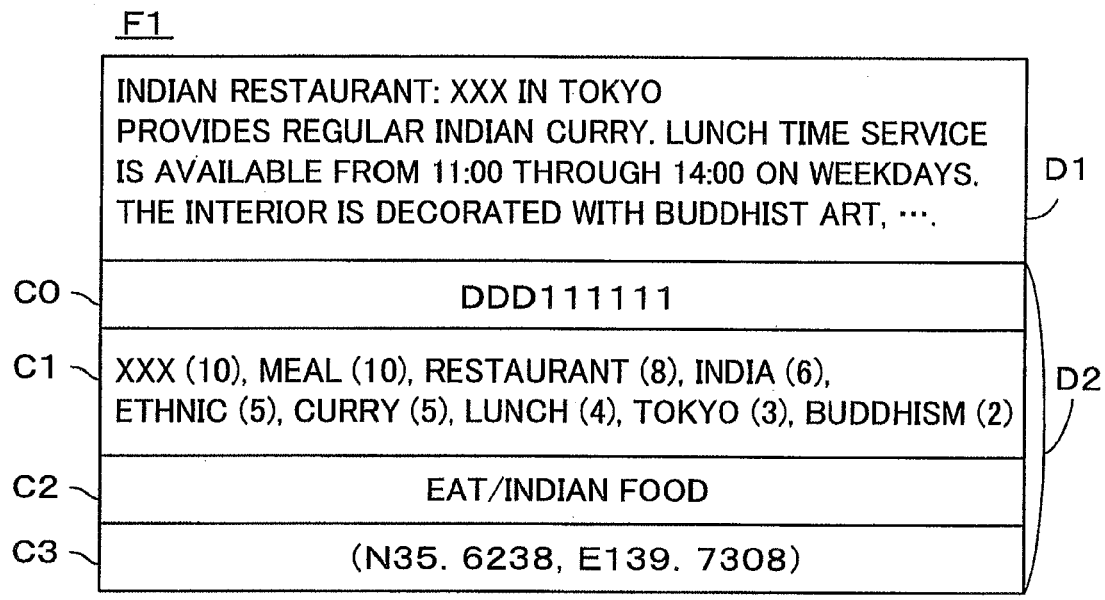
FIG. 2 is a view showing a detailed configurational example of provision information file F1 stored in a provision information file storage section 100 shown in FIG. 1.

FIG. 2 is a view showing a detailed configurational example of provision information file F1 stored in the provision information file storage section 100. In the example, the provision information file F1 is a file showing store information regarding [Indian restaurant XXX: in Tokyo], and a character string of store advertisement is accommodated continuously in the character string of the header line being [Indian restaurant: XXX in Tokyo] in the store information main data D1. The store information main data D1 is distributed to the mobile terminal device 10 which a user operates, and the illustrated character string is displayed on the display screen of the mobile terminal device 10. Also, the store information main data D1 is described in the text format or HTML format so as to be interpreted by the web browser equipped in the mobile terminal device 10.

The metadata D2 is composed of an information identification code C0, a keyword code C1, a store genre code C2, and a store position code C3 as described above. In the example shown in FIG. 2, a code consisting of [DDD111111] is shown as the information identification code C0. Though this code C0 is a unique code to specify the provision information file F1, it does not matter that the file name of the provision information file F1 may be used as it is.

The keyword code C1 is a code composed of a keyword related to the store information main data D1 and a weighting point given to the corresponding keyword. In the example shown in FIG. 2, character strings such as [XXX], [meal], [restaurant], [India], etc., are, respectively, keywords, and numerical values in parentheses are weighting points given to the corresponding keywords. The weighting points are used to calculate the degree of accordance when executing retrieval as described later.

Figure 3:
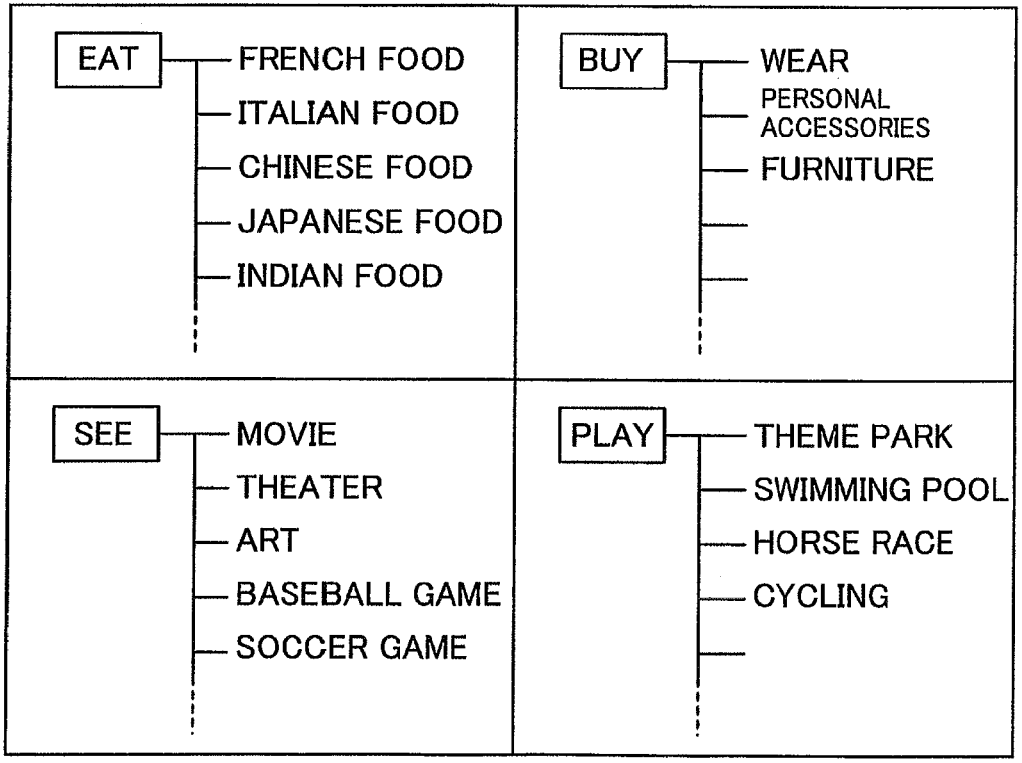
FIG. 3 is a view showing a detailed setting example of store genres used in the present invention.

The store genre code C2 is a code showing the genre of a store which becomes an object to be advertised by the store information main data D1. How the store genres are classified is a matter entrusted to an administrator of the system, which is an arbitrarily settable item when carrying out the present invention. However, herein, it is assumed for convenience that the detailed store genres as shown in FIG. 3 have been set, and the following description is based on the above assumption.

Generally, for stores, the stores offer various types of businesses, and there are stores that offer drinks and meals, stores that sell goods and commodities, stores which are movie theaters or playhouses, stores which are recreation facilities or amusement centers, etc. Therefore, in the set example of store genres shown in FIG. 3, store genres of four major classifications consisting of [eat], [buy], [see] and [play] are set, and store genres of minor classifications are set as lower-ranked concepts thereof. For example, with respect to lower-ranked concepts of [eat], the store genres of minor classifications such as [French food], [Italian food], [Chinese food], etc., are set. And, the genre of the corresponding store is shown in the format [major classification and minor classification] as the store genre code C2 in the metadata D2. The store genre code C2, which is [eat/Indian food], in the example shown in FIG. 2 shows that the store genre of an Indian restaurant which is [XXX in Tokyo] belongs to [major classification: eat] and [minor classification: Indian food].

As described above, since setting the store genres is an arbitrary matter which is entrusted to the judgment of a system administrator, other various settings are available. For example, only the [major classification] may be used as the store genre code C2, and only the [minor classification] may be used as the store genre code C2. Or, a [middle classification] intervening therebetween may also be used. The method for classifying the genres is not limited to classification with respect to services provided by the corresponding store and commodities sold by the corresponding store, and for example, the classification may be available which depends on customer groups such as a [young persons group], a [late middle age persons group], a [couples' group], a [family group], etc., or the classification may be available which depends on price ranges such as a [low price range], a [middle price range] and a [high price range].

In addition, herein, such an example is described for convenience of description, which uses, as the store genre code C2, a code consisting of character strings directly recognizable by a person such as [eat], [buy], [French food], [Italian food], etc. However, a store genre code C2, which cannot be directly recognized by a person, consisting of a combination of alphabetical letters and numerical values may be used as necessary in actual applications.

The store position code C3 is a code showing the position of a store which becomes an object to be advertised of the store information main data D1. Herein, a code showing the latitude and longitude of a store location is used as the store position code C3. For example, the store position code C3 which is [N35.6238, E139.7308] in the example shown in FIG. 2 shows that the store location of the Indian restaurant which is [XXX in Tokyo] is located at a northern latitude of 35.6238 and an eastern longitude of 139.7308.

Although a detailed data structure of the provision information file F1 is described above based on the example shown in FIG. 2, provision information files having the data structure similar thereto are stored in the provision information file storage section 100 with respect to each of a number of stores (for example, several thousands of stores through several tens of thousand of stores). Further, the content of such a provision information file is determined by a system administrator based on the degree of intention of an advertising sponsor (a subject of providing store information). For example, such matters regarding what kinds of words are selected for keywords of the keyword code C1, how many points are determined for weighting, and which genres are selected as the store genre code C2 may be arbitrarily set by the judgment of a system administrator.

Here, a user accesses the system by using a mobile terminal device 10 and requests distribution of desired store information from a plurality of store information stored in the provision information file storage section 100. Therefore, the user first accesses the retrieval condition enter section 130 through the mobile terminal device 10, and enters desired retrieval conditions. Accessing the retrieval condition enter section 130 can be carried out via the Internet N by using a web browser function of the mobile terminal device 10. In other words, the user accesses a predetermined web page provided by the retrieval condition enter section 130, using the web browser of the mobile terminal device 10, and may enter a desired retrieval condition on the corresponding web page.

The retrieval condition enter section 130 is actually composed of web server equipment, and transmits predetermined web page data to the mobile terminal device 10 when being accessed by the mobile terminal device 10. Continuously, the retrieval condition enter section 130 carries out a loading process of the retrieval condition transmitted from the mobile terminal device 10. In the embodiment shown here, a retrieval condition consisting of [terminal position information and keyword] is transmitted from the mobile terminal device 10 to the retrieval condition enter section 130. As described above, since the mobile terminal device 10 is able to automatically obtain the information on latitude and longitude showing the position of itself by utilizing the GPS, the user is not actually required to enter the terminal position information and may enter only the keyword on the web page.

FIG. 4 is a view showing one example of retrieval conditions thus transmitted from the mobile terminal device 10 to the retrieval condition enter section 130. As illustrated, in the example, the retrieval condition composed of a keyword of [ethnic] and the terminal position information [(N35.6221, E139.7310)] is transmitted from the mobile terminal device 10 to the retrieval condition enter section 130. Here, although the keyword [ethnic] is entered in the mobile terminal device 10 by operation of the user, the terminal position information [(N35.6221, E139.7310)] is automatically obtained by the GPS function of the mobile terminal device 10. Where the mobile terminal device 10 is provided with a function of automatically transmitting the terminal position information to the retrieval condition enter section 130, the retrieval condition shown in FIG. 4 is delivered to the retrieval condition enter section 130 by the user executing only an enter operation of a keyword.

The retrieval condition (the retrieval condition including the terminal position information and a predetermined keyword designated by a user) entered in the system by the retrieval condition enter section 130 is delivered to the retrieval executing section 120. The retrieval executing section 120 carries out a process to retrieve a provision information file, whose degree of accordance with the retrieval condition exceeds a predetermined reference, from a number of provision information files F1, F2, F3, etc., which are stored in the provision information file storage section 100. In the embodiment referred to herein, the retrieval carried out by the retrieval executing section 120 is carried out with reference to both the degree of accordance for position and the degree of accordance for keyword.

The degree of accordance for position is referred to for the purpose of selecting with priority the store information suited to the present position of the user, that is, the store information regarding a store near the present position of the mobile terminal device 10. This is because it is considered that, where store information coincident with the retrieval condition is provided in regard to accessing from a user who intends to perform a specified behavior, distributing information regarding a store (a store for the user to be able to access in a short time) near the present position of the corresponding user with priority is suitable for convenience of the user.

The distance between the present position of the mobile terminal device 10 and the respective stores can be calculated by a calculation (a calculation to obtain the geographical distance between two points) using the terminal position information included in the retrieval condition and the store position code C3 contained in the metadata in the respective provision information files. Therefore, if the correlation between the distance and the degree of accordance for position is determined in advance so that the smaller the distance becomes, the greater the degree of accordance for position becomes, it is possible to obtain the degree of accordance for positions with respect to the respective provision information files F1, F2, F3, etc., which are stored in the provision information file storage section 100.

For example, if such setting as shown below is set, that is, the degree of accordance for position is 10 where the distance is 100 m or less, the degree of accordance for position is 8 where the distance is 100 m through 300 m, the degree of accordance for position is 5 where the distance is 300 m through 1 km, the degree of accordance for position is 3 where the distance is 1 km through 2 km, the degree of accordance for position is 1 where the distance is 2 km through 4 km, and the degree of accordance for position is 0 where the distance is 4 km or more, the degree of accordance for positions can be unambiguously calculated with the respective provision information files.

On the other hand, the degree of accordance for keywords can be calculated based on where the character string of the keywords included in the retrieval condition is coincident with character strings of the keywords included in the metadata and based on the weighting point for the coincident keywords. For example, in the retrieval based on the retrieval condition including the keyword [ethnic], the degree of accordance for the keyword in regard to the keyword code C1 as shown in FIG. 2 becomes 5 (the weighting point given to the keyword [ethnic]). Also, where the retrieval condition including a plurality of keywords is given, for example, it becomes possible to calculate the degree of accordance for the keyword if it is determined that the [total of the weighting points for the keywords the character strings of which are coincident with each other is regarded as the degree of accordance for keyword]. For example, where the keywords given as the retrieval condition are [meal], [ethnic] and [lunch], the degree of accordance for keyword in regard to the keyword code C1 as shown in FIG. 2 becomes 19 (the total of the weighting points=10+5+4).

After the retrieval executing section 120 obtains the degree of accordance for position and the degree of accordance for keyword with respect to the individual provision information files F1, F2, F3, etc., the total of both is recognized as the degree of accordance of the corresponding provision information file, and the provision information file the degree of accordance of which becomes a predetermined reference or more is extracted as the retrieval result.

Thus, in the embodiment described here, the retrieval executing section 120 carries out retrieval with reference to both of the degree of accordance for position showing the degree of accordance between the terminal position information included in the retrieval condition and the store position code included in the metadata and the degree of accordance for keyword showing the degree of accordance calculated by taking the weighting points of the keyword included in the retrieval condition and the keyword included in the metadata, and outputs, as the retrieval result, the information in which the information identification code of the provision information file the degree of accordance of which becomes a predetermined reference or more and the degree of accordance (the degree of accordance in which both the degree of accordance for position and the degree of accordance, for keyword are taken into consideration) of the corresponding provision information file are matched with each other. And, the retrieval executing section 120 executes a delivering process thereof to the list presentation section 140.

In addition, the example in which the terminal position information and the keyword are used as the retrieval condition is described herein. However, it is possible to set various conditions as a retrieval condition in addition thereto. For example, if the price range code showing the price ranges of the store is accommodated in the metadata D2, it is possible to carry out retrieval using the price range which a user desires, as a retrieval condition.

Or, if such a structure is provided by which individual information such as the tastes of individual users and the past utilization histories thereof are registered on the system, and information to specify a user who accesses when accessing to the retrieval condition enter section 130 using the mobile terminal device 10 (hereinafter referred to as an "access user") is transmitted to the retrieval condition enter section 130, such retrieval in which the individual information regarding the corresponding access user is added to a part of the retrieval condition is enabled. For example, where it is registered as the individual information that a specified user is interested in [Buddhism] and his or her favorite food is [curry], it is possible that unless the keywords [Buddhism] and [curry] are given from the mobile terminal device 10, the retrieval can be carried out by automatically adding these character strings to the keyword.

In order to collect the individual information, it is sufficient that, whenever individual users enter a certain retrieval condition in the retrieval condition enter section 130, the corresponding retrieval condition is stored as the retrieval history for the corresponding user. The retrieval history thus accumulated may be utilized as the individual information of the corresponding user. For example, if it can be confirmed in the retrieval history of a specified user that retrieval using the keywords [Buddhism] and [curry] has been frequently carried out in the past, it can be registered as the individual information of the corresponding user that the user is interested in [Buddhism] and his or her favorite food is [curry].

As described above, some of the retrieval processes carried out by the retrieval executing section 120 are exemplarily shown. However, generally, a technology for retrieving web pages that a user desires under various retrieval conditions is a publicly known art. And, functions for carrying out various retrieval processes can be added to the retrieval executing section 120 in addition thereto.

In the system according to the present invention, it is sufficient that at least the terminal position information showing the position of the mobile terminal device 10 itself is included in the retrieval condition. Therefore, if the terminal position information is transmitted from the mobile terminal device 10 to the retrieval condition enter section 130 unless the user enters any of the keywords, the retrieval executing section 120 is able to execute a retrieval process. The retrieval executing section 120 can conduct retrieval with reference to at least the [terminal position information included in the retrieval condition and the store position code included in the metadata], and is able to deliver information, which shows the information identification codes of retrieved provision information files with the degree of accordance of the retrieved provision information files, to the list presentation section 140 as the retrieval result.

In summary, it is sufficient that the retrieval executing section 120 according to the present invention has functions of recognizing the degree of accordance with respect to the individual provision information files F1, F2, F3, etc., stored in the provision information file storage section 100 based on any retrieval condition having at least the terminal position information included therein, and of delivering information, in which the information identification code for the provision information file the degree of accordance of which becomes a predetermined reference or more and the degree of accordance showing the degree of accordance of the corresponding provision information file are matched with each other, to the list presentation section as the retrieval result.

FIG. 5 is a view showing one example of the retrieval result obtained by retrieval work by the retrieval executing section 120. As described above, the retrieval result delivered from the retrieval executing section 120 to the list presentation section 140 may be information in which the information identification code and the degree of accordance are matched with each other. However, in the case shown in FIG. 5, what the information of the store genre code is added thereto is delivered as the retrieval result, wherein the retrieval result is composed of information in which the information identification code, the degree of accordance and the store genre, code are matched with each other. Further, the information of [ranking] shown in the first column in FIG. 5 shows the order in the case where the retrieval result is sorted in the order of size of the degree of accordance. It is not necessary for the retrieval result to contain the information regarding the [ranking].

In the first order of the retrieval result shown in FIG. 5, three types of information which are [degree of accordance: 85], [information identification code: DDD111111], and [store genre code: eat/Indian food] are matched with each other. This shows that, based on the retrieval result, the degree of accordance of the provision information file specified by the information identification code [DDD111111] is 85, which becomes the first rank where the retrieval result is sorted in the order of size of the degree of accordance, and the store genre code is [eat/Indian food]. In addition, the provision information file (store genre code is [buy/personal accessories]) specified by the information identification code [DDD222222] for which the degree of accordance of 79 is obtained is in the second rank. The provision information file (store genre code is [play/theme park]) specified by the information identification code [DDD333333] for which the degree of accordance of 64 is obtained is in the third rank, and so on.

Here, if the list presentation section 140 arranges the retrieval results shown in FIG. 5 in the order as they are and creates a list of the provision information files, such a list as shown in FIG. 6 can be obtained. That is, if the list presentation section 140 creates such a list and transmits it to the mobile terminal device 10 as the retrieval result (in detail, may transmit web page data in the format of text or HTML), such display as shown in FIG. 6 appears on the display screen of the mobile terminal device 10. Thus, the list presentation section 140 implements a function of transmitting the list of provision information files retrieved by the retrieval executing section 120 to the mobile terminal device 10.

The character strings displayed in the list of FIG. 6 are character strings of headers of the store information main data in the respective provision information files. For example, the character string [Indian restaurant: XXX in Tokyo] displayed as the first rank of the list is a character string of the header of the store information main data D1 in the provision information file F1 shown in FIG. 2. Also, the character string [Asian shop] displayed in the second rank of the list is a character string of the header in the provision information file (store genre code is [buy/personal ornaments]) specified by the information identification code [DDD222222], and the character string [Ethnic land ZZZ] displayed in the third rank of the list is a character string of the header in the provision information file (store genre code is [play/theme park]) specified by the information identification code [DDD333333], and so on.

Here, if a user operates by clicking the character string portion [Indian restaurant: XXX in Tokyo] while looking at the list displayed on the mobile terminal device 10, which is shown in FIG. 6, and gives an instruction to select one in the list, the corresponding selection instruction is transmitted to the information distribution section 110 as shown in FIG. 1. If the information identification code C0 of the respective store information is embedded in the data of the list which the list presentation section 140 gives to the mobile terminal device 10, along with the character string of the header of the respective store information, the mobile terminal device 10 can transmit to the information distribution section 110 the information identification code C0 itself of the store information clicked by the user as the selection instruction.

The information distribution section 110 reads out the store information main data D1 in the provision information file F1 pertaining to the corresponding selection instruction from the provision information file storage section 100 when the selection instruction is given from the mobile terminal device 10, and carries out a process to distribute the same to the mobile terminal device 10. As described above, where the information identification code C0 is given as the selection instruction, the information distribution section 110 can grasp the corresponding provision information file F1 using the information identification code C0. As a result, such display as shown in FIG. 7 is displayed on the display screen of the mobile terminal device 10. The display corresponds to the store information main data D1 shown in FIG. 2.

Although in fact, the list shown in FIG. 6 is a list presented in a prior art general information providing system, in actuality, the list is not a list presented by the system according to the present invention. In other words, the list presentation section 140 does not arrange the retrieval results shown in FIG. 5 in the order as they are and create a list of the provision information files, but executes a process for modifying the posting order when creating the list. The most important feature of the present invention is modification processing of the list posting order, which is executed by the list presentation section 140. By transmitting the list, which has been subjected to such modification processing, to the mobile terminal device 10, an object of the present invention is achieved, which predicts the behavior pattern of a user as accurately as possible, selects and provides the information most suitable for the user at respective points in time. Hereinafter, a description is given of the basic concept of the modification processing executed by the list presentation section 140 in Section 2.

<<<Section 2>>>

Basic Concept of Modification Processing Executed by the List Presentation Section In Section 1, for example, a detailed example was described, in which the retrieval results shown in FIG. 5 have been obtained as a result of having executed the retrieval process by the retrieval executing section 120 based on the retrieval condition (Keyword+Terminal position information) as shown in FIG. 4. In the retrieval result, the provision information file the degree of accordance of which is high is a file having high conformity with the keyword given as the retrieval condition, and pertaining to the store information near the present position of the mobile terminal device 10.

However, the method for posting such files having a high degree of accordance in the upper ranks of the list with priority is not necessarily a method suited to the requirements of a user. This is because the degree of accordance obtained by the retrieval process does not sufficiently predict what the behavior pattern of a user will be.

For example, where a user carries out retrieval using the keyword [ethnic], store information such as a restaurant (store genre: Eat) for providing ethnic food, a store (store genre: Buy) that sells ethnic commodities and furniture, etc., an art museum (store genre: See) for exhibiting ethnic arts, a recreation center (store genre: Play) having an ethnic atmosphere, etc., will be retrieved as store information having a high degree of accordance. In this case, if the user has carried out retrieval with an intention of retrieving a restaurant for providing ethnic food using the keyword [ethnic], it is essentially preferable to post the store information corresponding to the [store genre: eat] at an upper rank with priority. However, since it is not possible to predict the behavior of a user to

[eat] by the method described in Section 1, such a result is brought about in which store information including a commodity store, a recreation center, a furniture store, an art museum, etc., are posted at the upper ranks of the list as shown in the example of FIG. 6.

As a matter of course, it is very difficult for individual users who access the system to securely know what types of behaviors the individual users intend to perform. However, by statistically analyzing the behaviors of a number of users, it becomes possible to predict the behavior patterns to some extent. Therefore, the present invention enables to select and provide information most suitable for users at respective points in time by adopting a method for predicting a behavior pattern of a user based on statistical analysis results and executing modification processing for the posting order in the list based on the corresponding prediction result.

The first hint in predicting a behavior pattern is a geographical position of a user. For example, where the user accesses the system in a clustered area of restaurants, it will be judged that there is a high possibility for the user to plan a behavior to [eat] from now. Or, where the user accesses the system at a bus terminal leaving for a plurality of recreation centers, it will be judged that there is a high possibility for the user to plan a behavior to [play] from now. Thus, it can be considered that the geographical position of a user who accesses includes certain information to predict a behavior pattern of the corresponding user, and is an effective hint in view of predicting the genre of store information that the user desires.

The second hint in predicting the behavior pattern is a time period in accessing. For example, where the user accesses the system near noon, it will be judged that there is a high possibility for the user to plan to [eat] lunch from now. Also, if the time period is extended to days of the week and is taken into consideration, where the user accesses the system in the morning on Sunday, it will be judged that there is a higher possibility for the user to plan a behavior to [play] from now in comparison with a case where the user accesses in the morning on Monday. Thus, it is considered that the time period in which the user accesses contains certain information to predict a behavior pattern of the corresponding user, and becomes an effective hint in view of predicting the genre of store information that the user desires.

The inventor considers that, if these two hints are combined with each other, it becomes possible to further accurately predict a behavior pattern by the synergistic effect thereof. For example, if statistical data pertaining to what kinds of behaviors a number of users conduct at a specified geographical position at a specified time period can be prepared, where a user accesses from the corresponding geographical position at the corresponding time period, the behavior of the corresponding user can be predicted. As a matter of course, although the prediction only shows a behavior probability obtained from a statistical standpoint, it becomes possible to select and provide information, which can be presumed to be further favorable for the user based on probability, by executing modification processing with respect to the posting order of the list based on the corresponding prediction.

Figures 8, 9:
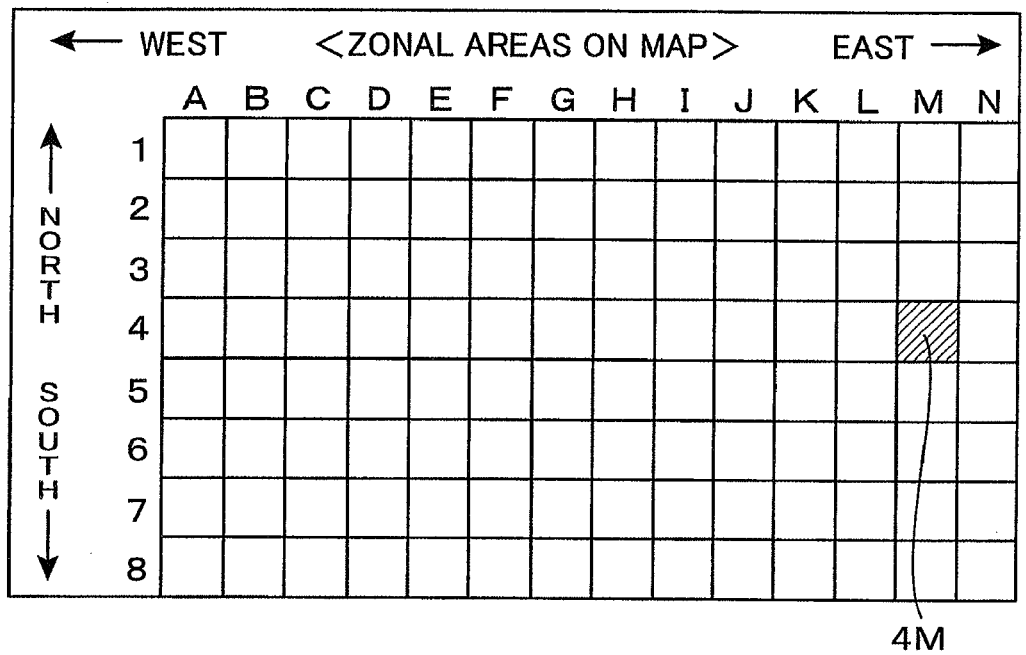
FIG. 8 is a plan view showing an example in which a map is divided into a plurality of zonal areas.
FIG. 9 is a plan view showing a configurational example of an interest degree table used in the present invention.

Accordingly, in order to predict a behavior pattern based on the geographical position of a user, which becomes the first hint, a map is divided into a plurality of areas, and individual zonal areas are defined. FIG. 8 is a plan view showing an example in which a map is divided into a plurality of zonal areas. In the illustrated example, coordinates A through N are defined by dividing the map in an east and west direction, and coordinates 1 through 8 are defined by dividing the map in a north and south direction. A zonal area can be expressed by combining the coordinates A through N and the coordinates 1 through 8. For example, the zone hatched in the drawing may be expressed as [zonal area 4M].

Since the example shown in FIG. 8 is a simple model, all the zonal areas are composed of squares having the same dimension. As a matter of course, it is possible that the sizes and shapes of individual zonal areas are arbitrarily set. For example, the surrounding area of a terminal station may be set as a single zonal area. An area which is one block of a busy shopping area may be set as a zonal area. In addition, if stores exist along a road, an area along the corresponding road may be set as a zonal area under the assumption that users move along the road. That is, the zonal areas may be set with ease for persons to move along a road taken into consideration.

Further, in order to predict a behavior pattern based on a time period which becomes the second hint, the individual zonal areas shown in FIG. 8 are divided based on the time periods. Here, the individual time periods thus divided are called "unit sections." For example, by arranging the individual zonal areas in the horizontal direction and the individual time periods in the vertical direction, unit sections shown by a specified zonal area and a specified time periods are shown in the form of a two-dimensional matrix, wherein such a table as shown in FIG. 9 may be obtained. As described later, inherent degrees of interest are set in the respective unit sections in the table. Therefore, here, the table is called an "Interest degree table."

Divisions being 1A, 2A, 3A, . . . 6N, 7N, 8N, which are shown in the horizontal direction in the interest degree table shown in FIG. 9, respectively, correspond to the respective zonal areas 1A through 8N on the map, which are shown in FIG. 8. That is, in FIG. 8, although the respective zonal areas 1A through 8N on the map are arranged on a two-dimensional plane, the zonal areas are arranged on the one-dimensional horizontal direction axis.

On the other hand, divisions being Sundays 0 through 23, Mondays 0 through 23, . . . . Saturdays 0 through 23 shown in the vertical direction of the interest degree table shown in FIG. 9 correspond to respective time periods on the time axis. In detail, for example, the time period which is [Sunday 0] shows a time period from 0:00 through 1:00 on Sunday, the time period which is [Sunday 1] shows a time period from 1:00 through 2:00 on Sunday, and the time period which is [Saturday 23] shows the time period from 23:00 through 0:00 (24:00) on Saturday.

Individual rectangles on the interest degree table show a single unit section, respectively. In other words, the individual unit sections on the interest degree table, respectively, express a specified zonal area and a specified time period. And, degrees of interest of a number of users in regard to respective store genres, which have been statistically obtained in the corresponding zonal area and time period, are set in one unit section.

FIG. 10 is a view showing a detailed example of the degree of interest stored in a single unit section of the interest degree table shown in FIG. 9. This example shows the degrees of interest set for the unit section [1A: Sunday 14], wherein the degrees of interest being [eat: 20%], [buy: 60%], [see: 15%], and [play: 5%] are set with respect to the store genre in the major classification. This shows that, if the degrees of interest of users, who exist in the zonal area 1A on the map in the time period of 14:00 through 15:00, at that point in time are analyzed in regard to the store genre, the probability of having interest in the genre [eat] is 20%, the probability of having interest in the genre [buy] is 60%, the probability of having interest in the genre [see] is 15%, and the probability of having interest in the genre [play] is 5%.

Thus, the [degree of interest] according to the present invention is a parameter showing how much a user is interested with respect to respective genres as the behavior planned immediately after, at individual points in time. An important point here is in that the [degree of interest] in the present invention does not show the degree of interest in terms of general tastes of individual users but shows the degree of interest with respect to individual genres under a specified condition that a user exists in a specified zonal area and in a specified time period.

For example, if persons generally called a "gourmet" are asked in regard to degrees of interest in terms of general tastes, such a response that the interest in the genre [eat] is the highest will be obtained. However, if even persons called a "gourmet" are, for example, in the zonal area 1A, in which shopping malls are densely located, in the time period of 14:00 through 15:00 (the time period after lunch) on Sunday, there is a high possibility for the user to assume a behavior in the genre [buy], as the behavior planned immediately after. Therefore, in this case, even if a user who accesses the system is a person called a "gourmet," it will be preferable that store information of the genre [buy] is provided with higher priority than store information in the genre [eat].

Thus, since the degree of interest under specified conditions is obtained, it is necessary to look into the behaviors of a number of users and to statistically analyze the behaviors. In detail, for example, a questionnaire survey is carried out in regard to what kinds of behaviors a number of users existing in the time period 14:00 through 15:00 in the zonal area 1A on the map on Sunday conduct or what kinds of behaviors they are conducting, from four genres [eat], [buy], [see] and [play], and the selection response ratios for each of the genres are obtained by percentage, wherein such values of the degrees of interest as shown in FIG. 10 can be obtained. If such a survey is carried out for all the time periods in regard to all the zonal areas on the map, it is possible to create the interest degree table, in which numerical values of such degrees of interest as shown in FIG. 10 are accommodated, for all of the unit sections. The interest degree table shown in FIG. 9 is the table thus created.

As described above, the interest degree table contains statistical information of past behaviors for a number of users, which statistically shows what genres the users existing in a specified zonal area at a specified time period are interested in. However, the information can be utilized as information showing what kind of behaviors individual users will take from now is highly possible. That is, the information can be used as material to predict the behavior pattern of users.

For example, in the case of the example shown in FIG. 10, respective numerical values in the interest degree table show the result of a past survey, which indicates that, when a survey was carried out for users existing in zonal area 1A in the time period of 14:00 through 15:00 on Sunday, the ratio of persons interested in the genre [eat] is 20%, the ratio of persons interested in the genre [buy] is 60%, the ratio of persons interested in the genre [see] is 15%, and the ratio of persons interested in the genre [play] is 5%. If the result of the survey is utilized as material to predict the behavior patterns of users, with respect to the behaviors which users existing in zonal area 1A in the time period of 14:00 through 15:00 on Sunday plan to take, it can be predicted that the probability in the genre [eat] is 20%, the probability in the genre [buy] is 60%, the probability in the genre [see] is 15%, and the probability in the genre [play] is 5%.

Resultantly, if an interest degree table which is obtained as a result of a past survey is prepared, and the posting order of a list in regard to the retrieval result is modified based on the degrees of interest for each of the genres in the interest degree table, modification is enabled based on the result of prediction of behavior patterns of a user so that it becomes possible to select and provide information most suitable for the user at individual points in time. For example, where the system is accessed by a user existing in zonal area 1A in the time period of 14:00 through 15:00 on Sunday, the posting order of a list may be modified based on the content of the interest degree table shown in FIG. 10 so that the posting order of store information pertaining to the store genre. [buy] showing the highest value of the degree of interest 60% ranks higher than the others. Since, based on the result of the past survey, 60% of users existing in the corresponding unit section are interested in the behavior of [buy], a list presumed to be most suitable for the user can be presented by adding modification so that the posting order of store information of the store genre [buy] ranks higher.

Further, although FIG. 10 shows an example in which the degrees of interest about four major classification genres of [eat], [buy], [see] and [play] are recorded as the descriptive example of the interest degree table, it is as a matter of course that the degrees of interest about minor classification genres may be recorded. FIG. 11 is a view showing an example in which the degrees of interest of such minor classification genres are recorded. As illustrated, minor classification genres such as [French food], [Italian food], [Chinese food], etc., are provided in the major classification genre [eat], and the degrees of interest for each of the minor classification genres are shown in terms of percentage.

Thus, if the interest degree table in which the degrees of interest are recorded for each of the minor classification genres is used, it is possible to further finely modify the posting order of store information. For example, in the case of the example of FIG. 11, although the degree of interest of the minor classification genre [Chinese food] is 1% in the major classification genre [eat], the degree of interest of the minor classification genre [Italian food] is 3% in the same major classification genre. Therefore, modification is carried out so that the store information of [Italian food] is listed in the posting order with higher priority than the store information of [Chinese food].

As a matter of course, as shown in the example of FIG. 11, in order to create the interest degree table in which the degrees of interest are recorded for each of the minor classification genres, it is necessary to carry out behavior surveys of users for each of the minor classification genres. For example, when a number of persons existing in the zonal area 1A on the map in the time period of 14:00 through 15:00 on Sunday are allowed to respond in regard to what kinds of behaviors they plan to conduct or what kinds of behaviors they are conducting, it is necessary to have them respond in regard to the minor classification genre for [eat Italian food], [eat Chinese food], etc., instead of merely responding to the major classification genre [eat].

In addition, in the examples shown in FIG. 10 and FIG. 11, it is standardized so that the total of the degree of interest for all the genres becomes 100%, and the degree of interest is expressed by percentage. However, the degree of interest is not necessarily expressed by percentage, and may be expressed by arbitrary numerical values. Also, in FIG. 9, although an example of an interest degree table in which the time periods for each of the days of the week are made into respective individual unit sections, the time periods are not necessarily set individually by the days of the week. For example, if the days of the week are not distinguished at all, it is sufficient that the time periods of the time units which are 0:00 through 1:00, 1:00 through 2:00, 2:00 through 3:00, . . .

23:00 through 0:00 (24:00) are set. As a matter of course, such classification may be acceptable, which distinguishes weekdays and weekends from each other. Also, in regard to classification of time periods, the hourly divisions are not necessarily carried out. That is, classification in which any arbitrary time unit, for example, 30-minute unit or 10-minute unit, is adopted may be available.

<<<Section 3>>>

Detailed Configuration of List Presentation Section and Operation Thereof

Figures 12, 13:
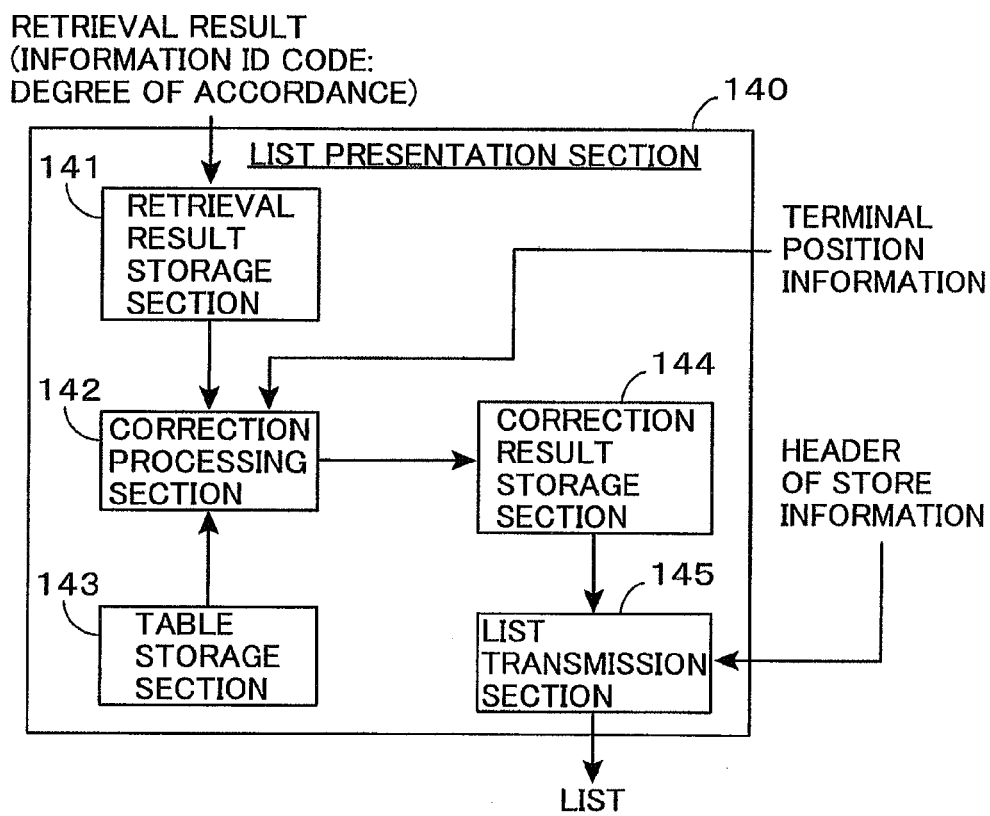
FIG. 12 is a block diagram showing an internal configuration of a list presentation section 140 shown in FIG. 1.
FIG. 13 is a view showing a state in which correction has been carried out with respect to the degree of accordance corresponding to respective information identification codes by correction processing by a correction processing section 142 shown in FIG. 12.

In Section 2 described above, a description was given of the basic concept of modification processing carried out in the list presentation section 140. However, herein, a description is given of a detailed configuration of the list presentation section 140 and the operation thereof. FIG. 12 is a block diagram showing an internal configuration of the list presentation section 140 shown in FIG. 1. As illustrated, the list presentation section 140 is composed of a retrieval result storage section 141, a correction processing section 142, a table storage section 143, a correction result storage section 144 and a list transmission section 145.

The retrieval result storage section 141 is a component in which the retrieval result delivered from the retrieval executing section 120 is stored. As has already been described in Section 1, showing an example of FIG. 5, the retrieval result delivered from the retrieval executing section 120 is made into information in which the information identification code of a retrieved provision information file is matched with the degree of accordance showing the degree of accordance of the corresponding provision information file.

The table storage section 143 is a component in which the interest degree table described in Section 2 is stored. The interest degree table is a table in which a map is divided into a plurality of zonal areas and degrees of interest corresponding to respective store genres are accommodated for each of the unit sections set for individual time periods in individual zonal areas. Here, the [degree of interest] is a numerical value showing the degree of interest of a number of users with respect to respective genres under a specified condition of existing in a specified zonal area at a specified time period as described above, and the degrees of interest may be obtained by investigating the past behaviors for a number of users. Here, the interest degree table having such unit sections as shown in FIG. 9 is stored in the table storage section 143, and the degrees of interest are accommodated by percentage in the individual store genres for each of the store genres (four genres of Eat, Buy, See, and Play) of major classification as illustrated in FIG. 10.

When such a retrieval result (information in which the information identification codes and the degrees of accordance are matched with each other) as shown in FIG. 5 are delivered from the retrieval executing section 120 to the retrieval result storage section 141, the correction processing section 142 recognizes the degrees of interest for respective store genres, which are set for unit sections corresponding to the present point in time in connection with a zonal area including the position shown by the terminal position information, by referencing the interest degree table in the table storage section 143.

Here, for convenience of description, a case, is taken into consideration where a user existing in the zonal area 1A shown in FIG. 8 accesses the retrieval condition enter section 130 at time 14:25 on Sunday, using the mobile terminal device 10, and such a retrieval result as shown in FIG. 5 has been obtained by the retrieval executing section 120 as a result of having entered a specified keyword as a retrieval condition. As described above, such a retrieval result is delivered from the retrieval executing section 120 to the retrieval result storage section 141. On the other hand, as shown in the block diagram of FIG. 1, the terminal position information included in the retrieval condition transmitted from the mobile terminal device 10 is delivered from the retrieval condition enter section 130 to the list presentation section 140. In FIG. 12, the terminal position information given to the correction processing section 142 is information thus delivered from the retrieval condition enter section 130.

The correction processing section 142 is able to recognize the present position of the mobile terminal device 10 from which accessing was carried out, that is, the present position of an accessing user, based on the terminal position information, and can specify the zonal area including the corresponding present position. In the case of the above-described example, it is recognized that the present position of the accessing user is the zonal area 1A. On the other hand, the correction processing section 142 is able to recognize the days of the week and the time at the present moment by means of a clock function prepared in the system. In the case of the above-described example, the present time which is the time 14:25 on Sunday can be recognized.

Also, strictly speaking, since time is required more or less in the retrieval process by the retrieval executing section 120, a slight time lag is brought about until the retrieval result is delivered to the retrieval result storage section 141 after the user enters a retrieval condition in the mobile terminal device 10. The time recognized by the correction processing section 142 is not accurately coincident with the accessing time of the user. However, such a time lag does not constitute any problem in actual applications. However, where considerable time is required for a retrieval process by the retrieval executing section 120, the time at which the user accessed is also delivered from the retrieval condition enter section 130 to the list presentation section 140, wherein a problem of time lag can be solved if the correction processing section 142 executes the subsequent processes using the delivered time as the present time.

Here, the correction processing section 142 is able to recognize the degrees of interest for each of the store genres as shown in FIG. 10 by referencing the corresponding unit section [1A: Sunday 14] on the interest degree table shown in FIG. 9 based on the location of a user, which is the [zonal area 1A], and the present time which is [time 14:25 on Sunday]. Therefore, the correction processing section 142 carries out correction processing to obtain a corrected degree of accordance by correcting the [degree of accordance of respective provision information files] stored in the retrieval result storage section 141 using the degree of interest recognized in regard to the store genre pertaining to the corresponding provision information file. In detail, the corrected degree of accordance can be obtained by multiplying respective degrees of accordance stored in the retrieval result storage section 141 by the degree of interest.

FIG. 13 is a view showing a state where correction has been carried out using the degrees of interest shown in FIG. 10 with respect to the retrieval result shown in FIG. 5. The information identification codes shown in the first column of the table in FIG. 13 and the data of the degree of accordance shown in the second column are the data shown in table in FIG. 5, which correspond to each other.

Further, the data of degrees of interest shown in the third column of the table in FIG. 13 is obtained by referencing FIG. 10 using the data in the store genre code column of the table in FIG. 5. For example, the reason why the degree of interest of the first row of FIG. 13 is [20%] is that the store genre code of store information (provision information file) corresponding to the information identification code [DDD111111] is [eat] and the degree of interest for the genre [eat], which is obtained by referring to FIG. 10, is [20%].

And, the data of corrected degrees of accordance shown in the fourth column of the table in FIG. 13 is obtained by multiplying the data of the degree of accordance of the second column by the data of the degree of interest of the third column thereof. For example, the corrected degree of accordance [17.0] of the first row of FIG. 13 can be calculated by multiplying the degree of accordance [85] by the degree of interest [20%], and the corrected degree of accordance [47.4] of the second row can be calculated by multiplying the degree of accordance [79] by the degree of interest [60%].

After having calculated the corrected degree of accordance by executing the above-described correction processing for respective degrees of accordance in the retrieval result stored in the retrieval result storage section 141, the correction processing section 142 stores information, in which the degree of accordance is displaced by the corrected degree of accordance, in the correction result storage section 144. Therefore, information in which the degrees of accordance in the retrieval result stored in the retrieval result storage section 141 are displaced by the corrected degrees of accordance will be stored in the correction result storage section 144.

The list transmission section 145 carries out a process of sorting information identification codes in descending order of corrected degrees of accordance based on the information stored in the correction result storage section 144, creating a list in which the headers of the store information are arranged in a sorted order, and transmitting the list to the mobile terminal device 10. The headers of respective store information posted in the list can be obtained by investigating respective provision information files stored in the provision information file storage section 100 using the [information identification codes]. That is, the list transmission section 145 may create a list by arranging the character strings of the header lines in the corresponding store information main data D1 in a sorted order (as a matter of course, the character strings of the headers may be prepared in the metadata D2). FIG. 14 shows a state where the corrected retrieval results stored in the correction result storage section 144 are sorted in descending order of corrected degrees of accordance. FIG. 15 is a view showing a state where the list in which the headers of store information are arranged in a sorted order is displayed on the screen of the mobile terminal device 10.

That is, the header [Asian shop] in the list shown in FIG. 15 is a header of the provision information file (the file in the first rank in FIG. 14) shown by the information identification code [DDD222222], the header [Tropical furniture] is a header of the provision information file (the file in the second rank in FIG. 14) shown by the information identification code [DDD444444], the header [Indian restaurant: XXX in Tokyo] is a header of the provision information file (the file in the third rank in FIG. 14) shown in the information identification code [DDD111111], the header [Curry shop: YYY] is a header of the provision information file (the file in the fourth rank in FIG. 14) shown by the information identification code [DDD666666], the header [Buddhist art Gandhara] is a header of the provision information file (the file in the fifth rank in FIG. 14) shown by the information identification code [DDD555555], and the header [Ethnic land ZZZ] is a header of the provision information file (the file in the sixth rank in FIG. 14) shown by the information identification code [DDD333333].

As has been described in Section 1, if the list presentation section 140 creates a list of provision information files by arranging the retrieval results shown in FIG. 5 in the order as they are, such a list as shown in FIG. 6 may be obtained. However, as described above, since, in actual applications, the list presentation section 140 creates a list in which the retrieval results shown in FIG. 5 are sorted in descending order of corrected degrees of accordance after the correction is carried out as shown in FIG. 14, a list shown in FIG. 6 will not be presented, but a list shown in FIG. 15 will be presented on the screen of the mobile terminal device 10.

Here, as a user gives a selection instruction for selecting one item in the list shown in FIG. 15, the selection instruction is transmitted from the mobile terminal device 10 to the information distribution section 110, and the information distribution section 110 reads out the store information main data in the provision information file related to the corresponding selection instruction from the provision information file storage section 100 and distributes the data to the mobile terminal device 10. This is the same as has already been described in Section 1. For example, if a user operates and clicks the character string portion [Indian restaurant: XXX in Tokyo] while looking at the list, shown in FIG. 15, displayed on the mobile terminal device 10, the store information main data D1 in the provision information file F1 is distributed to the mobile terminal device 10, and such display as shown in FIG. 7 appears on the display screen.

Thus, the modification processing carried out in the list presentation section 140 is modification in regard to the display order (the priority order presented to the user) of retrieval results delivered from the retrieval executing section 120, and can be said to be a process for replacing the posting order of the headers of retrieved store information. Actually, if the retrieval result shown in FIG. 5 is compared with the corrected retrieval result shown in FIG. 14, both differ from each other only in that the [degrees of accordance] of the former are displaced by the [corrected degrees of accordance] of the latter and that the latter is sorted in descending order of [corrected degrees of accordance] although the former is sorted in descending order of [degrees of accordance]. And, if the list shown in FIG. 6 is compared with the list shown in FIG. 15, both differ from each other only in the display order of respective headers.

Thus, the essential feature of the present invention is to appropriately modify the display order of the headers corresponding to the present individual situations of a user when listing and displaying the retrieval results on a list. For example, the retrieval result shown in FIG. 5 is the result of having sorted respective store information in descending order of degrees of accordance regardless of the store genre codes. However, if such retrieval is carried out at the time of 14:25 on Sunday by a user existing in the zonal area 1A, the degrees of interest of the corresponding user for each of the genres will be distributed as shown in FIG. 10. That is, although the probability that the behavior which the corresponding user plans to carry out from now is [eat] is only 20%, the probability that the behavior which the user plans to carry out is [buy] is 60%.

Accordingly, in the present invention, modification by which store information regarding the genre [buy] is presented with further priority is carried out by taking such degrees of interest for each of the genres into consideration. In detail, as shown in FIG. 13, such adjustment is carried out in which the corrected degree of accordance is calculated by multiplying the degree of accordance pertaining to the store information regarding the genre [buy] by the degree of interest [60%], and the corrected degree of accordance is calculated by multiplying the degree of accordance pertaining to the store information regarding the genre [eat] by the degree of interest [20%]. As a result, in the corrected retrieval result shown in FIG. 14, the rank of the store information of the genre [buy] is relatively further improved than the rank of the store information of the genre [eat], wherein the header of the store information regarding the genre [buy] will be displayed in a higher rank in the list shown in FIG. 15.

Herein, since a description was given taking a ranking modification process in regard to the retrieval result up to the sixth rank as an example for convenience, it seems that there is no large difference in view of a presentation effect to users when the list shown in FIG. 6 is compared with the list shown in FIG. 15. However, actually, since a further plurality of store information will be presented as the retrieval result, the presentation order of the header on the list becomes a factor that greatly influences the convenience of users. For example, where the headers of store information covering 100 stores in all are displayed on a list, whether or not a specified store ranks in the higher tenth order will greatly change a possibility to give a selection instruction to users with respect to the corresponding store information.

In particular, since the display screen of the mobile terminal device 10 has generally only a small display area, the number of headers which can be displayed on one page of the screen is restricted. Therefore, it is necessary for a user to scroll or turn the pages in order to display headers which have lower priority orders for presentation. Therefore, actually, users are likely to give a selection instruction only in the headers having higher priority orders for presentation. Based on such a reason, it is extremely important to predict a behavior pattern of a user based on the situations of the user at individual points in time and to present with priority the store information coincident with an estimated behavior genre which the user plans to conduct from now.

Also, the information regarding the ranking shown in the first column of the table of FIG. 5 and the table of FIG. 14 shows the sorting order for convenience of description. It is not necessary to have the retrieval result to contain the information of the [ranking]. Also, since the information regarding the [store genre codes] shown in the fourth column of the table of FIG. 5 and the table of FIG. 14 can be recognized by investigating the metadata of respective provision information files stored in the provision information file storage section 100 by using the [information identification codes], it is not requisite to have the retrieval result to contain the information of [store genre codes]. When carrying out the present invention, requisite information provided as the retrieval result is only the information identification codes and the degrees of accordance.

<<<Section 4>>>
Embodiment Having Interest Degree Table Creating Function

As has already been described in Section 3, an interest degree table in which degrees of interest for respective store genres are recorded is prepared in advance, for example, in regard to a unit section as shown in FIG. 9 in the table storage section 143 in the list presentation section 140 shown in FIG. 12. And, the correction processing section 142 carries out correction in regard to the degree of accordance in the retrieval result using the degree of interest recorded in the interest degree table. Therefore, the interest degree table will assume a remarkably important function in the present invention.

The degrees of interest recorded in the interest degree table are statistical information obtained based on past behaviors for a number of users, which statistically show which genre a user existing in a specified zonal area in a specified time period is interested in. Therefore, in order to obtain a degree of interest with respect to respective unit sections in the interest degree table, it is necessary to survey behaviors of a number of users and to statistically analyze the behaviors. Although such a survey can be carried out by a method such as a questionnaire survey, significant cost and time are required to conduct such a survey, using manpower.

Also, it is predicted that the degree of interest of respective unit sections changes in line with the elapse of time. For example, where a large commercial facility is opened in a specified zonal area, it is predicted that the degrees of interest in respective genres in the corresponding zonal area will change. Therefore, it is necessary that the description of the interest degree table is updated by the result of the newest survey being reflected therein for a predetermined period of time (for example, three months) in actual applications.

Figure 16:
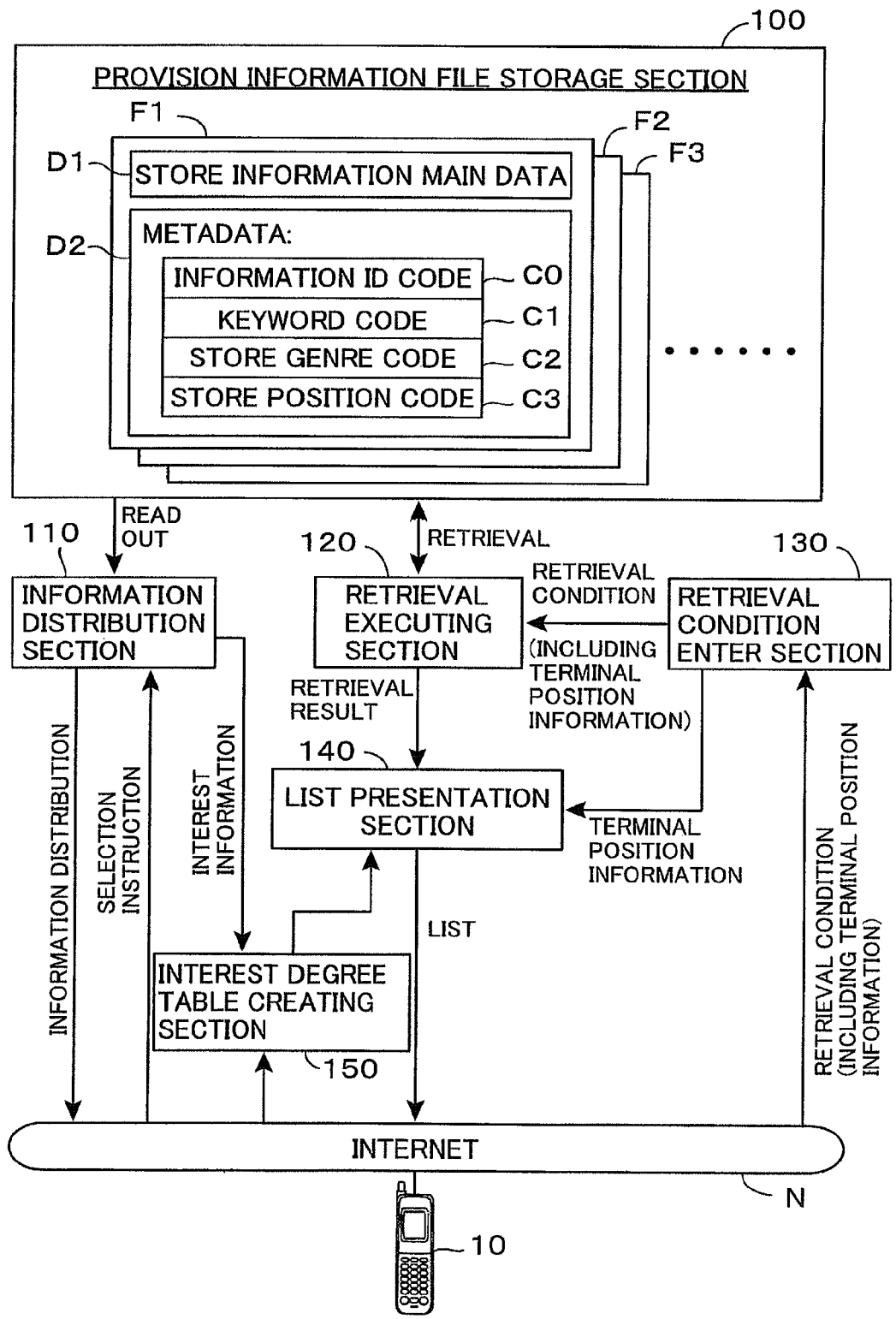
FIG. 16 is a block diagram showing a configuration of an information providing system according to an embodiment having a function for automatically creating an interest degree table.

In order to deal with such a challenge, the system itself may be provided with an automatic creation function of the interest degree table. FIG. 16 is a block diagram of an embodiment having such a function for creating interest degree tables. The embodiment differs from the basic embodiment shown in FIG. 1 only in that an interest degree table creating section 150 is newly added thereto.

The interest degree table creating section 150 has a function for newly creating an interest degree table based on the information obtained from mobile terminal devices 10 which a number of users hold, and updating the interest degree table in the table storage section 143. Also, a default interest degree table in which arbitrary degrees of interest (for example, a value of 50% for each of the store genres) are set is stored in the system when the system is introduced at initialization, and the operation is commenced, wherein provision operation may be carried out until the interest degree table creating section 150 updates the table. In the case of the embodiment described herein, the interest degree table creating section 150 has a function for creating two types of interest degree tables based on two types of algorithms. Hereinafter, a description is given of two types of algorithms in order.

<Section 4-1>
Plan Scheduling Interest Degree Table

The first algorithm adopts a method for determining the degrees of interest for each of the genres in the respective unit sections in view of [to what genres individual users schedule plans of behaviors belong]. Here, the interest degree table created by the first algorithm is called [plan scheduling interest degree table].

Figure 17:
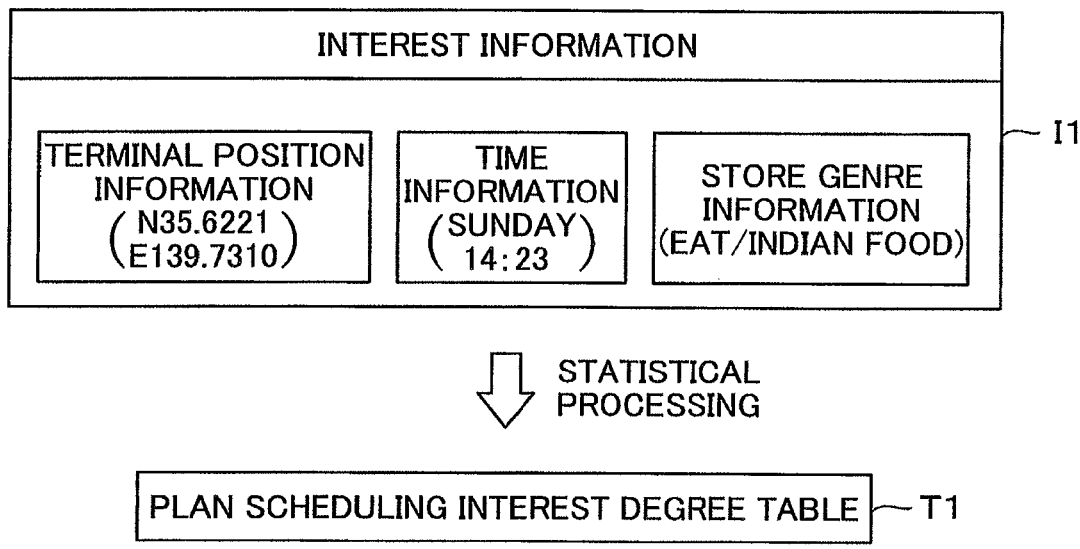
FIG. 17 is a block diagram showing a principle for creating a plan scheduling interest degree table.

FIG. 17 is a block diagram showing the operation principle of the plan scheduling interest degree table. As illustrated, the plan scheduling interest degree table T1 may be created by executing a statistical processing with respect to a plurality of interest information I1. As illustrated, the interest information I1 is information composed of terminal position information, time information, and store genre information, which is delivered from the information distribution section 110 to the interest degree table creating section 150.

In the embodiment shown here, the information distribution section 110 has a function for delivering the interest information I1, which includes the terminal position information of the corresponding mobile terminal device 10, the time information showing the point in time when a selection instruction is received, and the store genre information showing a store genre of the provision information file pertaining to the corresponding selection instruction, to the interest degree table creating section 150 when receiving the selection instruction from the mobile terminal device 10. The interest information I1 shown in FIG. 17 is the information thus delivered from the information distribution section 110 to the interest degree table creating section 150.

The details until delivering such interest information I1 is as follows; for example, it is assumed that a user existing in a predetermined zonal area accesses the retrieval condition enter section 130 by using the mobile terminal device 10, and enters a certain retrieval condition. In this case, as has already been described, the retrieval executing section 120 carries out retrieval, the retrieval result is delivered to the list presentation section 140, and a list shown in, for example, FIG. 15 is presented on the display screen of the mobile terminal device 10.

Here, a user gives a selection instruction for selecting the store information regarding an Indian restaurant, which is [XXX in Tokyo] presented on the third line of the list, the corresponding selection instruction is transmitted to the information distribution section 110. The information distribution section 110 reads out the store information main data D1 in the corresponding provision information file F1 from the provision information file storage section 100 based on the corresponding selection instruction, and distributes it to the mobile terminal device 10. As a result, such store information as shown in FIG. 7 is displayed on the display screen of the mobile terminal device 10. At this time, the information distribution section 110 distributes information to the mobile terminal device 10 and simultaneously carries out a process of delivering the interest information I1 shown in FIG. 17 to the interest degree table creating section 150.

The terminal position information in the interest information I1 is the information on latitude and longitude which is [N35.6221, E139.7310] in the illustrated example, and the information shows the position of the mobile terminal device 10 at the present time (the time when a selection instruction is transmitted). Such terminal position information may be transmitted along with transmitting a selection instruction from the mobile terminal device 10 to the information distribution section 110. As described above, since the mobile terminal device 10 has a GPS function, the mobile terminal device 10 is able to automatically transmit the information on latitude and longitude recognized by the GPS function to the information distribution section 110 when transmitting the selection instruction.

In addition, in a utilization environment where the difference between the time at which a user transmits a retrieval condition to the retrieval condition enter section 130 and the time when the user transmits a selection instruction to the information distribution section 110 based on the list presented based on the corresponding retrieval condition is presumed to be comparatively slight, the terminal position information (that is, the terminal position information contained in the retrieval condition) entered in the retrieval condition enter section 130 may be used, as it is, as the terminal position information in the interest information I1.

In the illustrated example, although the time information in the interest information I1 is information including the day of the week, which is [Sunday 14:23], this is because, in the case of the embodiment described here, the time period of the interest degree table is composed of time periods for each of the days of the week as in the example shown in FIG. 9. The time information basically shows the time when a user transmits a selection instruction to the information distribution section 110. However, in the case of a utilization environment where a difference between the time when the user transmits a retrieval condition and the time when the user transmits a selection instruction in regard to the list presented based on the corresponding retrieval condition is presumed to be comparatively slight, the time when the retrieval condition is transmitted may be used instead of the time when the selection instruction is transmitted.

The store genre information in the interest information I1 is made into information which is [eat/Indian food] in the illustrated example. This is the information obtained by reading out the store genre code C2 in the metadata D2 of the provision information file F1 that becomes, an object to be distributed, as it is. As in the example shown in FIG. 11, in order to create an interest degree table in which the degrees of interest about the store genres of minor classification are accommodated, it becomes necessary to provide store genres of minor classification in the interest information I1. However, as in the example shown in FIG. 10, in the case of creating an interest degree table in which degrees of interest about store genres of major classification are accommodated, it is sufficient that the store genre codes of major classification, which is [eat], is prepared in the interest information I1.

Here, a detailed meaning that the interest information I1 shown in FIG. 17 shows the fact that a user existing in a zonal area [N35.6221, E139.7310] has requested distribution of specified store information belonging to the store genre which is [eat/Indian food] at [14:23 on Sunday]. Based on a user having requested such distribution, it can be estimated that the corresponding user at the time is interested in a store belonging to the store genre which is [eat/Indian food], and the user is scheduling a plan to utilize a store belonging to the genre. Therefore, in the case where the interest information I1 as shown in FIG. 17 is given, the interest degree table creating section 150 gives one point to the store genre which is [eat/Indian food] with respect to a unit section [1A: Sunday 14].

However, even if the time when a user transmits a retrieval condition or the time when the user transmits a selection instruction in regard to the list presented based on the corresponding retrieval condition is adopted as the time information in the interest information I1, either of the time shows the point in time when the user schedules a plan of a behavior to be conducted from now. The time does not show the point in time when the behavior is being conducted (for example, in the case of genre [eat], the time in which the user is eating in a restaurant). In other words, the time when the behavior is conducted will be delayed by a predetermined duration of time from the time information in the interest information I1.

Accordingly, when carrying out statistical processing for the interest information I1, instead of tabulating the interest information in the unit section of a time period to which the time shown by the time information belongs, it would be reasonable to tabulate it in the unit section coming later (a future time period on the time axis) taking such a delay time into consideration. For example, in the case where the interest information I1 as shown in FIG. 17 is given, information would be tabulated for the time period [1A: Sunday 15] positioned next on the time axis instead of tabulating with respect to the unit section [1A: Sunday 14]. That is, one point is given to the store genre, which is [eat/Indian food], in the unit section [1A: Sunday 15]. Consequently, the time which is [Sunday 14:23] in the interest information I1 shown in FIG. 17 is considered to be the time at which a user is thinking of use of (is scheduling a plan) stores belonging to the store genre which is [eat/Indian food], and it is presumed that the time period in which the corresponding user actually utilized the store is not [14:00 through 15:00 on Sunday] but is [15:00 through 16:00 on Sunday]. In summary, the time during which a user actually uses a store can be predicted from the time information contained in the interest information I1, wherein the corresponding interest information I1 is statistically processed for the unit section to which the corresponding prediction time belongs. Such an operation is remarkably effective in the case where the unit of division of the time period is a 10-minute unit, that is, where the time period is comparatively small.

Now, actually, there are a great number (for example, several thousands through several tens of thousands) of users who use the present system with the mobile terminal device 10. Furthermore, whenever a number of users click the header of desired store information in the list, the interest information I1 as shown in FIG. 17 is delivered to the interest degree table creating section 150. Therefore, interest information I1 which is sufficient for statistical processing can be collected in the interest degree table creating section 150. Thus, total values of respective points are obtained for respective store genres in individual unit sections, which compose the interest degree table shown in FIG. 9, and the corresponding total values may be used as the values of the degrees of interest as they are. Thus, since the interest degree table thus created shows the degrees of interest pertaining to scheduling of plans by a number of users, the table is here referred to as a [plan scheduling interest degree table T1] as described above.

In order to tabulate such points, it is sufficient that the interest degree table creating section 150 is provided with a function for tabulating the frequency at which users are interested in the respective store genres. That is, when the interest information I1 as shown in FIG. 17 is delivered from the information distribution section 110, it is recorded that, using the terminal position information, time information and store genre information contained in the interest information I1, users are interested in store genres shown in the store genre information with respect to the unit sections corresponding to the time information about zonal areas including the position shown by the terminal position information, and the frequencies (the above-described points) which users are interested in respective store genres are tabulated, wherein a plan scheduling interest degree table may be created based on the tabulated result thus obtained.

Also, it is preferable that, in actual applications, points are tabulated with respect to a plurality of interest information I1 collected for a predetermined period of time (for example, one month), and a plan scheduling interest degree table is created by using the values, in which respective tabulated values are standardized, as the degrees of interest. For example, the example shown in FIG. 10 is such that the values are standardized so that the sum of the degrees of interest of all the store genres in a single unit section become 100%.

The plan scheduling interest degree table having such content as shown in FIG. 10 has been created by statistical processing based on the fact that, among selection instructions which a number of users existing in the [zonal area 1A] at the [time period of 14:00 through 15:00 on Sunday] carry out with respect to the information distribution section 110, 20% thereof are requests to distribute store information belonging to the genre [eat], 60% thereof are requests to distribute store information belonging to the genre [buy], 15% thereof are requests to distribute store information belonging to the genre [see], and 5% thereof are requests to distribute store information belonging to the genre [play].

<Section 4-2>
Visit and Utilization Interest Degree Table

The second algorithm is a method for determining the degrees of interest for each of the genres with respect to respective unit sections in view [to what types of genres individual users have visited and utilized stores belong]. Therefore, the interest degree table created by the second algorithm is herein referred to as a [visit and utilization interest degree table].

For example, if it is possible to grasp the fact of to which genre a number of users existing in [zonal area 1A] at the [time period of 14:00 through 15:00 on Sunday] having actually utilized stores belong, it is possible to obtain the degrees of interest for each of the store genres with respect to the unit section [1A: Sunday 14] by collecting a number of such facts and applying the same to statistical processing. If there is a fact that a user has actually visited a specified store and has utilized the corresponding store, it is obvious that the corresponding user is interested in the genre of the corresponding store.

However, it is very difficult to automatically collect facts about which stores individual users have actually visited or which stores they have actually utilized. Therefore, in the embodiment described herein, such a method is adopted which quantitatively evaluates possibilities for users to drop in individual stores existing in the peripheries of the corresponding moving routes by analyzing the moving routes of individual users. For example, if possibilities for a number of users existing in the [zonal area 1A] in the [time period of 14:00 through 15:00 on Sunday] to drop in store S1, possibilities to drop in store S2, possibilities to drop in store S3, etc., can be numerically evaluated respectively, it is possible to obtain the degrees of interest for each of the store genres with respect to unit section which is [1A: Sunday 14] by tabulating the evaluation values. The degrees of interest thus obtained show possibilities for users to visit and to utilize stores belonging to the corresponding genre.

Figure 18:
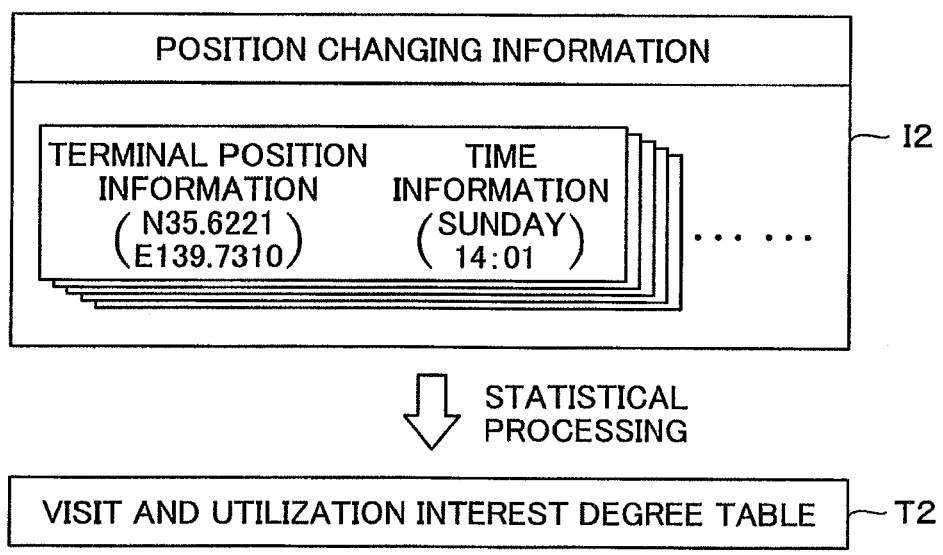
FIG. 18 is a block diagram showing a principle for creating an interest degree table for visit and utilization.

FIG. 18 is a block diagram showing a creation principle of the visit and utilization interest degree table. As illustrated, the visit and utilization interest degree table T2 can be created by statistically processing a plurality of position changing information I2. The position changing information I2 is information showing changes in position for each of predetermined sample times of a specified mobile terminal device. As illustrated, the position changing information I2 is composed of data in which the terminal position information and time information are listed. The mobile terminal device 10 has a GPS function and is able to recognize the self position at an arbitrary time as the information on latitude and longitude. Therefore, the mobile terminal device 10 is provided with a function for recording the terminal position information once every predetermined sample time. By doing this, position changing information I2 as shown in FIG. 18 will be created in the mobile terminal device 10. For example, if the sample time is set to a one-minute cycle, the terminal position information which is composed of the position at 14:01, the position at 14:02, the position at 14:03, etc., is recorded in the mobile terminal device 10 together with the time information. As a matter of course, if the cycle of the sample time is available in terms of the function of GPS, it is possible that the sample time is set to, for example, a more detailed time such as an 8-second cycle, etc.

The position changing information I2 thus created is transmitted to the interest degree table creating section 150 at a predetermined timing. For example, if the timing is set so that the transmission is carried out once every 24 hours, the position changing information equivalent to 24 hours, which is composed of data including the position at 0:00, the position at 0:01, the position at 0:02, . . . the position at 23:58, the position at 23:59, is transmitted to the interest degree table creating section 150 everyday. Accordingly, the position changing information I2 transmitted from a number of users for one month becomes sufficient for statistical processing, and the interest degree table creating section 150 can create the visit and utilization interest degree table T2 by statistical processing based on the information.

Continuously, a description is given of an algorithm for creating the visit and utilization interest degree table T2 based on the position changing information I2. As described above, since the position changing information I2 shows changes in position for each of the predetermined sample times (in the case of the embodiment described here, once every one minute) of a specified mobile terminal device, it is possible to recognize the passing points on the moving routes of the individual mobile terminal devices based on the information.

Figure 19:
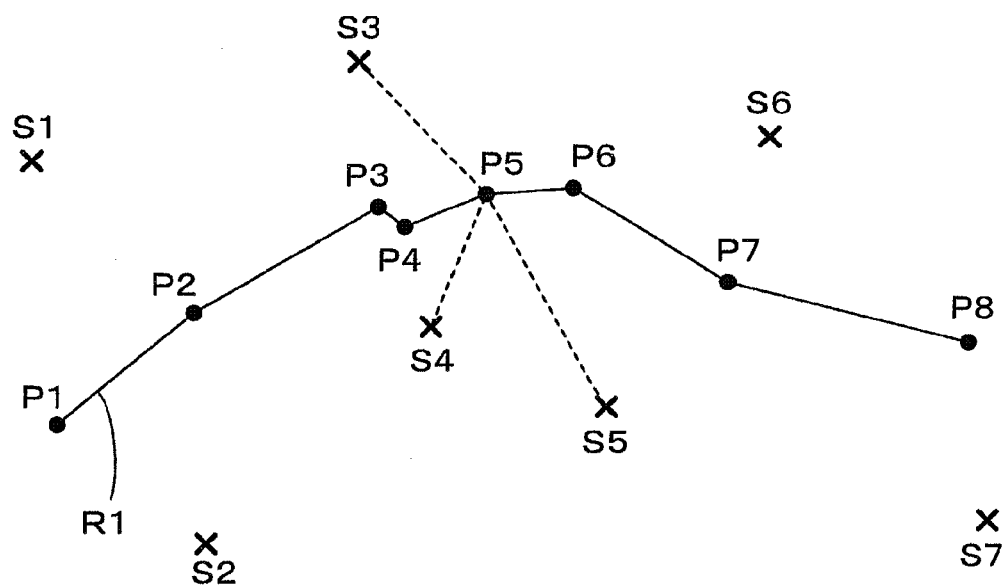
FIG. 19 is a view showing one process of a procedure for creating the interest degree table for visit and utilization.

FIG. 19 is a plan view showing the moving route R1 thus recognized and the passing points P1 through P8. The positions of the passing points P1 through P8 shown by a black solid circle in the drawing are determined based on the terminal position information (the moving route information) contained in the position changing information I2. On the other hand, the moving route R1 shown by a solid line in the drawing shows straight lines obtained by connecting the respective passing points P1 through P8 to each other in the order of times shown by the time information contained in the position changing information I2. As a matter of course, since an actually moving route between two passing points adjacent to each other is not necessarily straight, the moving route R1 shown does not mean an accurate moving route of the mobile terminal device 10.

On the other hand, the respective points S1 through S7 shown by marking X in FIG. 19 show the positions of stores existing in the periphery of the moving route R1. The stores shown herein may be any type of store as long as the store genre and the store positions have already been known. However, in the case of the embodiment shown herein, the stores corresponding to the individual provision information files stored in the provision information file storage section 100 may be used as respective stores S1 through S7 shown by marking X. As shown in the block diagram of FIG. 16, since the store genre codes C2 and the store position codes C3 are included in the metadata D2 in the individual provision information files, it is possible to recognize the store genres and the positions thereof by referencing the metadata D2 if the stores correspond to the individual provision information files.

Now, as in the example shown in FIG. 19, by referencing the store position codes C3 in a plurality of provision information files stored in the provision information file storage section 100 after having recognized the passing points P1 through P8 based on the position changing information I2, the distances to the respective stores are calculated with respect to the respective passing points, and a predetermined number "m" of stores in the ascending order of distance are recognized as neighboring stores in regard to the corresponding passing point. Here, for convenience, a description is given here of an example in which the predetermined number "m" of stores is 3. Also, actually, it is not necessary to calculate the distances to all the stores with respect to one passing point, and it is preferable that the distance calculation for the stores considered to be located obviously far away is omitted.

FIG. 19 shows an example in which three neighboring stores S3, S4 and S5 are recognized in regard to the passing point P5. The distances between the passing point P5 and respective neighboring stores S3, S4 and S5 are given as the lengths shown by broken lines in the drawing, and can be calculated by geometrical calculation using the position information of the point P5 and the position information of the points S3, S4 and S5. In the case of the illustrated example, the store nearest to the passing point P5 is store S4, the store second nearest to the passing point P5 is store S3, and the store third nearest to the passing point P5 is store S5. Therefore, with respect to the passing point P5, the stores S3, S4 and S5 are recognized as the neighboring stores.

Figure 20:
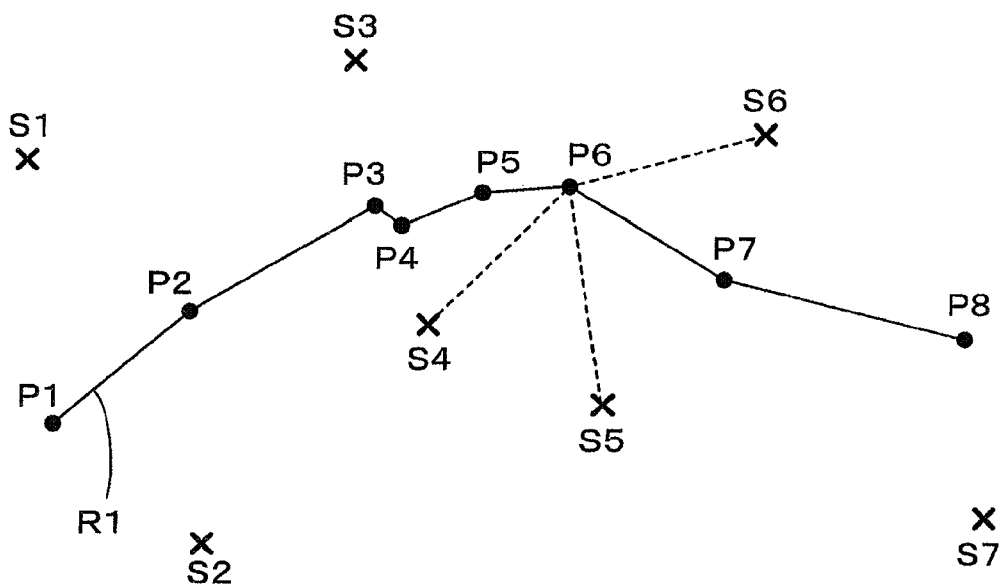
FIG. 20 is a view showing another process of the procedure for creating the interest degree table for visit and utilization.

As a matter of course, individually independent neighboring stores are obtained for each of the passing points. For example, FIG. 20 shows that the neighboring stores are stores S4, S5 and S6 with respect to the passing point P6. FIG. 21 is a table showing a list of the neighboring stores obtained with respect to the passing points P1 through P8. The table shows the passing time of the respective passing points (the time information included in the position changing information I2) along with the distances between the respective passing points and the respective neighboring stores. For example, in regard to the passing point P1, the table shows that the passing time is [14:01], the three neighboring stores are [S1, S2 and S4], and the distances between the passing point P1 and the respective neighboring stores S1, S2 and S4 are [40 m, 28 m and 56 m], respectively. Further, the example shows the distance calculated at an accuracy of meter units as an example. However, actually, the accuracy of the distance will be determined based on the position obtaining accuracy of GPS.

Looking at the table of FIG. 21, existence of the neighboring stores common to a plurality of passing points continued on the moving route R1 can be recognized. For example, the passing points P1 and P2 are continued to each other on the moving route R1. Here, the neighboring stores S1, S2 and S4 are common to these two passing points P1 and P2. Furthermore, paying attention to the passing points P1 through P3, the three passing points are also continued to each other on the moving route R1, wherein the neighboring store S4 is common to these three passing points P1 through P3. In fact, the store S4 is common to seven continuous passing points P1 through P7. Here, the neighboring stores thus common to continuous passing points on the moving route are called "common neighboring stores."

The table of FIG. 21 shows the neighboring stores directing attention to individual passing points. On the contrary, by directing attention to the individual neighboring stores, a table showing the passing points where the corresponding neighboring stores are made into the common neighboring stores is created. The table of FIG. 22 is a table in which attention is thus directed to the individual common neighboring stores, and can be created based on the table of FIG. 21. For example, in the table of FIG. 22, although two passing points P1 and P2 can be posted with respect to the common neighboring store S1, this means that, in the table of FIG. 21, the continued passing points for which S1 is made into the neighboring store are P1 and P2. Similarly, in the table of FIG. 22, seven passing points P1 through P7 are posted with respect to the common neighboring store S4. This means that, in the table of FIG. 21, the continued passing points for which S4 is made into the neighboring store are P1 through P7.

In addition, data in the column of time in the table of FIG. 22 shows the passing times at the respective passing points in the table of FIG. 21, and data in the column of distance in the table of FIG. 22 shows the distances between the respective passing points and the respective neighboring stores in the table of FIG. 21. Also, data in the column of staying coefficients in the table of FIG. 22 shows values of the staying coefficients obtained by calculations with respect to the respective common neighboring stores. Here, the staying coefficient for a specified common neighboring store is a value obtained by dividing the time (staying time) from the passing time of the first passing point to the passing time of the final passing point regarding the corresponding common neighboring store by the total of the distances to all the passing points from the first passing point to the final passing point regarding the corresponding common neighboring store.

For example, since the staying time regarding the common neighboring store S1 shown in the table of FIG. 22 is given as the time from the passing time [14:01] of the first passing point P1 to the passing time [14:02] of the final passing point P2, the staying time becomes 1 minute (=60 seconds). On the other hand, since the distance between the first passing point P1 and the common neighboring store S1 is 40 m, and the distance between the final passing point P2 and the common neighboring store S1 is 33 m, the [total of the distances to all the passing points from the first passing point to the final passing point regarding the common neighboring store S1] becomes 40 m+33 m. Therefore, the staying coefficient regarding the common neighboring store S1 is given as a value obtained by dividing the staying time 60 seconds by the total of the distances [40 m+33 m] [that is, 60/(40+33)].

Similarly, since the staying time regarding the common neighboring store S4 shown in the table in FIG. 22 is given as the time from the passing time [14:01] of the first passing point P1 to the passing time [14:07] of the final passing point P7, the staying time becomes 6 minutes (=360 seconds). On the other hand, since the distance between the first passing point P1 to the common neighboring store S4 is 56 m, the distance between the next passing point P2 and the common neighboring store S4 is 35 m, the distance between the next passing point P3 and the common neighboring store S4 is 20 m, the distance between the next passing point P4 and the common neighboring store S4 is 15 m, the distance between the next passing point P5 and the common neighboring store S4 is 22 m, the distance between the next passing point P6 and the common neighboring store S4 is 39 m, and the distance between the final passing point P7 and the common neighboring store S4 is 44 m, the [total of the distances from the first passing point to the final passing point regarding the common neighboring store S4] becomes 56 m+35 m+20 m+15 m+22 m+39 m+44 m. Therefore, the staying coefficient regarding the common neighboring store S4 is given as a value [360/(56+35+20+15+22+39+44), which is obtained by dividing the staying time 360 seconds by the total of the distances [56 m+35 m+20 m+15 m+22 m+39 m+44 m].

On the other hand, with respect to the common neighboring store S7 shown in the table of FIG. 22, since the passing point P8 is only one passing point, the time from the passing time [14:08] of the first passing point P8 to the passing time [14:08] of the final passing point P8 is 0, the staying time becomes 0. Thus, the staying coefficient of the common neighboring store the staying time of which becomes 0 is also 0. In actual applications, it is not necessary that the neighboring store which has only one passing point is handled as the common neighboring store.

Thus, where the numerator (staying time) to obtain the staying coefficient becomes 0, the staying coefficient becomes 0. However, where the denominator (the total of the distances) becomes 0, the staying coefficient becomes infinite. As a matter of course, theoretically, it does not matter that the range of the staying coefficient is defined to be 0 through infinity. However, in actual applications, there are many cases where calculations in which the denominator is 0 cannot be carried out by general computers. In order to solve such a problem, for example, where the upper limit value of the staying coefficient is determined in advance and the denominator (the total of the distances) becomes 0, the corresponding upper limit value may be handled as the staying coefficient.

Or, as another method to solve the above problem, the definition of the staying coefficient may be slightly modified. For example, the staying coefficient regarding a specified common neighboring store may be defined to be a value obtained by dividing the time (staying time) from the passing time of the first passing point to the passing time of the final passing point regarding the corresponding common neighboring store by a value which is obtained by adding a predetermined constant Δ to the total of the distances to all the passing points from the first passing point to the final passing point regarding the corresponding common neighboring store. If the predetermined constant Δ is set to a positive number which is not 0, the denominator of an expression to obtain the staying coefficient becomes Δ and does not become 0 even if the total of the distances is 0.

Further, herein, although the value of the staying coefficient is defined with the unit of the staying time based on seconds and with the unit of the distance based on meters, the units of the staying time and the distances may be arbitrarily set. The matter of defining the staying coefficient with any unit is merely a matter of scaling, and this is not an essential matter.

Herein, the meaning of the staying coefficient obtained with respect to the respective common neighboring stores is taken into consideration. As described above, the staying coefficient is a parameter defined as a value obtained by dividing the staying time by the total sum of the distances, and is given as a fraction expression using the staying time as a numerator and the total sum of the distances as a denominator. Therefore, the greater the staying time of the numerator becomes, the greater the staying coefficient becomes, and the greater the total sum of the distances which is the denominator becomes, the smaller the staying coefficient becomes. Such a parameter can be used as a parameter for quantitatively evaluating the possibilities for users to drop in common neighboring stores.

As a matter of course, the staying time that becomes a numerator of the fractional expression merely shows the time during which the corresponding store is recognized as a neighboring store. That is, it does not show that a user has actually stayed in the corresponding store. After all, the position changing information I2 is enumeration of the information on latitude and longitude for each of the sample times, and does not show the fact that a user has visited a specified store and has actually utilized the corresponding store. However, the longer the staying time which is calculated with respect to a specified store is, it is possible to judge that the possibility for the user to actually stay in the corresponding store is high. Accordingly, the staying time can be used as a quantitative value showing a possibility for a user to drop in the corresponding store. For example, in the case of the example shown in FIG. 22, since the staying time in store S4 is 360 seconds although the staying time in store S1 is 60 seconds, it can be presumed that the possibility for the user to have dropped in the store S4 is higher than the possibility to have dropped in the store S1.

On the other hand, the total sum of distances, which becomes the denominator of the fractional expression, shows how far the respective passing points are from the stores. The smaller the total sum of distances is, it can be judged that the possibility for a user to have actually stayed in the corresponding store is high. Therefore, the value can also be used as a quantitative value showing the possibility for the user to have dropped in the corresponding store. Since the positions of respective stores, which are utilized to obtain the distances, are positions of the representative points (for example, almost the middle point of the site of a store) shown by the information on latitude and longitude, the total sum of distances does not usually become 0 even if a user has actually dropped in the corresponding store. However, since it is considered that, if a user actually dropped in the corresponding store, the distance between the passing point obtained at respective sample times during the staying period of time and the corresponding store becomes remarkably small, the value of the fractional expression in which the total sum of the distances is the denominator can be utilized as a value to show the possibility to have dropped in the store. In other words, if the total sum of distances is large even if the staying time calculated in regard to a specified store is long, the staying coefficient in regard to the corresponding store becomes small. However, this is because the possibility for the user to have actually stayed not in the corresponding store but in a different place becomes high.

Figures 23, 24:
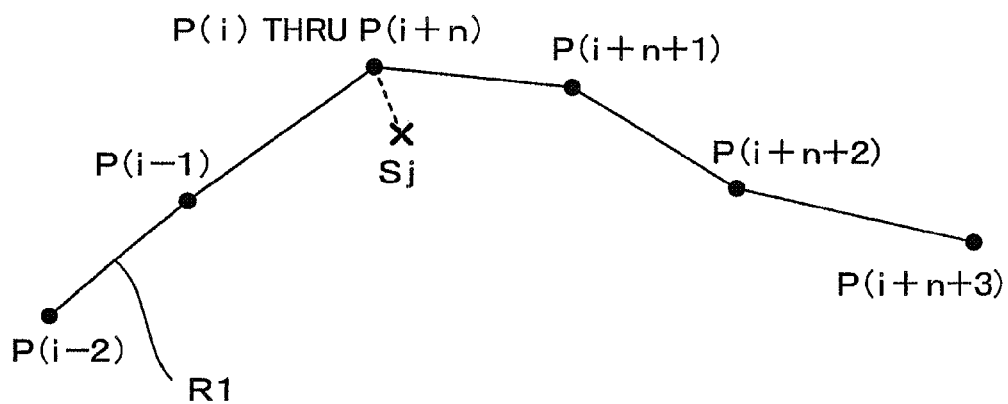
FIG. 23 is a plan view describing a general manner for obtaining staying coefficients of common neighboring stores.
FIG. 24 is a table showing a detailed manner for obtaining a staying coefficient of a common neighboring store Sj in the example shown in FIG. 23.

FIG. 23 is a plan view to describe a general manner for obtaining the staying coefficient with respect to common neighboring stores. The drawing shows an example in which the jth store Sj becomes a common neighboring store from the (i−2)th passing point P(i−2) on the moving route R1 to the (i+n+3)th passing point P(i+n+3). In the drawing, although (n+1) passing points P(i) through P(i+n) in total are shown by the same black solid circles, this is because they have the same information on latitude and longitude. Since the store Sj is a common neighboring store common to all the passing points P(i−2) through P(i+n+3) shown in FIG. 23, the store is a store the close order ranking of which is within m (in the case of the above example, m=3) in regard to any one of these passing points.

A change in position, which is shown in FIG. 23 is a typical example where a user actually utilized the store Sj. For example, where the store Sj is a restaurant, the information on latitude and longitude of point Sj in the drawing is registered as the store position code C3 of the corresponding store, and the position of a seat is a position of a black solid circle showing the passing points P(i) through P(i+n) in the drawing, if a user utilizes the restaurant, such position changing information as shown in the drawing will be obtained. If the passing times of the passing points P(i) through P(i+n) are times t(i) through t(i+n), the corresponding time is the period of time during which the user takes a meal in the restaurant.

FIG. 24 is a table showing a detailed method to obtain a staying coefficient of the common neighboring store Sj in the example shown in FIG. 23. The passing points P(i−2) through P(i+n+3) in the table show the respective passing points shown by black solid circles in FIG. 23. The times t(i−2) through t(i+n+3) in the table show the passing times at the respective passing points P(i−2) through P(i+n+3). Also, the distances L(i−2) through L(i+n+3) in the table show the distances between the respective passing points P(i−2) through P(i+n+3) and the common neighboring store Sj.

In the case of the example, since the passing time at the first passing point P(i−2) among a series of continued passing points regarding the common neighboring store Sj is t(i−2) and the passing time at the final passing point P(i+n+3) is t(i+n+3), the staying time is determined as t(i+n+3)−t(i−2). On the other hand, the total sum of the distances is determined as L(i−2)+L(i−1)+L(i)+ . . . +L(i+n+3). Finally, the staying coefficient at the store Sj is calculated by the fractional expression in the column on the right in the table in FIG. 24.

As described above, a description was given of a method for recognizing a common neighboring store based on a part of the moving route of a single user and calculating the staying coefficient in regard to the corresponding store. Usually, a plurality of common neighboring stores will be recognized based on the one-day moving route of a single user. Also, in some cases, there may be a case where the same store is recognized as the common neighboring store separately and independently in the morning and in the afternoon, respectively. The staying coefficient described above will be calculated with respect to individually common neighboring stores thus recognized. Calculation values of such a staying coefficient will be obtained for each of the moving routes of a number of users. Furthermore, the calculation values will be collected for the period of time, for example, 30 days.

Therefore, if the staying coefficients calculated with respect to individual common neighboring stores are tabulated as the degrees of interest for the store genres of the corresponding common neighboring stores with respect to a unit section corresponding to the staying time recognized in regard to the corresponding common neighboring stores about a zonal area including the position of the corresponding common neighboring stores, it is possible to create the visit and utilization interest degree table based on the tabulated result.

In detail, the respective staying coefficients shown in the column on the right in the table in FIG. 22 will be tabulated as follows. For example, the staying coefficient [60/(40+33)] for the common neighboring store S1 is tabulated as the degree of interest for the store genre of store S1 in regard to the unit section corresponding to the staying time: Sunday 14:01 through 14:02 for the zonal area including the position (the position shown by the store position code C3) of the store S1. In detail, if the store S1 is a movie theater belonging to the zonal area 1A, points of the staying coefficient [60/(40+33)] will be tabulated in regard to the store genre [see] of the unit section [1A: Sunday 14].

Similarly, the staying coefficient [360/(56+35+20+15+22+39+44)] in regard to the common neighboring store S4 will be tabulated as the degree of interest for the store genre of the store S4 with respect to the unit section corresponding to the staying time: Sunday 14:01 through 14:07 for the zonal area including the position of the store S4. In detail, if the store S4 is a restaurant belonging to the zonal area 1A, points of the staying coefficient [360/(56+35+20+15+22+39+44)] will be tabulated in regard to the store genre [eat] of the unit section [1A: Sunday 14].

If such tabulating is carried out in connection with a number of users for a predetermined period of time and the tabulated values (the total value of cumulatively tabulated points) for each of the unit sections are obtained, the visit and utilization interest degree table in which the corresponding tabulated values are made into the degrees of interest can be created. In actual applications, it is preferable that a visit and utilization interest degree table is created by using the values, in which respective tabulated values are standardized, as the degrees of interest. For example, FIG. 10 shows an example standardized so that the sum of degrees of interest of all the store genres in a single unit section becomes 100%.

The visit and utilization interest degree table having such a description as shown in FIG. 10 shows a result of estimation that, among stores which a number of users existing in the [zonal area 1A] in the [time period 14:00 through 15:00 on Sunday] are estimated to have actually visited and utilized, 20% thereof are stores belonging to the genre [eat], 60% thereof are stores belonging to the genre [buy], 15% thereof are stores belonging to the genre [see], and 5% thereof are stores belonging to the genre [play].

<Section 4-3>
Detailed Configuration of Interest Degree Table Creating Section

Figure 25:
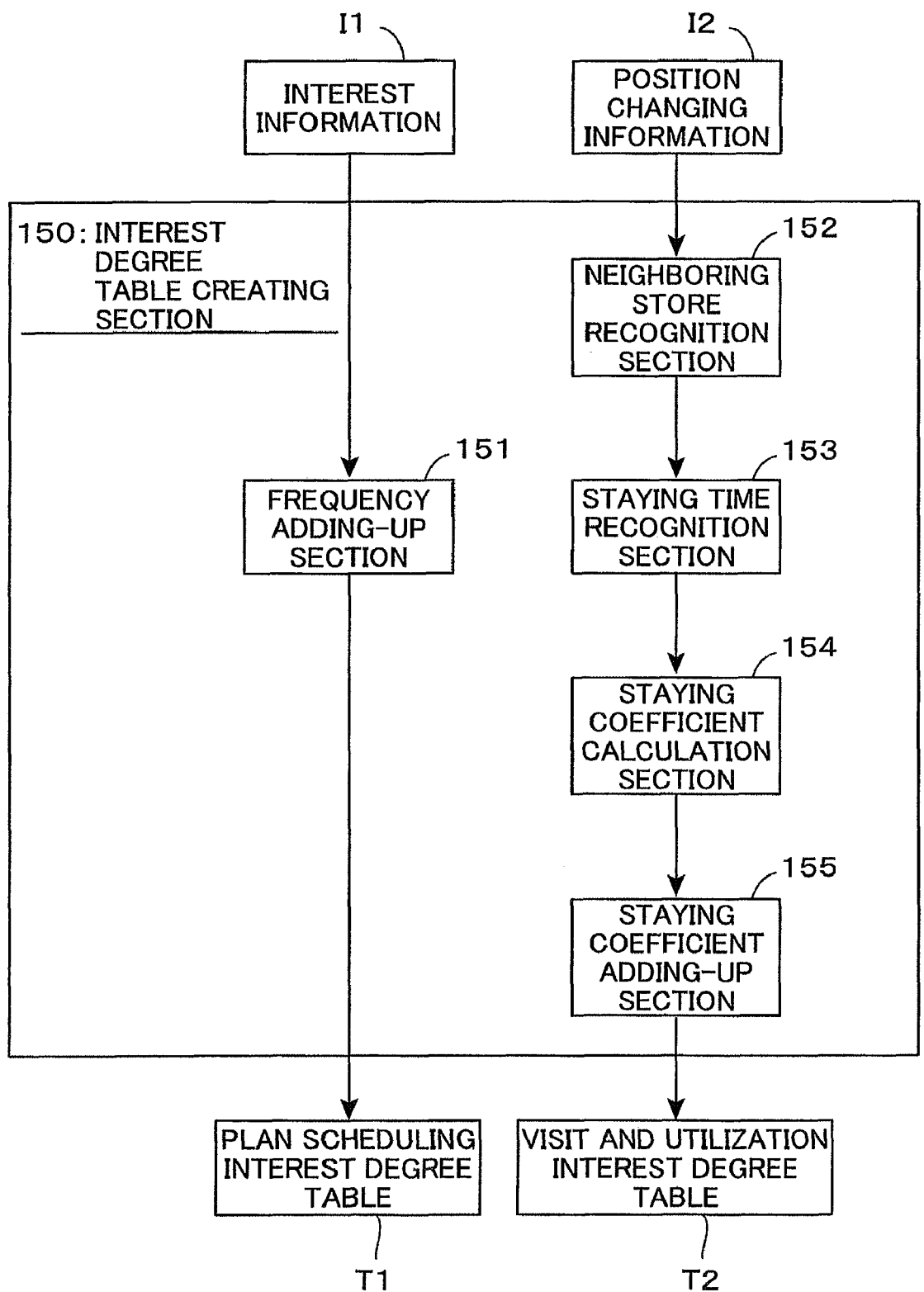
FIG. 25 is a block diagram showing an internal configuration of the interest degree table creating section 150 shown in FIG. 16.

Here, a description is given of the internal configuration and operations of the interest degree table creating section 150 shown in FIG. 16 with reference to the block diagram of FIG. 25. The interest degree creating section 150 shown here has a function of creating two types of interest degree tables which are the plan scheduling interest degree table T1 described in Section 4-1 and the visit and utilization interest degree table T2 described in Section 4-2.

A frequency adding-up section 151 shown in FIG. 25 is a component to create the plan scheduling interest degree table T1 based on the interest information I1 delivered from the information distribution section 110. That is, the frequency adding-up section 151 carries out a process of recording a fact, based on the interest information I1 as shown in FIG. 17, that a user has taken an interest in a store genre shown by the store genre information with respect to the unit section corresponding to the time information for the zonal area including the position shown by the terminal position information, adding-up the frequency of taking an interest in respective store genres with respect to individual unit sections, and creating a plan scheduling interest degree table based on the adding-up result. The detailed processing content thereof is as already described in Section 4-1.

On the other hand, the neighboring store recognition section 152, staying time recognition section 153, staying coefficient calculation section 154, and staying coefficient adding-up section 155, which are shown in FIG. 25, are components for creating the visit and utilization interest degree table T2 based on the position changing information I2 delivered from the respective mobile terminal devices 10.

First, the neighboring store recognition section 152 carries out a process of recognizing the passing points P on the moving route of individual mobile terminal devices 10 based on the position changing information I2 showing changes in position for each predetermined sample time of the individual mobile terminal devices 10, calculating the distances between the individual passing points P and the respective stores by referencing the store position code C3 in the provision information file stored in the provision information file storage section 100, and recognizing a predetermined number "m" of stores as the neighboring stores S regarding the corresponding passing point P in the ascending order of distance. For example, in the case of the examples shown in FIG. 19 and FIG. 20, neighboring stores as shown in the table of FIG. 21 are recognized for each of the passing points P1 through P8.

Next, the staying time recognition section 153 carries out a process of recognizing the time from the passing time of the first passing point to the passing time of the final passing point as the staying time with respect to common neighboring stores common to the continued passing points on the moving route. For example, in the case of the examples shown in FIG. 19 and FIG. 20, the staying time from the passing time of the first passing point to the passing time of the final passing point is obtained for respective common neighboring stores S1 through S7 as shown in the table of FIG. 22.

Here, the common neighboring stores are basically defined as neighboring stores common to "continued" passing points on a single moving route. Therefore, even if there are neighboring stores common to "intermittently continued" passing points on a single moving route, the corresponding neighboring stores are not recognized as the common neighboring stores with respect to these "intermittently continued" passing points. For example, in the example shown in FIG. 19, a case is taken into consideration where passing points P9, P10, P11 and P12 following the passing point P8 exist, and store S2 is included as one of the neighboring stores of the passing points P11 and P12.

In this case, although the store S2 is a neighboring store for the passing points P1, P2, P11 and P12, the store S2 does not become common neighboring stores with respect to the four passing points P1, P2, P11 and P12. Because, although the passing points P1 and P2 are "continued" passing points on the moving route, and the passing points P11 and P12 are "continued" passing points on the moving route, the passing points P2 and P11 are not continued to each other, and the four passing points of the passing points P1, P2, P11 and P12 are not the "continued" passing points on a single moving route. In such a case, the store S2 is recognized as the common neighboring store S2 with respect to the passing points P1 and P2, and is recognized as separate common neighboring stores S2 with respect to the passing points P11 and P12.

Indeed, in actual applications, it is preferable that comprehension of the condition "continued" is caused to have some allowance. For example, FIG. 23 shows an example that a user was taking a meal in the store Sj in the time period of t(i) through t(i+n). In the case of this example, originally, the store Sj becomes a neighboring store for all of the "continued" passing points P(i−2) through P(i+n+3) on the moving route, and the store Sj is expected to become a common neighboring store for the passing points P(i−2) through P(i+n+3). However, it is assumed that an error is brought about in acquisition of the information on latitude and longitude in regard to one point in the passing points P(i−2) through P(i+n+3) due to a certain cause, and the store Sj does not become the neighboring store for the passing point at which the corresponding error is brought about.

If the condition "continued" is strictly interpreted in this case, the store Sj does not become a common neighboring store for the passing points P(i−2) through P(i+n+3), and will be recognized as common neighboring stores separately independent from each other with respect to two groups of the passing points discontinued before and after the passing point where the error is brought about. Any serious trouble is not brought about even if the processing is carried out based on such recognition. However, in order to prevent processing based on such recognition, for example, even if continuity is interrupted for the passing points on the way, a case where the number of discontinued passing points is less than a predetermined number may be interpreted and processed as "continued."

Also, where a general GPS is used as the system for recognizing the position of a mobile terminal device, acquisition of position information is not appropriate indoors. Therefore, in the case of the example shown in FIG. 23, there is a possibility that the position information of the passing points P(i) through P(i+n) in the drawing cannot be acquired if the store Sj is an indoor restaurant. Thus, where information of the passing points is lost for a predetermined period of time, it may be determined based on the position information of the passing point immediately before the losing period and the position information of the passing point immediately after the losing period whether both are continued on the moving route. In detail, as shown in FIG. 23, where the passing point P(i−1) immediately before and the passing point P(i+n+1) immediately after are remarkably close to each other (for example, where the reference the "distance between both is less than 30 m" is satisfied), both the passing points P(i−1) and P(i+n+1) may be interpreted and handled to be continued on the moving route even if there are a number of passing points discontinued on the way (in the example of FIG. 23, the number is "n+1").

Next, the staying coefficient calculation section 154 shown in FIG. 25 carries out a process of obtaining the sum of the distances between the respective common neighboring stores and all the passing points from the first passing point to the final passing point, and calculating, as a staying coefficient, the value obtained by dividing the staying time obtained by the staying time recognition section 153 by the sum of the distances. For example, in the case of the examples shown in FIG. 19 and FIG. 20, the staying coefficients for the respective common neighboring stores are obtained by the fractional expressions as shown in the column on the right in the table in FIG. 22. Also, where the calculation is hindered when the sum of the distances become 0, the value obtained by dividing the staying time by the [value obtained by adding a predetermined constant Δ to the sum of the distances] may be made into the staying coefficient as described above.

The final staying coefficient adding-up section 155 carries out a process of adding-up the staying coefficients for individual common neighboring stores calculated by the staying coefficient calculation section 154 as the value showing the degree of interest with respect to the store genres of the corresponding common neighboring stores in regard to the unit sections corresponding to the staying times recognized for the corresponding common neighboring stores in connection to the zonal area including the positions of the corresponding common neighboring stores, and creates a visit and utilization interest degree table based on the adding-up result.

In addition, where the staying time includes the time period extending over a plurality of unit sections when carrying out a tabulating process, the partial staying coefficients, which are obtained by a proportional division in accordance with the overlapping degree of the staying time and the partial time period of individual unit sections, may be tabulated for each of the unit sections. For example, in the example shown in FIG. 22, the staying coefficient for store S4 is tabulated in the unit section of a time period including [14:01 through 14:07 on Sunday] being the staying time, that is, the time period [Sunday 14] (the time period of 14:00 through 15:00 on Sunday). Thus, where the staying time is contained in the time period of one unit section, the staying coefficient for the corresponding unit section may be tabulated.

However, where the staying time is, for example, [13:30 through 14:20 on Sunday], the staying time stretches over to two time periods [Sunday 13] and [Sunday 14]. In such a case, overlapping degrees of the staying time and the time periods of the individual unit sections are obtained, such that the overlapping is 30 minutes for the time period [Sunday 13], and is 20 minutes for the time period [Sunday 14]. Therefore, the staying coefficient which will be the subject to be tabulated is divided in accordance with 30:20, wherein a portion of 30/50 of the staying coefficient is tabulated for the unit section of the time period [Sunday 13], and a portion of 20/50 of the staying coefficient may be tabulated for the unit section of the time period [Sunday 14].

<Section 4-4>
Handling of a Plurality of Interest Degree Tables

Now, as shown in the block diagram of FIG. 25, in the case of the embodiment described here, the interest degree table creating section 150 has a function of creating two types of interest degree tables, which are a plan scheduling interest degree table T1 and a visit and utilization interest degree table T2. The respective interest degree tables T1 and T2 thus created will be stored in the table storage section 143 in the list presentation section 140 shown in FIG. 12, and will be utilized for correction processing of the degree of accordance by the correction processing section 142.

Thus, it is effective to obtain a corrected degree of accordance by storing a plurality of interest degree tables in the table storage section 143, causing the correction processing section 142 to recognize a plurality of degrees of interest by referencing the plurality of interest degree tables, and carrying out correction by using the plurality of degrees of interest recognized.

For example, in the case of the embodiment described herein, although the plan scheduling interest degree table T1 is a table in which degrees of interest of individual users are defined in view [to what types of genres individual users have scheduled plans about behaviors belong], the visit and utilization interest degree table T2 is a table in which the degrees of interest of individual users are defined in view of [to what types of genres the individual users have visited and utilized stores belong]. Thus, if a plurality of interest degree tables created based on different viewpoints are used, it becomes possible to define further appropriate degrees of interest, wherein it is possible to increase an effect to achieve an object of the present invention, which selects and provides information most suitable for users.

In order to obtain the corrected degree of accordance with reference to a plurality of interest degree tables, the correction processing section 142 sets weighting parameters in advance for each of the degrees of interest obtained from the respective interest degree tables, and may multiply the value, which is obtained by multiplying the respective degrees of interest by the weighting parameters, by the degrees of accordance.

Figure 26:
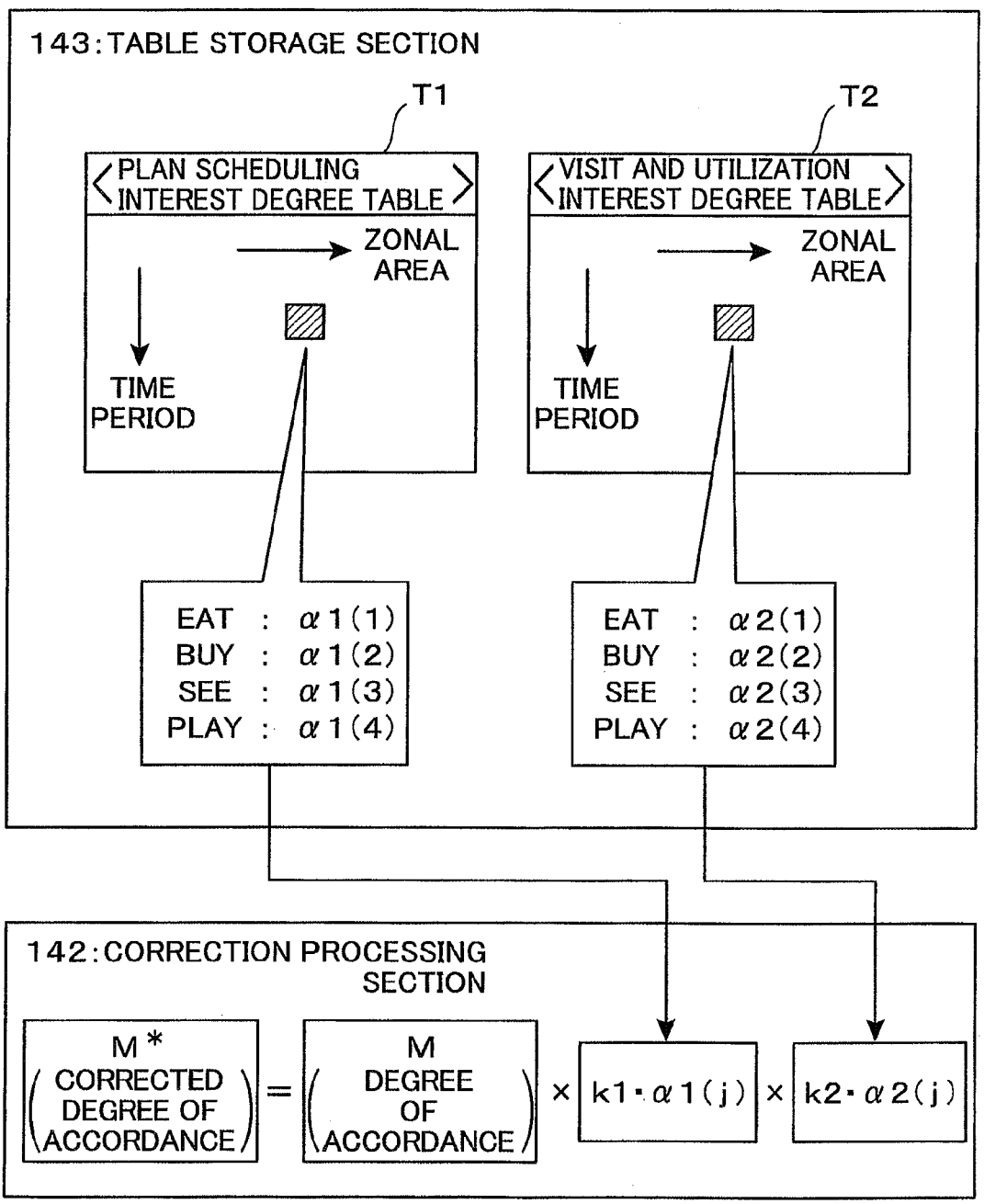
FIG. 26 is a block diagram showing one example of correction processing carried out in the list presentation section 140 shown in FIG. 16.

FIG. 26 is a block diagram showing one example of correction processing carried out in the list presentation section 140 based on such a direction. As illustrated, the plan scheduling interest degree table T1 and the visit and utilization interest degree table T2 are stored in the table storage section 143. In the respective tables T1 and T2, degrees of interest corresponding to the respective store genres are set in individual unit sections with the zonal areas set in the horizontal direction thereof and with the time period set in the vertical direction thereof. And, the tables T1 and T2 are updated once every predetermined period of time (for example, one month) by the interest degree table creating section 150.

Herein, it is assumed that the degree of interest set in the plan scheduling interest degree table T1 is a 1, and the degree of interest set in the visit and utilization interest table T2 is a 2. In the drawing, the hatched portion in the respective interest degree tables T1 and T2 is a single unit section in the respective tables. In respective unit sections in the plan scheduling interest degree table T1, the degree of interest $\alpha 1(1)$ of the genre [eat], the degree of interest $\alpha 1(2)$ of the genre [buy], the degree of interest $\alpha 1(3)$ of the genre [see], and the degree of interest $\alpha 1(4)$ of the genre [play] are set as illustrated. Similarly, in respective unit sections of the visit and utilization interest degree table T2, the degree of interest $\alpha 2(1)$ of the genre [eat], the degree of interest $\alpha 2(2)$ of the genre [buy], the degree of interest $\alpha 2(3)$ of the genre [see], and the degree of interest $\alpha 2(4)$ of the genre [play] are set as illustrated. Here, although the degrees of interest are set for the genres of the major classification, it does not matter that the degrees of interest for the genres of the minor classification are set.

Now, as has already been described in Section 3, the correction processing section 142 recognizes the degrees of interest in regard to the respective store genres set for the unit sections corresponding to the present point in time for the zonal area including the position shown by the terminal position information by referencing the interest degree tables, and carries out a process to obtain a corrected degree of accordance by correcting the [degree of accordance of the respective provision information files] stored in the retrieval result storage section 141 by using the degrees of interest recognized in regard to the store genres pertaining to the corresponding provision information files. In the case of the embodiment shown in FIG. 26, the correction processing section 142 will recognize the respective degrees of interest for the corresponding genres set in the corresponding unit section.

For example, where the store genre of the provision information file which is the object to be corrected for the degree of accordance M is the jth genre, the correction processing section 142 reads out the degree of interest $\alpha 1(j)$ from the corresponding unit section of the plan scheduling interest degree table T1, and reads out the degree of interest $\alpha 2(j)$ from the corresponding unit section of the visit and utilization interest degree table T2. And, using the weighting parameters k1 and k2 set in advance, a process to obtain the corrected degree of accordance M* is carried out by performing a calculation $M^* = M \times (k1 \cdot \alpha 1(j)) \times (k2 \cdot \alpha 2(j))$ with respect to the degree of accordance M which becomes the object to be corrected, wherein k1 is a parameter showing the weight for the degree of interest in the plan scheduling interest degree table T1, and k2 is a parameter showing the weight for the degree of interest in the visit and utilization interest degree table T2. Values of k1 and k2 may be appropriately set in accordance with which one of two interest degree tables T1 and T2 the correction is carried out with weight placed.

<<<Section 5>>>

Embodiment Using Advertising Sponsor Intention Degree Table

An important feature of an information providing system according to the present invention exists in a method for modifying the posting order of a list for retrieval results, which is presented to users, by correcting the degree of accordance of the retrieval result based on the interest degree table obtained as the past survey results. The interest degree table utilized herein shows, to the end, the degree of interest regarding what types of genres to which situations users take higher interest in.

The embodiment described herein modifies the posting order of a list of the retrieval results presented to users by correcting the degree of accordance of the retrieval result with the degrees of intention of advertising sponsors taken into consideration in addition to such degrees of interest of users. Here, the degree of intention of an advertising sponsor is a parameter showing the degree of intention by which an advertising sponsor desires to distribute the information of its own store to users existing in a specified zonal area at a specified time period. In the case of the embodiment described here, an advertising sponsor intention degree table is adopted to reflect the degree of intention of advertising sponsors in the correction processing.

Figure 27:
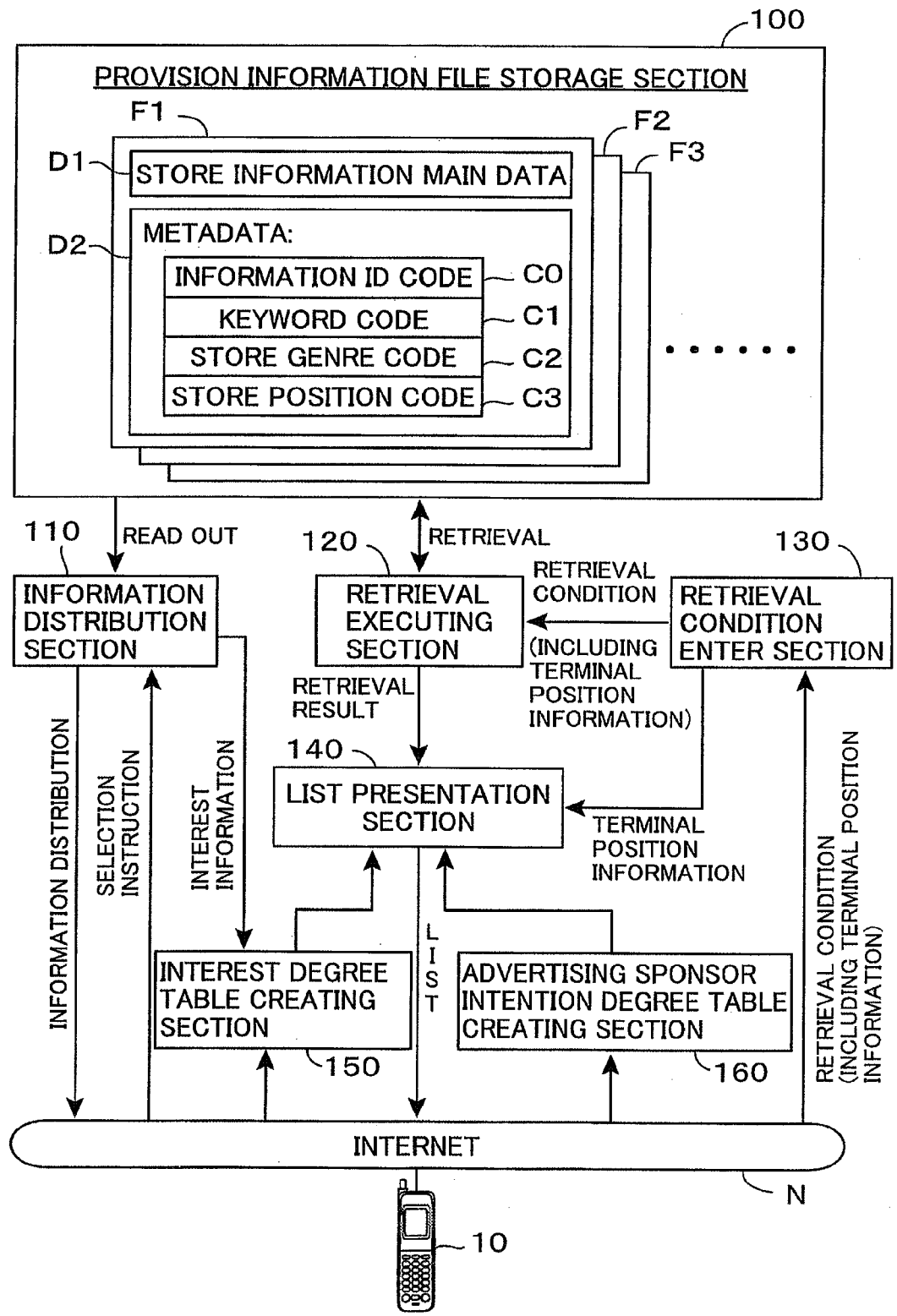
FIG. 27 is a block diagram showing a configuration of an information providing system according to the embodiment having an advertising sponsor intention degree table used therein.

FIG. 27 is a block diagram showing an embodiment having a function of executing a process in which such degrees of intention of advertising sponsors are taken into consideration. The embodiment differs from the embodiment shown in FIG. 16 in that an advertising sponsor intention degree table creating section 160 is newly added, and the list presentation section 140 carries out a process in which the degrees of intention are taken into consideration. The advertising sponsor intention degree table creating section 160 carries out a process of creating advertising sponsor intention degree tables for respective provision information files based on an enter operation from outside, which is in accordance with an instruction of the advertising sponsor, and of storing the intention degree tables in the table storage section 143 in the list presentation section 140.

Figure 28:
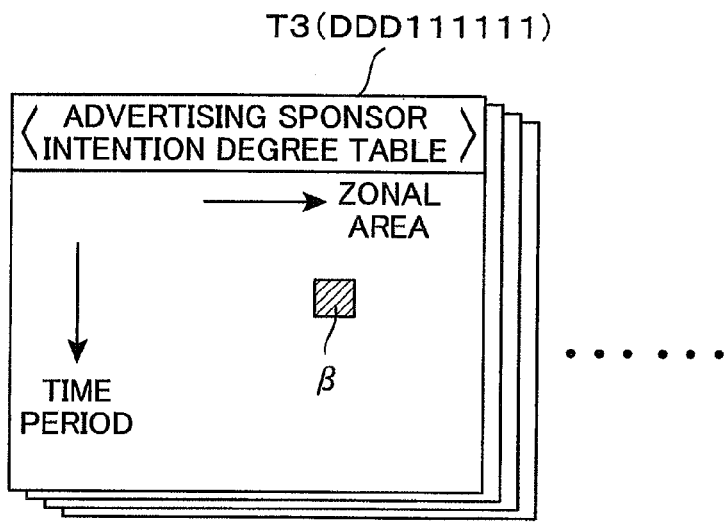
FIG. 28 is a view showing a detailed example of the advertising sponsor intention degree table created by the advertising sponsor intention degree table creating section 160 shown in FIG. 27.

FIG. 28 is a view showing a detailed example of an advertising sponsor intention degree table T3 created by the advertising sponsor intention degree table creating section 160 shown in FIG. 27. As illustrated, unit sections similar to those in the interest degree table shown in FIG. 9 are provided in the advertising sponsor intention degree table T3, the degrees of intention of advertising sponsors who provide store information are set in the respective unit sections. That is, the basic configuration of the advertising sponsor intention degree table T3 is such that a number of unit sections corresponding to specified zonal areas and specified time periods are defined by arranging individual zonal areas in the horizontal direction and arranging individual time periods in the vertical direction. The hatched portion in the table of FIG. 28 shows a single unit section.

However, the first difference between the interest degree table and the advertising sponsor intention degree table exists in that, although degrees of interest for a plurality of store genres are set in individual unit sections of the interest degree table as in the examples shown in FIG. 10 and FIG. 11, only a degree of intention is set in individual unit sections of the advertising sponsor intention degree table. For example, only the degree of intention $\beta$ is set in the hatched unit sections in FIG. 28.

And, the second difference between the interest degree tables and the advertising sponsor intention degree table exists in that the advertising sponsor intention degree table is separately and independently prepared for each of the provision information files. Although a plurality of advertising sponsor intention degree tables are depicted so as to overlap each other in FIG. 28, this shows that one advertising sponsor intention degree table is prepared for a single provision information file. The advertising sponsor intention degree table T3 (DDD111111) shown at the top in FIG. 28 is an advertising sponsor intention degree table prepared for the provision information file F1 (the file shown in FIG. 2) specified by the information identification code [DDD111111]. Therefore, where ten thousand provision information files are stored in the provision information file storage section 100, ten thousand advertising sponsor intention degree tables will be prepared.

As described above, the degree of intention of an advertising sponsor is a parameter showing the degree of intention by which an advertising sponsor desires to distribute the information of its own store to users existing in a specified zonal area at a specified time period. For example, the advertising sponsor intention degree table T3 (DDD111111) shown in FIG. 28 is a table in which the degree of intention by which the advertising sponsor of the store information shown in FIG. 2 (usually, the owner of [Indian restaurant: XXX in Tokyo]) desires to distribute the corresponding store information is set for each of individual unit sections. That is, the degree of intention $\beta$ set in the hatched unit section in FIG. 28 becomes a value showing the degree of intention by which the store owner desires to distribute the store information main data D1 shown in FIG. 2 to users existing in the zonal area in the time period, which corresponds to the unit section.

It does not matter that any numerical value may be set as a value of the degree of intention $\beta$. For example, an arbitrary value from 0 through 100 may be set. The degree of intention 100 shows a strong intention to distribute the corresponding store information, and the degree of intention 0 shows intention not desired to distribute the corresponding store information. As a matter of course, it does not matter that binary data [distribute ($\beta=1$)] and [not distribute ($\beta=0$)] may be set as the value of the degree of intention $\beta$. The advertising sponsor intention degree table creating section 160 executes a process of creating such an advertising sponsor intention degree table based on an enter operation from outside in accordance with an instruction of an advertising sponsor, and storing the intention degree table in the table storage section 143 in the list presentation section 140.

In detail, for example, if data showing a web page to display a blank advertising sponsor intention degree table in which the portions of respective unit sections are made blank are transmitted to a terminal device such as a personal computer operated by an advertising sponsor, and the advertising sponsor is caused to carry out an operation for entering a numerical value showing a desired degree of intention in the blank portions on the corresponding web page, the advertising sponsor intention degree table can be created by picking up the numerical value entered by the advertising sponsor. As a matter of course, it is preferable that the values of the intention degree set in the past are updated as necessary.

Figure 29:
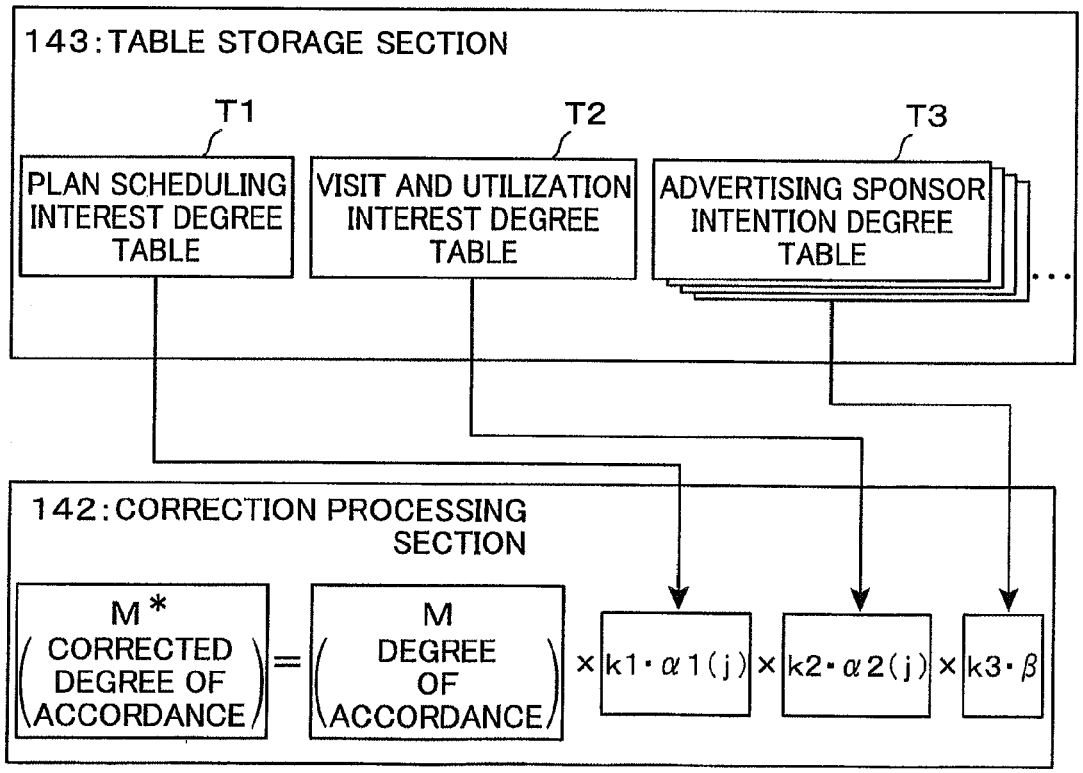
FIG. 29 is a block diagram showing one example of correction processing carried out in the list presentation section 140 shown in FIG. 27.

In the case of the embodiment shown in FIG. 27, as shown in FIG. 29, a plurality of advertising sponsor intention degree tables T3 corresponding to individual provision information files are to be stored in the table storage section 143 in the list presentation section 140 in addition to the plan scheduling interest degree table T1 and the visit and utilization interest degree table T2. The respective tables T1, T2 and T3 are common to each other in the point that predetermined parameters are set for each of individual unit sections with the zonal area arranged in the horizontal direction and with the time period arranged in the vertical direction.

And, in the case of the embodiment shown here, the correction processing section 142 recognizes the degrees of intention set in the corresponding unit sections by referencing the advertising sponsor intention degree table T3 for the provision information files, which are objects to be corrected for degree of accordance, and carries out a process to obtain the corrected degree of accordance by making correction using both of the degree of interest and the degree of intention. In detail, the correction processing section 142 has a function for setting a weighting parameter for each of the degree of interest and the degree of intention, and obtains a corrected degree of accordance by multiplying the value, which is obtained by multiplying the degree of interest by the weighting parameter, and the value, which is obtained by multiplying the degree of intention by the weighting parameter, by the respective degrees of accordance.

Here, for example, a case is taken into consideration where a specified user existing in the [zonal area 1A] at the [time period 14:00 through 15:00 on Sunday] enters a certain retrieval condition, and the retrieval executing section 120 obtains a predetermined retrieval result. At this time, it is assumed that the store information regarding [Indian restaurant: XXX in Tokyo] as shown in FIG. 2 is included as the retrieval result having the degree of accordance M. In this case, the correction processing section 142 shown in FIG. 29 carries out correction for the degree of accordance M by the following processing.

First, the correction processing section 142 reads out the degree of interest $\alpha 1(j)$ from the corresponding unit section [1A: Sunday 14] of the plan scheduling interest degree table T1 and reads out the degree of interest $\alpha 2(j)$ from the corresponding unit section [1A: Sunday 14] of the visit and utilization interest degree table T2. Here, since the store genre [Indian restaurant: XXX in Tokyo] is [eat], j=1 is established. The correction processing section 142 further reads out the degree of intention $\beta$ from the corresponding unit section [1A: Sunday 14] of the advertising sponsor intention degree table T3 (DDD111111) with respect to the [Indian restaurant: XXX in Tokyo].

And, a process for obtaining the corrected degrees of accordance M* is carried out by performing a calculation of M*=M×(k1·$\alpha 1(j)$)×(k2·$\alpha 2(j)$)×(k3·$\beta$) for the degree of accordance M, which becomes an object to be corrected, using the weighting parameters k1, k2, and k3 set in advance. Here, k1 is a parameter showing the weight with respect to the degree of interest in the plan scheduling interest degree table T1, k2 is a parameter showing the weight with respect to the degree of interest in the visit and utilization interest degree table T2, and k3 is a parameter showing the weight with respect to the degree of intention in the advertising sponsor intention degree table T3. Values of k1, k2 and k3 may be appropriately set by taking it into consideration which one of three tables T1, T2 and T3 is emphasized.

An advertising sponsor may control the distribution probability of respective store information to some degree by appropriately changing the setting of the degree of intention in respective unit sections in the advertising sponsor intention degree table T3. For example, it is assumed that a business owner running two stores which are store A located in the zonal area 1A and store F located in the zonal area 1F desires to distribute the store information of the store A to users existing in the vicinity of the zonal area 1A and to distribute the store information of the store F to users existing in the vicinity of the zonal area 1F. In this case, in the advertising sponsor intention degree table with respect to the store information of the store A, the degree of intention of the unit section close to the zonal area 1A is set high, and the degree of intention of the unit section close to the zonal area 1F is set low, and in the advertising sponsor intention degree table with respect to the store information of the store F, the degree of intention of the unit section close to the zonal area 1A is set low, and the degree of intention of the unit section close to the zonal area 1F is set high. By doing this, the header of the store A ranks higher than the header of the store F in the list presented to the users existing in the vicinity of the zonal area 1A. Contrarily, the header of the store F ranks higher than the header of the store A in the list presented to the users existing in the vicinity of the zonal area 1F.

Or, where store information which has two types of information one of which is store information for noon, which has lunch menus described, and the other of which is store information for night, which has dinner menus described, is prepared with respect to the same store, it is desired that store information for noon is distributed in the time period around noon, and store information for night is distributed in the time period in the evening or at night. In this case, in the advertising sponsor intention degree table in regard to the store information for noon, the degree of intention of a unit section corresponding to the time period around noon is set high, and the degree of intention of a unit section corresponding to the time period in the evening or at night is set low, and in the advertising sponsor intention degree table in regard to the store information for night, the degree of intention of a unit section corresponding to the time period around noon is set low, and the degree of intention of a unit section corresponding to the time period in the evening or at night is set high. By doing this, the header of the store information for noon ranks higher than the header of the store information for night in the list presented to users who retrieve in the daytime, and the header of the store information for night ranks higher than the header of the store information for noon in the list presented to users who retrieve in the nighttime.

Also, in order for an advertising sponsor to set the degree of intention $\beta$, as described above, it is practical that the advertising sponsor displays a blank advertising sponsor intention degree table on the screen of a personal computer operated by the advertising sponsor, and is caused to enter a numerical value showing the degree of intention in the blank portions thereof. However, if the degree of interest $\alpha$ of the interest degree table created by the interest degree table creating section 150 is displayed in a certain format in the blank advertising sponsor intention degree table, it is possible to provide effective information in view of the advertising sponsor setting the degree of intention $\beta$.

In the interest degree table according to the present invention, for example, as shown in FIG. 9, a plurality of unit sections (sections divided by the zonal areas and time periods) are provided. Also, in the advertising sponsor intention degree table according to the present invention, for example, as in the example shown in FIG. 28, a plurality of unit sections (sections divided by the zonal areas and time periods) are provided. Therefore, individual unit sections of the advertising sponsor intention degree table T3 (DDD111111) shown in FIG. 28 correspond to individual unit sections of the interest degree table shown in FIG. 9 on a one to one basis. Accordingly, when a blank advertising sponsor intention degree table is presented to an advertising sponsor and is caused to set the degree of intention β in individual blank portions, if the degree of interest α for the corresponding store genres in unit sections corresponding to the individual blank portions can be displayed in a certain format by referencing the interest degree table, the advertising sponsor can set the degree of intention β with reference to the corresponding degree of interest α.

For example, a case is taken into consideration where the advertising sponsor intention degree table T3 (DDD111111) shown in FIG. 28 is a blank table with respect to the store information regarding [Indian restaurant: XXX in Tokyo], and the advertising sponsor carries out an operation for setting the degree of intention β in the blanks (enter columns). In such a case, the degree of interest α for the store genre corresponding to the corresponding unit section on the interest degree table, that is, for the genre [eat] may be displayed in the individual enter columns.

In summary, when setting the degree of intention of a specified unit section in regard to a specified provision information file based on an enter operation of the advertising sponsor, the advertising sponsor intention degree table creating section 160 recognizes a degree of interest α set so as to correspond to a store genre (in the above example, [eat]) of the corresponding specified provision information file with respect to the corresponding specified unit section, and may carry out a process for presenting the recognized degree of interest α to a terminal device such as a personal computer operated by the advertising sponsor.

In actual applications, if the intensity of the degree of interest α is shown in colors of the enter column instead of displaying the numerical values, which shows the degree of interest α, as they are, intuitive presentation is enabled for advertising sponsors. For example, in a case where the degree of interest α is set in a range from 0 through 100%, such color classification may be carried out in which the enter column in which the degree of interest α for [eat] takes a value within the range of $100\% \geq \alpha \geq 80\%$ is displayed in red, the enter column in which the degree of interest α takes a value within the range of $80\% > \alpha \geq 60\%$ is displayed in orange, the enter column in which the degree of interest α takes a value within the range of $60\% > \alpha \geq 40\%$ is displayed in yellow, the enter column in which the degree of interest α takes a value within the range of $40\% > \alpha \geq 20\%$ is displayed in green, and the enter column in which the degree of interest a takes a value within the range of $20\% > \alpha \geq 0\%$ is displayed in blue. As a matter of course, such a display type may be acceptable in which the column having the degree of interest α less than 40% is not colored.

Also, the method for displaying the degree of interest α in the enter column of the degree of intention β is not limited to the method for changing the colors. For example, the respective enter columns may be displayed by hatching responsive to the corresponding degree of interest α, displayed with brightness responsive to the corresponding degree of interest α, displayed with fonts responsive to the corresponding degree of interest α or displayed with marks (for example, geometrical shapes such as circle, square, triangle, etc.) responsive to the degree of interest α in the respective enter columns.

In summary, the advertising sponsor intention degree table creating section 160 may be configured so that the section 160 presents the [enter columns for entering respective predetermined degrees of intention β, corresponding to individual unit sections] to the advertising sponsor, and displays the respective enter columns in a display format responsive to the degree of interest α recognized in regard to the respective unit sections.

The [degree of interest] according to the present invention is statistical data showing how much interest a standard user existing in a specified zonal area in a specified time period has in individual genres when commencing a specified behavior. Such statistical data can be said to be data that serves well as a reference when an advertisement sponsor sets the degree of intention β. For example, in a case where the degree of intention β is set in the blank corresponding to the unit section [1A: Sunday 14] (that is, in a case of setting the degree of intention β showing the distribution to a user existing in the zonal area 1A in the time period 14:00 through 15:00 on Sunday), if the blank is shown in red, it is statistically shown that a number of users existing in the corresponding zonal area in the corresponding time period are keenly interested in [eat]. Therefore, usually, the advertising sponsor of [Indian restaurant: XXX in Tokyo] will set a degree of intention β of a high numerical value in the corresponding blank in order to carry out efficient advertisement distribution. On the contrary, if the corresponding blank is shown in blue, it is statistically shown that a number of users existing in the corresponding zonal area in the corresponding time period are not interested in [eat]. Therefore, the corresponding advertising sponsor sets a low degree of intention β.

Where such a display pattern as described above is taken on the screen for setting the degree of intention β, the advertising sponsor intention degree table creating section 160 may acquire a value of the degree of interest α in regard to the genre corresponding to the corresponding unit section with reference to the interest degree table stored in the table storage section 143. Also, as the degree of interest α serving as a reference, the degree of interest α1 in the plan scheduling interest degree table T1 may be used or the degree of interest α2 in the visit and utilization interest degree table T2 may be used. As a matter of course, a degree of interest α (for example, the product of both, or a value in which the product is standardized) obtained from both of α1 and α2 may be used.

The method for causing an advertising sponsor to set the degree of intention β, taking the degree of interest α of the corresponding unit section into consideration, with respect to the respective unit sections is not necessarily limited to the method for presenting the degrees of interest α in the respective columns in different colors, etc. For example, such a method for arranging and presenting the individual unit sections in the sequence based on the order of intensity of the degrees of interest α can be adopted. With this method, the advertising sponsor intention degree table creating section 160 will recommend a particular unit section having a great degree of interest α by presenting such a unit section having a great degree of interest α to an advertising sponsor with priority. The advertising sponsor will be able to carry out setting by which further efficient advertisement distribution is enabled by setting a higher degree of interest β to the unit section the sequential order of which comes early.

In summary, when setting the degree of intention of respective unit sections for a specified provision information file based on an enter operation of an advertising sponsor, the advertising sponsor intention degree table creating section 160 may recognize the degree of interest set corresponding to the store genre of the corresponding specified provision information file with respect to the respective unit sections, by referencing to the interest degree tables T1 and T2 in the table storage section 143, and may present unit sections to the advertising sponsor in accordance with the priority sequential order in which the intensities of the degree of interest are taken into consideration.

Further, when applying the priority sequential order to the unit sections as in the example described above, not only the degree of interest α but also the distance between the zonal area of the unit section and the store, which is an object to be advertised, may be taken into consideration. In the case of the embodiment described here, as described above, since the store position code C3 is prepared as metadata in the respective provision information files, it is possible to calculate the distance between the position of the store, which becomes an object to be advertised, and the respective zonal areas. Therefore, in a case of setting the degree of intention β with respect to the [Indian restaurant: XXX in Tokyo], for example, such a method may be adopted which arranges and presents the unit sections, which become objects to be recommended, in the order of intensity of the degree of interest α using only the unit sections in the zonal area within 1 km from the corresponding store as the objects to be recommended.

If such a method is further developed, the advertising sponsor intention degree table creating section 160 will be able to automatically set the degree of intention β based on a predetermined algorithm instead of setting the degree of intention β by an enter operation of an advertising sponsor. For example, in a case of setting the degree of intention β with respect to the [Indian restaurant: XXX in Tokyo], if such an algorithm is determined in advance by which the degree of intention β=100% is uniformly set for the unit sections, in which the degree of interest α for the genre [eat] is 60% or more, among the unit sections for the zonal area which is within 1 km from the corresponding store, and the degree of intention β=0% is uniformly set for the remaining unit sections, it becomes possible that degrees of intention β of 100% or 0% are automatically set in the respective unit sections without an advertising sponsor carrying out any entering operation.

<<<Section 6>>>
Embodiment Using User Evaluation Value Table

In section 5, a description was given of the embodiment that corrects the degree of accordance of the retrieval result and modifies the list posting order of the retrieval result presented to a user, using both of the interest degree table showing the degree of interest of the user and the advertising sponsor intention degree table showing the degree of intention of an advertising sponsor. The embodiment described here corrects the degree of accordance of the retrieval result further taking the evaluation value of a user into consideration in addition to the degree of interest of a user and the degree of intention of an advertising sponsor, and modifies the list posting order of the retrieval results presented to the user. Here, the evaluation value of a user is a parameter showing the evaluation of users for individual stores, which shows the degree at which the user recommends the corresponding store to the other users. In the case of the embodiment described here, the user evaluation value table is used to reflect the evaluation values of users into correction processing.

Figure 30:
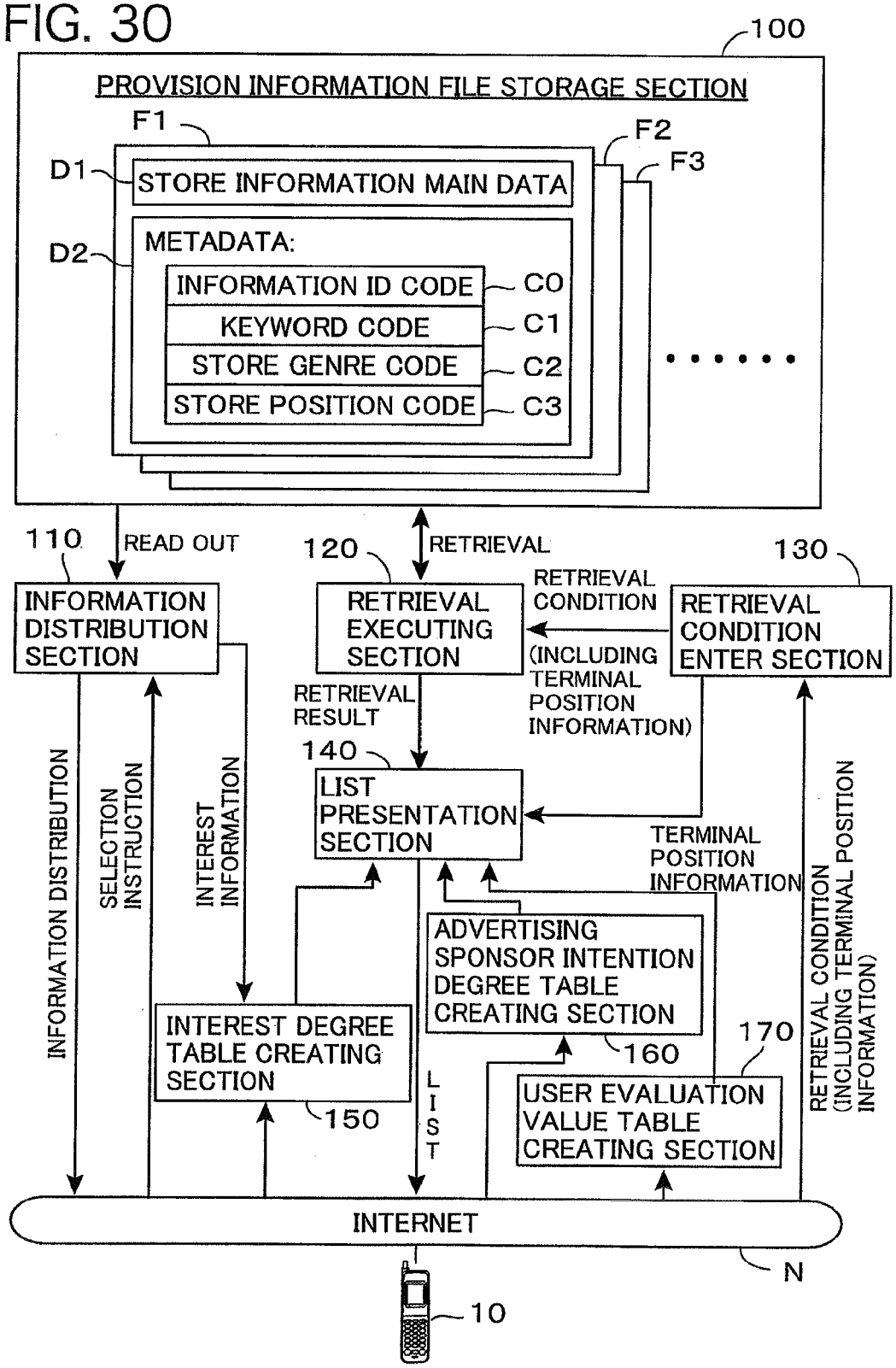
FIG. 30 is a block diagram showing a configuration of an information providing system according to an embodiment having a user evaluation value table used therein.

FIG. 30 is a block diagram of an embodiment provided with a function for carrying out processing having such evaluation values of users taken into consideration. This embodiment differs from the embodiment described in FIG. 27 in that a user evaluation value table creating section 170 is newly provided and that the list presentation section 140 carries out processing having the evaluation values of users taken into consideration. The user evaluation value table creating section 170 creates a user evaluation value table T4 for respective provision information files by collecting evaluations for respective stores from users, and executes processing to store the table T4 in the table storage section 143 in the list presentation section 140.

Figures 31, 32:
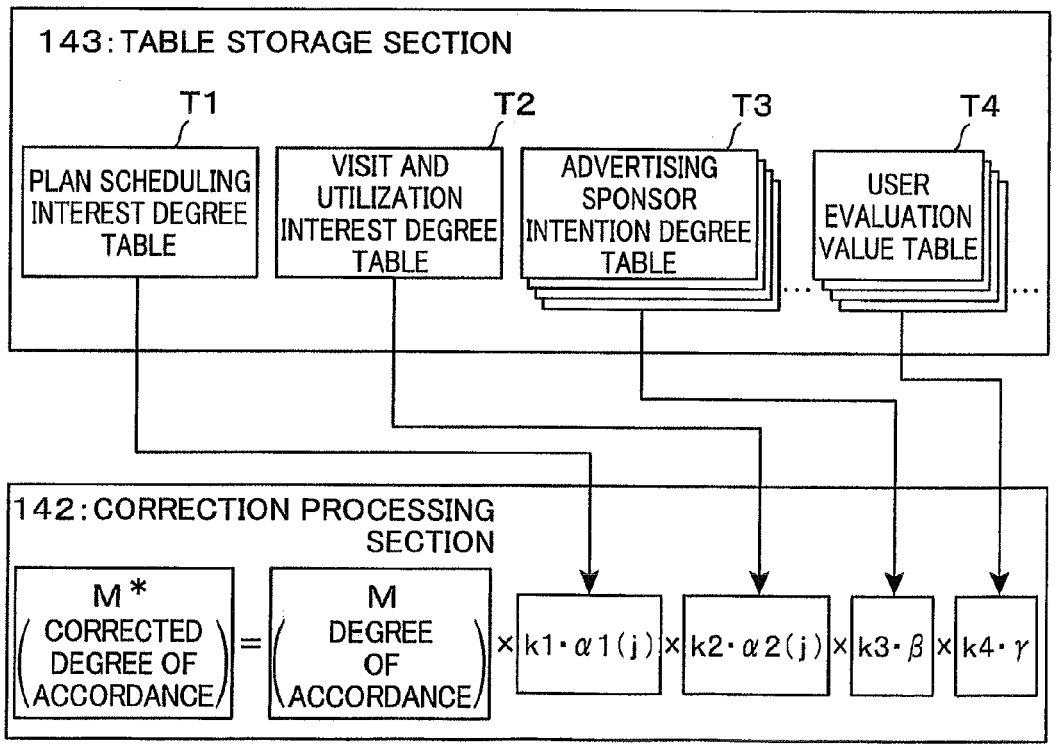
FIG. 31 is a view showing a detailed example of the user evaluation value table created by the user evaluation value table creating section 170 shown in FIG. 30.
FIG. 32 is a block diagram showing one example of correction processing carried out in the list presentation section 140 shown in FIG. 30.

FIG. 31 is a view showing a detailed example of user evaluation value table T4 created by the user evaluation value table creating section 170 shown in FIG. 30. The configuration of the user evaluation value table T4 is slightly different from the interest degree tables T1, T2 and the advertising sponsor intention degree table T3, which have been described above. That is, no unit section is provided in the user evaluation value table T4, wherein there is no concept with respect to the zonal area and time period.

The user evaluation value table T4 is prepared separately and independently for each of the provision information files (The feature is common to the feature of the advertising sponsor intention degree table T3). Although a plurality of user evaluation value tables T4 are depicted so as to overlap each other in FIG. 31, this shows that one user evaluation value table T4 is prepared for one provision information file. The user evaluation value table T4 (DDD111111) shown on the top in FIG. 31 is a user evaluation value table prepared with respect to the provision information file F1 (the file shown in FIG. 2) specified by the information identification code [DDD111111]. Therefore, where ten thousand provision information files are stored in the provision information file storage section 100, ten thousand user evaluation value tables will be prepared. Indeed, the user evaluation value table for a provision information file for which no response is given by any user in regard to the evaluation value will be kept blank.

As described above, the evaluation value of a user regarding a specified store is a parameter showing the evaluation of a user with respect to the corresponding store. For example, although, in the user evaluation value table T4 (DDD111111) shown in FIG. 31, evaluation values which are an individual evaluation value E=3 for the user ID [U000X], an individual evaluation value E=5 for the user ID [U000Y], and an individual evaluation value E=2 for the user ID [U000Z] are recorded, these show the [satisfaction degree] or [recommendation degree] for each of the users with respect to the store specified by the information identification code [DDD111111], that is, the [Indian restaurant: XXX in Tokyo] shown in FIG. 2. In detail, such a result is shown, in which the user carrying the user ID [U000X] gives an evaluation value 3, the user carrying the user ID [U000Y] gives an evaluation value 5, and the user carrying the user ID [U000Z] gives an evaluation value 2.

Although any value may be set as the individual evaluation value E, in the case of the example shown here, a five-stage evaluation is carried out, which means [E=5: Very Good, E=4: Good, E=3: Normal, E=2: Bad, and E=1: Very Bad]. The user evaluation value table creating section 170 creates a user evaluation value table for each of the provision information files by collecting evaluation values for the respective stores from users, and executes processing to store the tables in the table storage section 143 in the list presentation section 140.

In detail, a web page accessible from the mobile terminal device 10, into which evaluation values are entered, is prepared, and individual users may enter the individual evaluation values for desired stores on the corresponding web page. In actual applications, individual users are registered as members and are given a user ID, wherein processing is carried out by which an individual evaluation value E regarding a specified store entered by a user is recorded in the user evaluation value table with respect to the provision information file of the corresponding specific store in association with the user ID.

Or, such a method may be adopted by which a user is caused to respond to an individual evaluation value E for the corresponding store information main data D1 when the store information main data D1 is distributed from the information distribution section 110. For example, if a URL of the web page to respond to the individual evaluation value E is attached to the end of the store information main data D1 distributed from the information distribution section 110, the user is guided to the corresponding web page and is urged to enter the individual evaluation value E. In addition, if an e-mail address to which the individual evaluation value E response is attached to the end of the store information main data D1 distributed from the information distribution section 110, it may be possible to make a user to respond to the individual evaluation value E to the e-mail address.

It does not matter that the evaluation standard to give individual evaluation values E is entrusted to the arbitrary judgment of individual users. For example, when it comes to a restaurant, it is sufficient that an individual evaluation value is set by comprehensive judgment based on the free will of individual users in connection with the taste, price, interior decor, service of store clerks, etc. Also, it is not necessary that the respondents of individual evaluation value are limited to users who have actually used the corresponding store. For example, it does not matter that users who receive distribution of the store information from the information distribution section 110 may respond in regard to the individual evaluation value based on only the corresponding distributed content.

Further, where the same user (the user having the same user ID) sends the evaluation value in regard to the same store several times, the newest evaluation value may be recorded in the table as an individual evaluation value in regard to the corresponding user (or the average value of a plurality of evaluation values may be recorded).

Thus, the user evaluation value tables corresponding to the respective provision information files will be stored in the table storage section 143, and evaluation values of users in regard to the stores corresponding to the respective provision information files will be recorded in the respective user evaluation value tables. Thus, the user evaluation value tables are basically prepared for the respective provision information files. However, where a plurality of provision information files are prepared for the same store (for example, where two types of store information such as store information for noon, which has a lunch menu described, and store information for night, which has a dinner menu described, are prepared for the same store), it is sufficient that one user evaluation value table common to the plurality of provision information files is prepared.

Eventually, in the case of the embodiment described in FIG. 30, a plurality of user evaluation values tables T4 corresponding to individual provision information files are stored in the table storage section 143 in the list presentation section 140, as shown in FIG. 32, in addition to the plan scheduling interest degree table T1, the visit and utilization interest degree table T2, and a plurality of advertising sponsor intention degree tables T3 corresponding to individual provision information files.

In the case of the embodiments described here, the correction processing section 142 carries out processing to obtain a corrected degree of accordance by recognizing the user evaluation values set to the corresponding store by referencing the description of the user evaluation value table T4 in regard to the provision information file which becomes an object to be corrected for the degree of accordance, and carrying out correction using all of the degree of interest, the degree of intention and the user evaluation value. In detail, the correction processing section 142 has a function for setting a weighting parameter with respect to each of the degrees of interest, the degree of intention, and the user evaluation value, and obtains corrected degrees of accordance by multiplying the value obtained by multiplying the degree of interest by the weighting parameter, the value obtained by multiplying the degree of intention by the weighting parameter, and the value obtained by multiplying the user evaluation value by the weighting parameter, by the respective degrees of accordance.

Accordingly, as in the example shown in FIG. 31, since individual evaluation values E for a number of users are recorded in the user evaluation value table regarding one store, the correction processing section 142 is required to determine an evaluation value which will be used for correction calculations of a degree of accordance, based on a plurality of individual evaluation values E. The simplest method is a method for utilizing the average value of the individual evaluation values E for all the users recorded in the table for the correction calculations of the degree of accordance. Hereinafter, a description is given of one example of the correction calculations of degree of accordance, which is actually carried out by the method.

For example, as in the example described in Section 5, a case is taken into consideration where the retrieval executing section 120 obtains a predetermined retrieval result by a specified user, who exists in the [zonal area 1A] in the [time period 14:00 through 15:00 on Sunday], entering a certain retrieval condition. At this time, it is assumed that the store information regarding [Indian restaurant: XXX in Tokyo] as shown in FIG. 2 is included as the retrieval result having the degree of accordance M. In this case, the correction processing section 142 shown in FIG. 32 will carry out correction for the degree of accordance M by the following processing.

First, the correction processing section 142 reads out the degree of interest $\alpha1(j)$ from the corresponding unit section [1A: Sunday 14] of the plan scheduling interest degree table T1 and reads out the degree of interest $\alpha2(j)$ from the corresponding unit section [1A: Sunday 14] of the visit and utilization interest degree table T2. Here, since the store genre [Indian restaurant: XXX in Tokyo] is [eat], j=1 is established. Continuously, the correction processing section 142 reads out the degree of intention β from the corresponding unit section [1A: Sunday 14] of the advertising sponsor intention degree table T3 (DDD111111) with respect to the [Indian restaurant: XXX in Tokyo]. The correction processing section 142 further determines an evaluation value γ used for correction calculations by referencing the user evaluation value table T4 with respect to the [Indian restaurant: XXX in Tokyo]. In detail, the average value of the individual evaluation values E for all the users recorded in the user evaluation value table T4 (DDD111111) may be determined as the evaluation value γ.

And, calculation of $M^*=M\times(k1\cdot\alpha1(j))\times(k2\cdot\alpha2(j))\times(k3\cdot\beta)\times(k4\cdot\gamma)$ is performed in regard to the degree of accordance M which becomes an object to be corrected, by using the weighting parameters k1, k2, k3 and k4 set in advance, whereby processing to obtain the corrected degree of accordance M* is carried out. Here, k1 is a parameter showing the weight in regard to the degree of interest in the plan scheduling interest degree table T1, k2 is a parameter showing the weight in regard to the degree of interest in the visit and utilization interest degree table T2, k3 is a parameter showing the weight in regard to the degree of intention in the advertising sponsor intention degree table T3, and k4 is a parameter showing the weight in regard to the evaluation value in the user evaluation value table T4. Values of k1, k2, k3 and k4 may be appropriately set while taking into consideration that correction is carried out based on which one of the four tables T1, T2, T3 and T4 is emphasized.

Thus, if the presentation priority of the retrieval results on the list is changed by taking the description of the user evaluation value table into consideration, the header of a store the evaluation of which is generally high is displayed in higher ranking than the header of a store the evaluation of which is low.

In the above, a description was given of a simple example in which the average value of the individual evaluation values E for all the users recorded in one user evaluation value table is regarded as the evaluation value $\gamma$ used for correction calculations. Thus, if a correction calculation of the degree of accordance is usually carried out using the average value of the individual evaluation values E, it is not necessary to individually record the individual evaluation values E of a number of users, wherein it is sufficient that only the average value is recorded. However, tastes of individuals are generally diversified, and it cannot be said that the other's evaluation regarding a specified store is necessarily similar to one's own evaluation. Accordingly, in actual applications, it is preferable that the individual evaluation value E of a user (hereinafter referred to as a user having similar taste) who has a taste similar to one's own taste is used as the evaluation value $\gamma$ instead of using the average value of the individual evaluation values E of a number of users, and a correction calculation is carried out in regard to the degree of accordance. Hereinafter, a description is given below of a detailed procedure for carrying out the correction calculation of the degree of accordance by such a method.

With this method, a user evaluation value table T4 in which the individual evaluation values E for individual users are recorded is created for each of the respective provision information files by the user evaluation value table creating section 170, and is stored in the table storage section 143. In detail, as in the example shown in FIG. 31, the user evaluation value table T4 in which the individual evaluation values E for a number of users are recorded along with the user ID of the corresponding user is prepared for each of the provision information files.

On the other hand, the retrieval condition enter section 130 enters information (user ID) to identify an accessing user when entering a retrieval condition. For example, if the user is caused to enter his or her own user ID on the web page for retrieval, the retrieval condition enter section 130 is able to acquire the user ID of the accessing user. Or, the mobile terminal device 10 is caused to have a function for automatically transmitting the user ID.

And, although the correction processing section 142 carries out processing to correct the degree of accordance M to a corrected degree of accordance M* based on the algorithm shown in FIG. 32 when the list presentation section 140 presents the retrieval result as a list, at this time, a user inclined to make evaluation similar to the evaluation of the accessing user is recognized as a user having similar taste, and the evaluation value $\gamma$ is calculated by using the individual evaluation value E for the user having similar taste, thereby executing correction.

Figure 33:
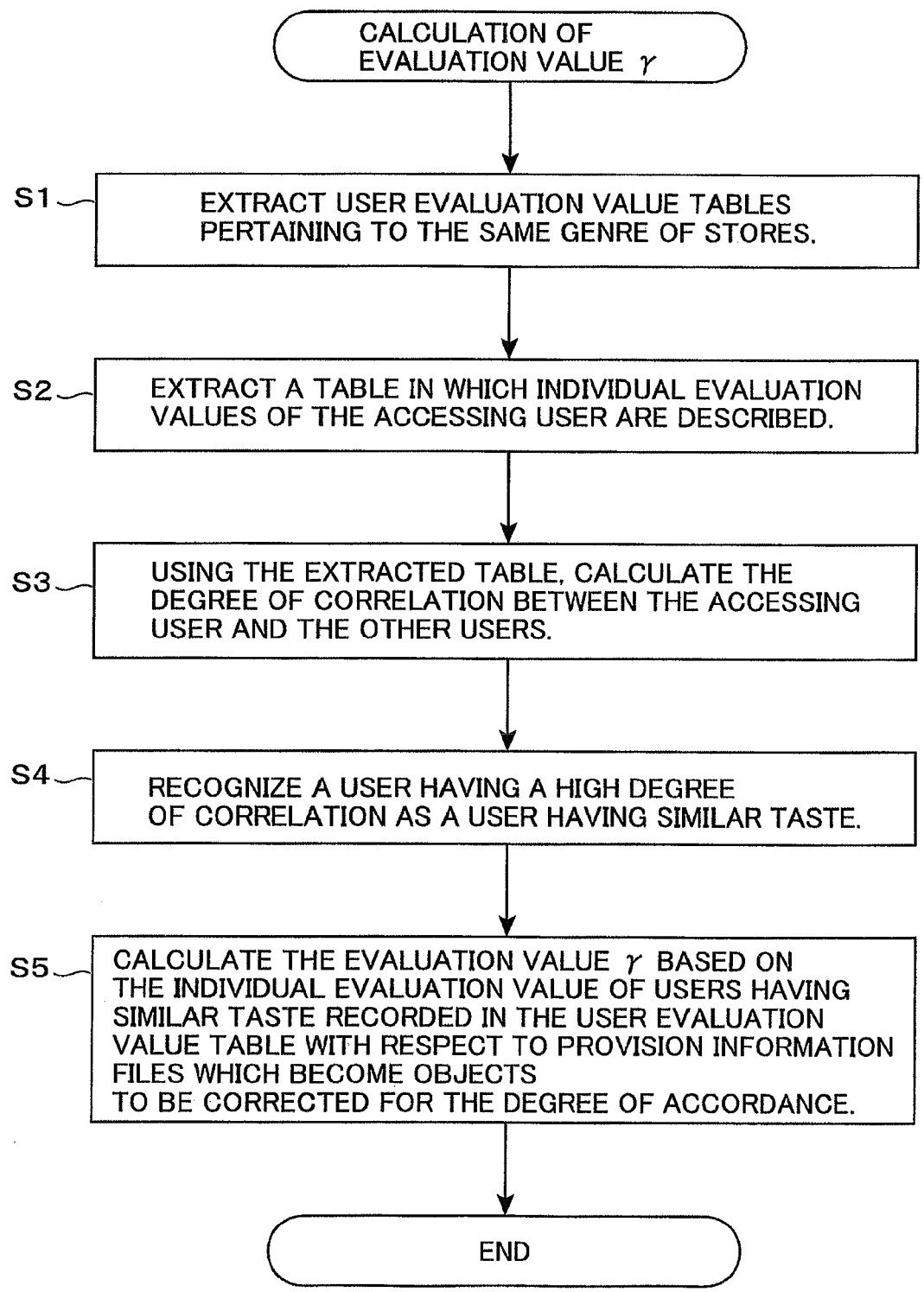
FIG. 33 is a flowchart showing a calculation procedure of an evaluation value γ shown in FIG. 32.

FIG. 33 is a flowchart showing a procedure for calculating the evaluation value $\gamma$. First, in Step S1, the user evaluation value table for a provision information file having the same store genre as that of the provision information file which becomes the object to be corrected for the degree of accordance is extracted. For example, where the degree of accordance M for the provision information file (store information regarding the [Indian restaurant: XXX in Tokyo]) shown in FIG. 2 is corrected, since the store genre of the major classification is [eat], user evaluation value tables regarding the stores belonging to the genre [eat] are extracted from a number of user evaluation value tables (As a matter of course, it does not matter that only the file whose genre of the minor classification is the same may be extracted).

Thus, the reason why the user evaluation value of the same genre as the provision information file which becomes the object to be corrected is extracted is that it is considered that there is genre dependency in similarity of individual tastes. For example, a case is taken into consideration where there exist two users X and Y who are inclined to have remarkably similar individual evaluation values for ten restaurants. In this case, there is similarity between the users X and Y with respect to the taste in the genre [eat], and it can be presumed that the individual evaluation values of both X and Y become similar to each other with respect to the 11th restaurant. However, there is a doubt in regard to whether or not there is similarity between both for the taste in a separate genre [buy]. Therefore, in this case, the users X and Y are to be handled as users having similar taste with respect to the taste in the genre [eat].

Continuously, in Step S2, a table having an individual evaluation value E of the accessing user (the user who designates the retrieval condition and requests presentation of a list) from the user evaluation value table extracted in Step S1 is extracted. As a matter of course, since, where the individual evaluation value E of the accessing user's own is not recorded at all in the user evaluation value table (the user evaluation value table regarding the store belonging to the genre [eat]) extracted in Step S1, no table can be extracted in Step S2, the procedure shown in the flowchart of FIG. 33 will not be able to be carried out. This is because, if information (that is, the individual evaluation value E for a specified store by the accessing user himself) does not exist although it attempts to search for a user having similar taste to that of the accessing user with respect to the taste in the genre [eat], it becomes impossible to search for the user having similar taste. In such a case, the procedure shown in the flowchart of FIG. 33 is discontinued, the processing may be changed to another method. For example, the processing is changed to the simple method described above (the method for carrying out a correction calculation using the average value of the individual evaluation values E of all the users, which are recorded in the table as evaluation value $\gamma$) or may be changed to the method in which no user evaluation value is taken into consideration (for example, the method for executing a correction calculation described in Section 5). As a matter of course, these various methods may be combined for the processing.

Next, in Step S3, a correlation degree between the accessing user and the other user is calculated by using the user evaluation value table extracted in Step S2. For example, where the individual evaluation value Ex1 of the accessing user X and the individual evaluation value Ey1 of another user Y are recorded in the user evaluation value table regarding the first store, these individual evaluation values Ex1 and Ey1 will become the individual evaluation values of two users with respect to the same store. Therefore, the slighter the difference between Ex1 and Ey1 becomes, the more similar the tastes of the users X and Y become, wherein the correlation degree between both is increased. Actually, the correlation degree between both should be statistically calculated, and an accurate correlation degree cannot be calculated by comparing the individual evaluation values with each other with respect to only one store. Therefore, the correlation degree between the users X and Y can be further accurately calculated in line with an increase in the number of stores which both users X and Y commonly evaluate.

Figures 34, 35:
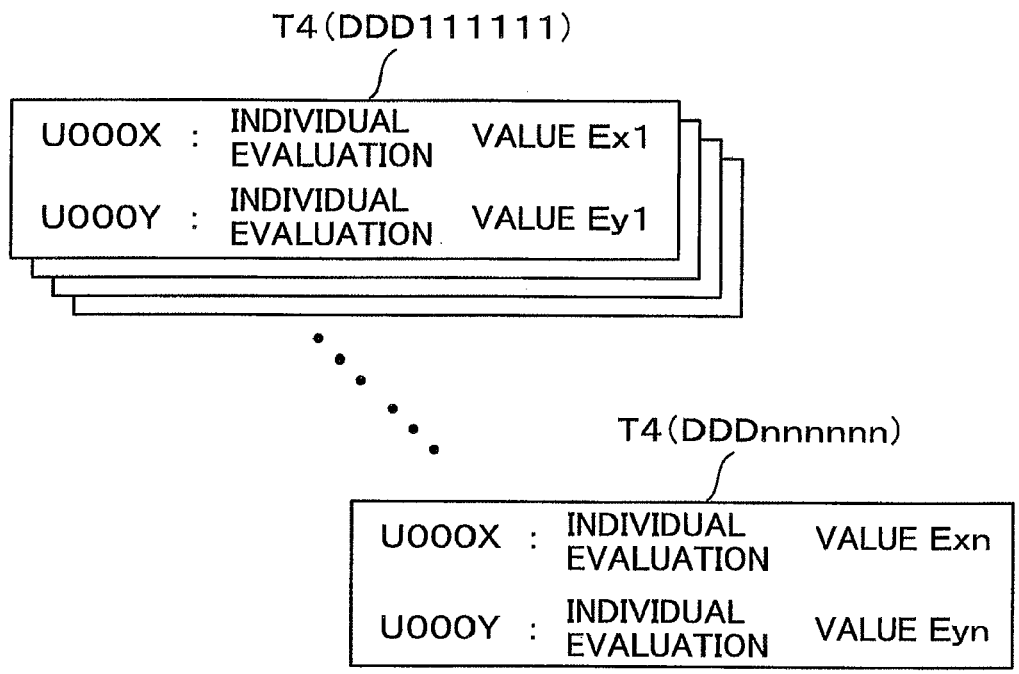
FIG. 34 is a view showing pairs of "n" sets of individual evaluation values used in a correlation degree calculation in Step S3 of the flowchart shown in FIG. 33.
FIG. 35 is a view showing calculation expressions used for the correlation degree calculation in Step S3 of the flowchart shown in FIG. 33.

FIG. 34 is a view showing pairs of "n" sets of individual evaluation values used for the correlation degree calculation in Step S3. The example refers to a case where two users X and Y respectively have evaluated "n" common stores in total. For example, as shown in the illustrated user evaluation value table T4 (DDD111111), the individual evaluation value Exi of user X having the user ID (U000X) and the individual evaluation value Ey1 of user Y having the user ID (U000Y) are recorded with respect to the first store specified by the store identification code [DDD111111]. Similarly, as shown in the illustrated user evaluation value table T4 (DDD-nnnnnn), the individual evaluation value Exn of user X having the user ID (U000X) and the individual evaluation value Eyn of user Y having the user ID (U000Y) are recorded with respect to the n-th store specified by the store identification code [DDDnnnnnn].

The correlation degree R(X,Y) regarding the taste in a specified genre of the users X and Y can be calculated by statistical calculations based on pairs of "n" sets of evaluation values shown in FIG. 34. FIG. 35 is a view showing one example of the calculation expression used for the correlation degree calculation. That is, the correlation degree R(X,Y) can be obtained by the following expressions:

$$R(X,Y)=Sxy/(\sqrt{Sxx}\cdot\sqrt{Syy})$$

where, $$Sxx=\Sigma_{i=1 \text{ through } n}(Exi-Exa)^2$$

$$Syy=\Sigma_{i=1 \text{ through } n}(Eyi-Eya)^2$$

$$Sxy=\Sigma_{i=1 \text{ through } n}(Exi-Exa)(Eyi-Eya)$$

Here, Exi is an individual evaluation value with respect to the i-th store of user X among the pairs of "n" sets of individual evaluation values shown in FIG. 34, and Eyi is an individual evaluation value with respect to the i-th store of user Y among the pairs of "n" sets of individual evaluation values shown in FIG. 34. Also, Exa is the average value of all of "n" individual evaluation values of user X among the pairs of "n" sets of individual evaluation values shown in FIG. 34, and Eya is the average value of all of "n" individual evaluation values of user Y among the pairs of "n" sets of individual evaluation values shown in FIG. 34.

Based on the above-described expression, since Sxx=Syy=Sxy is established where the individual evaluation values of users X and Y are completely coincident with each other with respect to all of "n" stores, R(x,y)=1 is brought about. Therefore, the maximum value of the correlation degree R(x,y) is 1. In addition, the minimum value of the correlation degree R(x,y) is −1. In the case of correlation degree R(x,y)=0, this means that no correlation is found between both, in the case of correlation degree R(x,y)>0, this means that positive correlation is brought about between both, and in the case of correlation degree R(x,y)<0, this means that negative correlation is brought about between both.

Finally, the calculation using the above-described expressions becomes such that, when calculating the correlation degree R(X,Y) between users X and Y, tables on which both of the individual evaluation values of user X and the individual evaluation values of user Y are posted are selected from the user evaluation value tables extracted in Step S2, the following calculations are carried out based on the "n" tables selected;

$$Sxx=\Sigma_{i=1 \text{ through } n}(Exi-Exa)^2$$

$$Syy=\Sigma_{i=1 \text{ through } n}(Eyi-Eya)^2$$

$$Sxy=\Sigma_{i=1 \text{ through } n}(Exi-Exa)(Eyi-Eya)$$

(where, Exi is an individual evaluation value of user X in the i-th table selected, Eyi is an individual evaluation value of user Y in the i-th table selected, Exa is the average value of the individual evaluation values of user X in the "n" tables selected, and Eya is the average value of the individual evaluation values of user Y in the "n" tables selected), and further the following calculation is carried out:

$$R(X,Y)=Sxy/(\sqrt{Sxx}\cdot\sqrt{Syy}),$$

the correlation degree R(X,Y) is thereby calculated.

In the above, an example of calculating the correlation degree R(X,Y) between the accessing user X and another user Y was described. However, individual evaluation values of further various users are actually recorded in the user evaluation value table extracted in Step S2. Therefore, in Step S3, processing to calculate the correlation degree between the accessing user X and other various users by the method similar thereto is carried out. As a result, correlation degree R(X, Y) between the accessing user X and user Y, correlation degree R(X, Z) between the accessing user X and user Z, correlation degree R(X,W) between the accessing user X and user W, etc., are brought about.

In Step S4 in the flowchart of FIG. 33, a processing is carried out in which a user having high correlation degree in regard to the accessing user X is recognized as a user having similar taste by comparing the correlation degrees between individual users thus calculated in Step 3 with each other. In detail, a user the correlation degree of which is a predetermined reference value or more may be recognized as a user having similar taste. For example, where 0.8 is set as the reference value, if R(X,Y)≧0.8, the user Y will be recognized as a user having similar taste with respect to the accessing user X.

However, with the method by which a user whose correlation degree is a predetermined reference value or more is recognized as a user having similar taste, there may be cases where no one is recognized as the user having similar taste and where a remarkable number of users are recognized as the user having similar taste. Therefore, if it is preferable to keep the total number of users to be recognized as a user having similar taste under a predetermined maximum number, it does not matter that only the maximum number of users selected in the descending order of correlation degrees calculated in Step S3 are recognized as users having similar taste. In this case, regardless of the actual values of correlation degree, a predetermined number of users will be recognized as users having similar taste in the large order of correlation degree.

In final step S5, an evaluation value γ used for correction is determined based on individual evaluation values of users having similar taste, which are recorded in the user evaluation value table for the provision information file which becomes an object to be corrected for degree of accordance. In detail, where, in Step S4, "K" users having similar taste in total are recognized with respect to the accessing user X, it is assumed that the individual evaluation value of the k-th user having similar taste recorded in the user evaluation value table for the provision information file which becomes an object to be corrected for degree of accordance is Ek, and the correlation degree with the k-th user having similar taste is Rk, and the evaluation value γ used for correction may be determined as shown in the lowermost expression in FIG. 35 by calculation of:

$$\gamma = \Sigma_{k=1 \text{ through } K}(Ek \times Rk)/\Sigma_{k=1 \text{ through } K}(Rk).$$

However, where the individual evaluation value of the k-th user having similar taste is not recorded in the user evaluation value table for the provision information file which becomes an object to be corrected for degree of accordance, Ek=0 and Rk=0 are adopted.

For example, where the provision information file which becomes an object to be corrected for degree of accordance is file F1 shown in FIG. 2, the evaluation value γ used for correction calculation will be determined by carrying out a calculation based on the above-described expression based on the individual evaluation value of "K" users having similar taste in total, who are recorded in the user evaluation value table T4 (DDD111111) (the user evaluation value table for file F1) shown in FIG. 31.

The numerator $\Sigma_{k=1 \text{ through } K}(Ek \times Rk)$ of the above expression is a value obtained by multiplying the individual evaluation values of respective users having similar taste by the correlation degree (a parameter showing weighting), and is equivalent to the total sum of the individual evaluation values of "K" users having similar taste in total considering the respective weights (correlation degrees). On the other hand, the denominator $\Sigma_{k=1 \text{ through } K}(Rk)$ is the total sum of correlation degrees of "K" users having similar taste in total and functions as a role to standardize the evaluation value γ. Also, where the individual evaluation value of the k-th user having similar taste is not recorded in the user evaluation value table, since calculation is performed with Ek=0 and Rk=0, such a user having similar taste will not contribute to the operation to obtain the evaluation value γ.

If the evaluation value γ is calculated by such a method, the evaluation value γ used in the case of correcting the degree of accordance M with respect to the provision information file (store information regarding the [Indian restaurant: XXX in Tokyo]) shown in FIG. 2 will be determined based on the evaluation values, which users having similar taste with respect to the accessing user X (that is, other users presumed to be similar in taste to the accessing user X in regard to the genre [eat]) give, in connection to the corresponding [Indian restaurant: XXX in Tokyo]. Therefore, in view of a list which is provided to the accessing user X, it becomes possible to create a list in which the headers of the retrieval result are arranged in further appropriate order.

Furthermore, where the individual evaluation value of the accessing user X himself is described in the user evaluation value table for the provision information file which becomes an object to be corrected for degree of accordance, the accessing user X himself is recognized as a user having similar taste, and the correction may be carried out using the individual evaluation value of the accessing user X himself. For example, in the case of the example described above, where it is assumed that the accessing user X himself has responded to a certain evaluation value to the [Indian restaurant: XXX in Tokyo] in the past, the individual evaluation value of the accessing user X is described in the user evaluation value table shown in FIG. 31. In this case, the accessing user X himself is treated as a user having similar taste, who has the maximum correlation degree (R(X,X)=1), and the evaluation value γ may be calculated by the calculation based on the above-described expression. Or, in this case, the individual evaluation value of the accessing user X himself may be determined to be the evaluation value γ as it is, without taking evaluation values of the other users into consideration.

<<<Section 7>>>
Embodiment Using Individual Interest Degree Table

In Section 6, a description was given of an embodiment which corrects the degree of accordance of retrieval results by using the interest degree table showing the degrees of interest of users, the advertising sponsor intention degree table showing the degrees of intention of advertising sponsors, and the user evaluation value table showing evaluation values of users and modifies the list posting order of retrieval results, which is presented to users. The embodiment described herein corrects the degree of accordance of the retrieval result further taking the [individual degree of interest of a user] into consideration in addition to the [degrees of interest of users], the [degree of intention of advertising sponsor], and the [evaluation values of users] and modifies the list posting order of the retrieval results presented to individual users.

Here, the [degree of interest] differs from the [individual degree of interest] in that although the [degree of interest] is a parameter showing general tendencies common to all the users, which is obtained by statistically processing the degrees of interest for each of individuals, the [individual degree of interest] is a parameter defined user by user, which shows how much each user is interested in individual genres.

Figure 36:
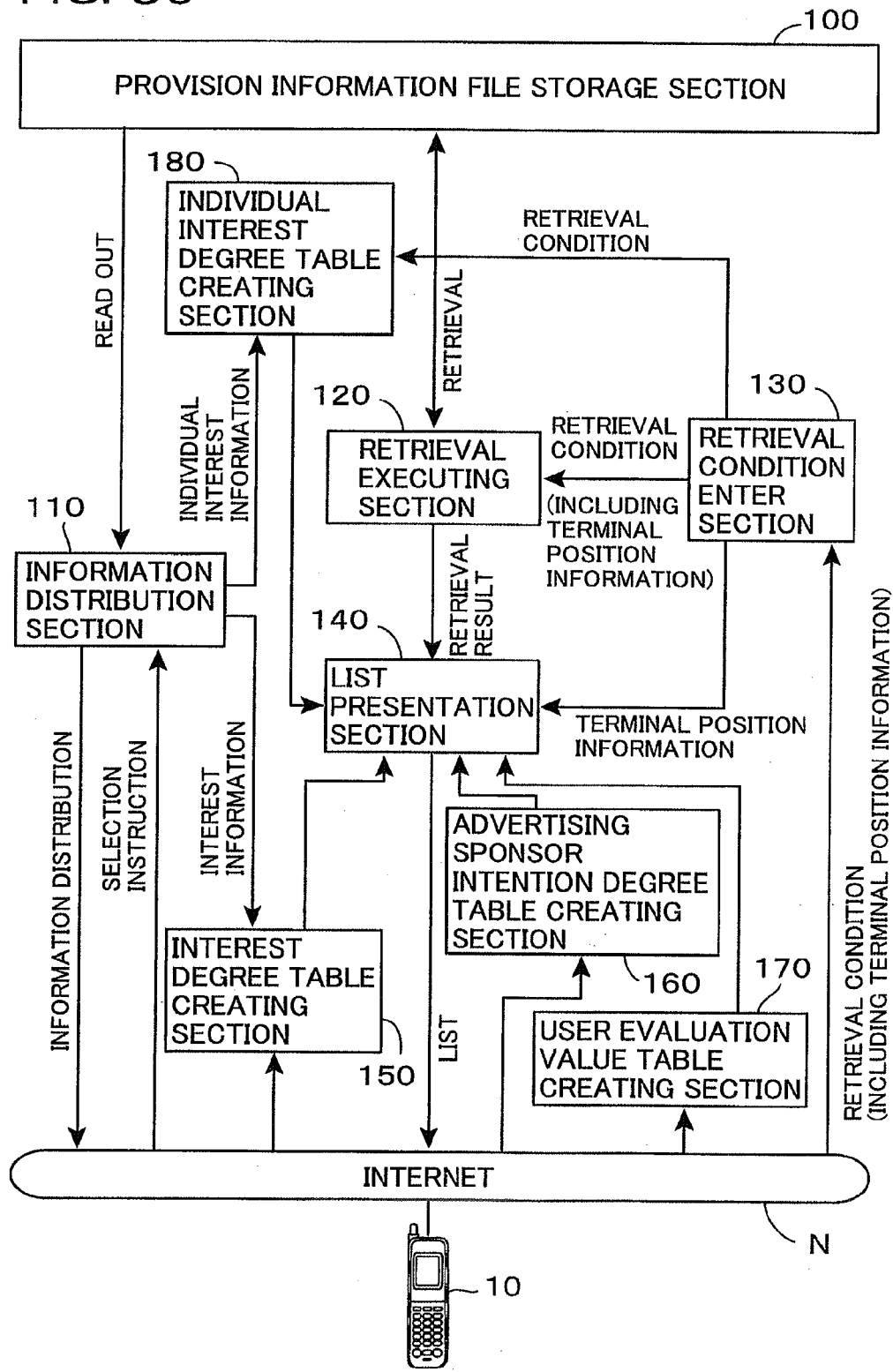
FIG. 36 is a block diagram showing a configuration of an information providing system according to an embodiment having an individual interest degree table used therein.

FIG. 36 is a block diagram of an embodiment having a function for processing with such individual degrees of interest taken into consideration. The present embodiment differs from the embodiment shown in FIG. 30 in that an individual interest degree table creating section 180 is newly added, and the list presentation section 140 carries out processing with individual degrees of interest of users taken into consideration. Also, in FIG. 36, although illustration of file configuration in the provision information file storage section 100 is omitted for convenience, the provision information file storage section 100 shown in FIG. 36 is identical to the provision information file storage section 100 shown in FIG. 30. The individual interest degree table creating section 180 shown in FIG. 36 creates individual interest degree tables T5 for each of the users based on various types of information collected in association with individual users, and executes processing to store the tables T5 in the table storage section 143 in the list presentation section 140.

FIG. 37 is a view showing a detailed example of the individual interest degree table T5 created by the individual interest degree table creating section 180 shown in FIG. 36. The configuration of the individual interest degree table T5 is slightly different from the interest degree tables T1, T2 and the advertising sponsor intention degree table T3, which have been described above. That is, the individual interest degree table T5 is not provided with any unit section, wherein there is no concept regarding the zonal area and time period. That is, although the [degree of interest] is a parameter which is separately and independently set for individual unit sections, as shown in the interest degree table of FIG. 9, the [individual degree of interest] according to the embodiment described here is a parameter set regardless of such unit sections.

The individual interest degree table T5 is a table showing individual degrees of interest of a specified user with respect to respective store genres, which is separately and independently prepared user by user. Although, in FIG. 37, a plurality of sheets of individual interest degree tables T5 are depicted so as to overlap each other, this means that one set of individual interest degree table T5 is prepared for a single user. The individual interest degree table T5 (U000X) shown at the top in FIG. 37 is an individual interest degree table prepared for a single user specified by user ID [U000X]. Therefore, where ten thousand users are registered in the system, ten thousand sets of individual interest degree tables T5 will be prepared.

Indeed, since it is not possible to grasp the individual degree of interest with respect to a user whose information is not sufficiently collected, the individual interest degree table for such a user becomes blank. In actual application, all of the individual interest degree tables T5 may be blank at the beginning of operation of the system. Since information showing the individual degrees of interest of respective users is gradually collected in line with continuous operation of the system, and individual interest degree tables T5 for all the users can be soon prepared.

In the case of the embodiment shown here, the individual degrees of interest for a specified user are parameters showing general tastes of the corresponding user with respect to respective store genres. For example, the individual interest degree table T5 (U000X) shown in FIG. 37 shows that, as general tastes of a user having user ID [U000X], the degree of interest in the genre [eat] is 50%, the degree of interest in the genre [buy] is 10%, the degree of interest in the genre [see] is 40%, and the degree of interest in the genre [play] is 0%.

The individual interest degree table creating section 180 creates such an individual interest degree table T5 for each of the users by collecting information regarding the respective users, and processes to store the table T5 in the table storage section 143 in the list presentation section 140. In the case of the embodiment shown here, the individual interest degree table creating section 180 has a function of creating the individual interest degree table T5 based on the individual interest information acquired from the information distribution section 110 and the retrieval condition acquired from the retrieval condition enter section 130.

For example, it is assumed that a user having user ID [U000X] retrieves using the retrieval condition of keyword [meal] or [lunch] in the retrieval condition enter section 130. In this case, the retrieval condition enter section 130 is caused to report the user ID [U000X] to the individual interest degree table creating section 180 along with the corresponding retrieval condition. By doing this, since the individual interest degree table creating section 180 can grasp the retrieval condition entered by the corresponding user whenever the user carries out retrieval, it is possible to recognize the individual degrees of interest of the corresponding user with respect to respective store genres by analyzing the retrieval condition. In summary, the individual interest degree table creating section 180 will create individual interest degree tables for a specified user who enters the corresponding retrieval condition, based on the retrieval condition acquired from the retrieval condition enter section 130.

In detail, by such a method in which a point is added to the genre [eat] where keywords such as [meal], [lunch], [dinner], [restaurant], etc., are included in the retrieval condition, and a point is added to the genre [buy] where keywords such as [shopping], [department store], [boutique], etc., are included in the retrieval condition, points are added in each of the genres, and an individual interest degree table T5 (U000X) for the corresponding user may be created based on the tabulated values.

Also, where a keyword like [ethnic] is included in the retrieval condition, it is difficult to specify the genre in which the user is interested, only by the keyword. However, even in such a case, if the genre of store information actually distributed to the corresponding user is acquired as the individual interest information, it becomes possible to recognize the individual degree of interest.

For example, it is assumed that a user having user ID[U000X] retrieves using the keyword [ethnic], and such a list as shown in FIG. 15 is resultantly presented. Here, where the user who has seen the list gives a selection instruction [Asian shop] to the information distribution section 110, the information distribution section 110 distributes store information for a store [Asian shop] to the corresponding user. At this time, the information distribution section 110 is caused to report the genre [buy] of store [Asian shop] and the user ID[U000X] to the individual interest degree table creating section 180 as the individual interest information. The individual interest degree table creating section 180 adds a point to the genre [buy] with respect to the corresponding user upon receiving the report. Thus, it is possible to create the individual interest degree table T5 (U000X) for the corresponding user based on the tabulated value of points for each of the genres.

In summary, the individual interest degree table creating section 180 collects the [store genres of store information distributed to a specified user] acquired from the information distribution section 110 as the individual interest information for the corresponding specified user and may create the individual interest degree table for the corresponding specified user based on the collected individual interest information.

Thus, the individual interest degree table T5 may be created based on the individual interest information acquired from the information distribution section 110, and may be created based on the retrieval conditions acquired from the retrieval condition enter section 130. In actual applications, it is preferable that the individual interest degree table T5 is created by combining both of the methods. As a matter of course, since the retrieval condition entered by respective users and individual interest information of the respective users are reported to the individual interest degree table creating section 180 from time to time while the system is in operation, it is preferable that the individual interest degree tables T5 are periodically updated.

In the above, a description was given of two methods as the method for creating individual interest degree tables T5 by the individual interest degree table creating section 180. The method for creating the individual interest degree table T5 is not limited to these two methods. Various types of methods may be adopted in addition thereto. For example, users are required to be registered as members when utilizing the present system, and are required to declare the individual degrees of interest for respective store genres. In detail, such an individual interest degree table as shown in FIG. 37 is presented on a web page (the portions of numerical values showing the individual degrees of interest are kept blank), and individual users are required to enter the numerical values of the individual degrees of interest.

Figure 38:
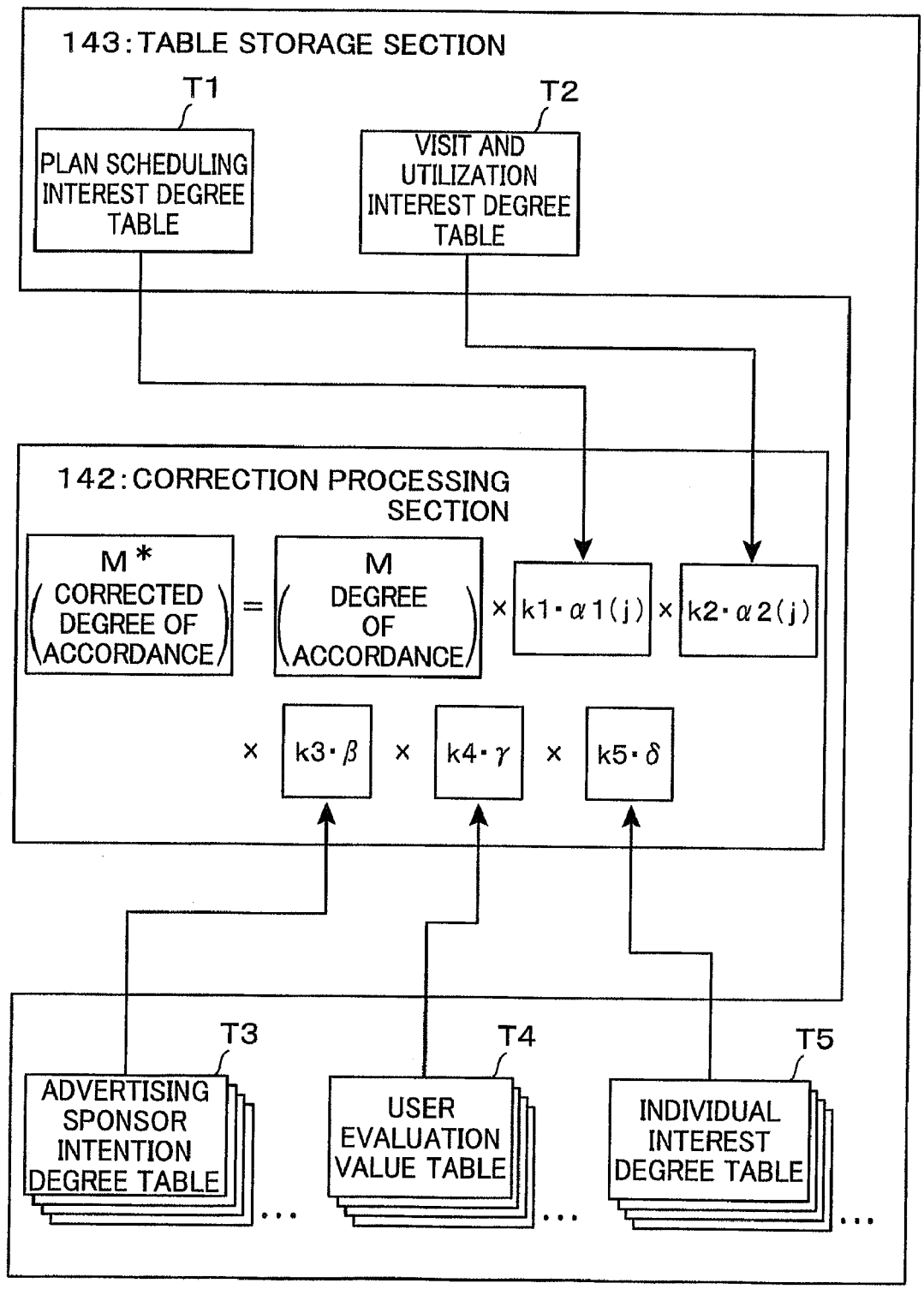
FIG. 38 is a block diagram showing one example of correction processing carried out in the list presentation section 140 shown in FIG. 36.

Finally, in the case of the embodiment shown in FIG. 36, a plurality of individual interest degree tables T5 corresponding to individual users are further stored in the table storage section 143 in the list presentation section 140 in addition to the plan scheduling interest degree table T1, the visit and utilization interest degree table T2, a plurality of advertising sponsor intention degree tables T3 corresponding to individual provision information files, and a plurality of user evaluation degree tables T4 corresponding to individual provision information files as shown in FIG. 38.

In the case of the embodiment described here, by referencing the description of the individual interest degree tables T5 for users (users to which the list presentation section 140 presents a list) who are making retrieval, the correction processing section 142 recognizes the individual degrees of interest of the corresponding user in regard to the genre of a store which becomes an object to be corrected for the degree of accordance M, and makes correction by using all of the degree of interest, the degrees of intention, the user evaluation values, and the individual degrees of interest, wherein the correction processing section 142 carries out processing to obtain a corrected degree of accordance. In detail, the correction processing section 142 has a function of setting a weighting parameter for each of the degrees of interest, the degree of intention, the user evaluation value, and the individual degree of interest, and acquires the corrected degrees of accordance by multiplying the respective degrees of accordance by a value obtained by multiplying the degree of interest by its weighting parameter, a value obtained by multiplying the degree of intention by its weighting parameter, a value obtained by multiplying the user evaluation value by its weighting parameter, and a value obtained by multiplying the individual degree of interest by its weighting parameter.

In detail, as shown in FIG. 38, calculation of $M^* = M \times (k1 \cdot \alpha1(0)) \times (k2 \cdot \alpha2(j)) \times (k3 \cdot \beta) \times (k4 \cdot \gamma) \times (k5 \cdot \delta)$ is carried out in regard to the degree of accordance M which becomes an object to be corrected, by using the weighting parameters k1, k2, k3, k4 and k5 set in advance, whereby processing to obtain the corrected degree of accordance $M^*$ is carried out. Here, δ is a specified individual degree of interest (the individual degree of interest for the genre of a store which becomes an object to be corrected for the degree of accordance M for a user who is making retrieval) obtained by referencing the individual interest degree table T5, and k5 is a parameter showing the weight.

Thus, if the presentation priority of the retrieval results on the list is changed by taking the description of the individual interest degree table T5 into consideration, the header of a store of the genre in which a user to which the list is presented is generally highly interested ranks high. For example, in the list presented to a user for which such an individual interest degree table T5 (U000X) as shown in FIG. 37 has been created, the headers of stores in the genre [eat] are inclined to be displayed with priority in high ranks, and the headers of stores in the genre [play] are scarcely displayed.

Thus, the [individual degree of interest] shows the individual degrees of interest for each of the genres in regard to individuals. In actual application, even if the classification of the genres is further finely divided, the individual degree of interest can be utilized as sufficiently valuable information. In the embodiments described above, as illustrated in FIG. 3, the genre of the stores is divided into [eat], [buy], [see], and [play] as four major classifications, and further divided into minor classifications such as [French food], [Italian food], [Chinese food], etc., as the lower-ranked concept thereof. However, since the [individual degree of interest] shows so-called tastes of individuals, actually the tastes can be classified in further finely various genres.

For example, a genre [escargot] is provided in a further lower-ranked concept of [French food], it is devised that a store which provides [escargot] and a store which does not provide the same are caused to belong to different genres even if the stores are the same French restaurants. By doing so, since the individual degree of interest for the genre [escargot] becomes high if a favorite food of a user is [escargot], correction can be carried out so that stores which provide [escargot] rank high on the list even in the same French restaurants. Similarly, a genre [detective story novel] is provided in a further lower-ranked concept of minor classification [book] in the major genre [buy], and stores which have a rich selection of [detective story novel] and stores which have only a limited selection thereof are caused to belong to different genres even in the same book stores, correction can be carried out so that the stores which have a rich selection of [detective story novel] rank high on the list when a user who has a high degree of interest in the genre [detective story novel] makes a retrieval.

Thus, since the [individual degree of interest] becomes remarkably private information on which individual taste and personality are remarkably reflected, if the genre classification is carried out so as to meet the above, the genre classification becomes effective. For example, such classifications become available, which depend on the atmosphere [well-lighted store] or [dark store], on the decorative manner [modern-decorated store] or [classic-decorated store], and on the interior color [red-based decorated store] or [blue-based decorated store], etc.

In the embodiments described above, a description was given under the premise that the [individual degree of interest] is a parameter set regardless of the [unit section] (section on a two-dimensional matrix shown by specified zonal areas and specified time periods). For example, although the individual interest degree table T5 (U000X) shown in FIG. 37 is an individual interest degree table prepared for a user specified by user ID[U000X], any sectioning regarding specified zonal areas and special time periods is not carried out therein. This is based on the basic idea [individual tastes of individual users are fixed without depending on places and time].

As a matter of course, individual tastes of a favorite food of a user being [escargot], a user preferring reading [detective story novel], etc., will not usually be influenced by place and time. However, an object of the present invention is to predict a behavior pattern of a user as accurately as possible and to select and provide information most suitable for the user at individual points in time. And, in view of achieving such an object, it is important to predict [what respective users want at the time] as accurately as possible.

For example, it is assumed that the place of work in which a certain user is engaged is closed on Tuesdays as a regular holiday. And, it is assumed that the practice of the user is to eat [Italian food] as a late lunch from around 3 p.m. on Tuesday which is his regular holiday. In such a case, [the individual degree of interest] of the corresponding specified user will be greatly different from the average [individual degree of interest] of the general public if the [unit section] is taken into consideration. For example, as far as Mondays are concerned, there may be almost no difference between the [individual degree of interest] of this particular user and the average [degree of interest] of the general public since this particular user is engaged in his work on Mondays. However, since the holidays of this particular user are Tuesdays although Sundays are holidays for the general public, the [individual degree of interest] of this particular user becomes greatly different from the average [degree of interest] of the general public with respect to Sundays and Tuesdays. As a matter of course, there would be a user having a characteristic which is to utilize a store of a specified genre only when the user visits a certain specified zonal area. In this case, with respect to the corresponding specified zonal area, the [individual degree of interest] of the specified user becomes greatly different from the average [degree of interest] of the general public.

Therefore, if the individual interest degree table creating section 180 collects the retrieval condition given from a specified user and individual interest information of the specified user while taking into consideration the unit sections shown by specified zonal areas and time periods (that is, the retrieval condition and the individual interest information may be collected by the method similar to the interest degree table creating method described in Section 4), it becomes possible to create [individual interest degree tables] having a two-dimensional matrix as in the [interest degree table] shown in FIG. 9 with respect to individual users, respectively.

Thus, where two-dimensional matrix type individual interest degree tables T5 in which unit sections are taken into consideration are prepared in the table storage section 143 shown in FIG. 38, the correction processing section 142 carries out a reading out process of the individual degree of interest δ from the corresponding unit section in the individual interest degree table T5 of the corresponding user. Accordingly, as in the example described above, where the specified user who has a custom of taking a late lunch (Italian food) from around 3 p.m. on Tuesdays accesses for retrieval at 3 p.m. on Tuesdays, correction processing is carried out so that [Italian restaurant] ranks higher on the list.

<<<Section 8>>>
Various Modified Embodiments

In the above, a description was given of the present invention based on some embodiments. The present invention is not limited to these embodiments and may be subjected to various modifications. Some modified embodiments will be shown below.

(1) Configuration of Information Providing System

In the embodiments described above, an information providing system according to the present invention is shown as an aggregate of respective functional components shown by respective blocks. However, actually, the system may be configured by incorporating exclusive programs in a computer system structured by using a database server, a web server, etc.

(2) Position Recognition Function of Mobile Terminal Device

In the embodiments described above, a description was given of a cellular phone having a GPS function as the mobile terminal device 10. However, the position recognition function of the mobile terminal device is not necessarily achieved by GPS. For example, it does not matter that such a method may be adopted which acquires the position coordinates of a mobile terminal device based on the intensity of electric waves from respective base stations by communicating with the base stations existing in the surroundings.

(3) Omission of Keyword

In the embodiments described above, retrieval was carried out based on the degree of accordance between a keyword code C1 and the keyword given as the retrieval condition in a state where the keyword code C1 is provided in the metadata in respective provision information files. However, the keyword code C1 in the metadata is not requisite for carrying out the present invention. For example, if retrieval is carried out based on the degree of accordance between individual character strings in the store information main data D1 and the keyword given as the retrieval condition, the retrieval can be carried out even if no keyword code C1 exists in the metadata. In this case, points are established in such a manner that three points are given if the keyword is coincident with character strings in the header and one point is given if the keyword is coincident with a character string in the text, and the total value of the points is defined as the degree of accordance.

(4) Combination of Degree of Interest+Degree of Intention+Evaluation Value+Individual Degree of Interest In the embodiment described in Section 7, as shown in FIG. 38, a description was given of the example in which correction is carried out with respect to the degree of accordance M by using all of the five tables which are the plan scheduling interest degree table T1, the visit and utilization interest degree table T2, the advertising sponsor intention degree table T3, the user evaluation value table T4 and the individual interest degree table T5. However, the combination of tables to be referred to when executing correction is arbitrary, and these five tables are not necessarily used. For example, if the degree of accordance is corrected by using only two tables which are the plan scheduling interest degree table T1 and the user evaluation value table T4, calculation of [M*=M×(k1·α1(j))×(k4·γ)] is carried out to obtain a corrected accordance value M*.

(5) Correction Calculation to Acquire the Sum of Respective Correction Terms

In the embodiments described above, an expression in which various correction terms (terms including parameters such as the degree of interest, degree of intention, evaluation value, individual degree of interest, etc., obtained from the respective tables) are multiplied by the degree of accordance M was used as the expression of correction calculation to obtain a corrected degree of accordance M*. For example, such processing is illustrated in FIG. 38, that the corrected degree of accordance M* is obtained by carrying out a calculation of M*=M×(k1·α1(j))×(k2·α2(j))×(k3·β)×(k4·γ)×(k5·δ). However, these correction terms are not necessarily multiplication terms with respect to the degree of accordance M. In some cases, it does not matter that the correction terms are addition terms.

Actually, in the embodiments described above, correction terms are created by multiplying the parameter values such as the degree of interest, degree of intention, evaluation degree, individual degree of interest, etc., by weighting parameters k1, k2, k3, k4, and k5, etc., and the corrected degree of accordance M* was obtained by multiplying these correction terms by the degree of accordance M. However, as long as the respective correction terms are multiplication terms with respect to the degree of accordance M, the respective weighting parameters k1, k2, k3, k4 and k5 are not substantially meaningful. For example, if the above expression M*=M×(k1·α1(j))×(k2·α2(j))×(k3·β)×(k4·γ)×(k5·δ) is summarized, M*=M×(k1·k2·k3·k4·k5)×(α1(j))×(α2(j))×(β)×(γ)×(δ) is brought about. Therefore, independently setting the weighting parameters k1, k2, k3, k4 and k5, respectively, is not substantially meaningful. In addition, if any one of α1, α2, β, γ, and δ is 0 (zero), the corrected degree of accordance M* becomes 0 (that is, M*=0).

However, it is possible to obtain a corrected degree of accordance M* by using a calculation expression in which respective correction terms are made into addition terms with respect to the degree of accordance M as in M*=M+(k1·α1(j))+(k2·α2(j))+(k3·β)+(k4·γ)+(k5·δ) instead of the above-described expression. In this case, the weighting parameters k1, k2, k3, k4 and k5 function as parameters to give weight to respective correction terms according to their lateral meaning. As a matter of course, it is possible to obtain a corrected degree of accordance M* by using a calculation expression in which multiplication terms and addition terms are mixed as in the expression M*=M×(k1·α1(j))×(k2·α2(j))+(k3·β)×(k5·δ)+(k4·γ). Further, it is possible to obtain a corrected degree of accordance M* by using a calculation expression including parentheses as in M*=M×((k1·α1(j))+(k2·α2(j))+(k3·β)+(k4·γ))×(k5·δ). In the final calculation expression, although the corrected degree of accordance M* does not necessarily become 0 even if any one of α1, α2, β and γ is 0, the corrected degree of accordance M* becomes 0 without fail in the case where δ is 0, wherein correction is carried out with the individual degree of interest δ emphasized. Thus, in actual applications, by changing combinations of the respective values of the weighting parameters k1, k2, k3, k4 and k5, parentheses to compose a calculation expression, multiplication terms and addition terms, it is possible to appropriately set which parameter is emphasized for correction.

INDUSTRIAL APPLICABILITY

An information providing system according to the present invention can be widely utilized in uses of providing advertisement information of various stores in the format of web pages to a mobile terminal device equipped with a function of recognizing the position of itself such as a cellular phone having GPS functions.

What is claimed is:

1. An information providing system implemented on a computer having a processor and a memory coupled to said processor for providing store information regarding specified stores to a terminal device, comprising:
   a provision information file storage section in which a number of provision information files having store information main data to compose store information becoming an object to be provided and metadata incidental to the store information main data are stored;
   a retrieval condition enter section for entering a retrieval condition including at least position information indicating a position for which store information is to be provided and optionally including time information, when an access is made from the terminal device;
   a retrieval executing section for retrieving provision information files a degree of accordance of which becomes a predetermined reference level or more with respect to said retrieval condition among a number of provision information files stored in the provision information file storage section;
   a list presentation section for transmitting a list of provision information files retrieved by the retrieval executing section to the terminal device; and
   an information distribution section for reading out store information main data in a provision information file pertaining to a selection instruction from the provision information file storage section when said selection instruction to select one in the list is given from the terminal device, and distributing said read out store information main data to the terminal device;
   wherein the metadata includes an information identification code to identify a provision information file, a store genre code showing a genre of a store pertaining to a provision information file, a store position code showing a position of a store pertaining to a provision information file;
   the retrieval executing section carries out retrieval with reference to at least a degree of accordance between position information included in the retrieval condition and a store position code included in the metadata and delivers, as a retrieval result, information in which an information identification code of retrieved provision information files and a degree of accordance showing a degree of accordance of said retrieved provision information files are associated with each other to the list presentation section;
   the list presentation section includes:
   a retrieval result storage section in which the retrieval result delivered from the retrieval executing section is stored;
   a table storage section for storing interest degree tables in which degrees of interest corresponding to respective store genres are set for each of unit sections set with individual time periods of individual zonal areas with a map divided into a plurality of zonal areas;
   a correction processing section for obtaining a corrected degree of accordance by recognizing a degree of interest for respective store genres set for a unit section corresponding to a present point in time or a point indicated by the time information optionally included in the retrieval condition with respect to a zonal area including a position shown by the position information with reference to the interest degree tables when the retrieval result is delivered from the retrieval executing section and by correcting a degree of accordance of respective provision information files stored in the retrieval result storage section using a degree of interest recognized with respect to a store genre pertaining to said respective provision information files;
   a correction result storage section for storing information which is obtained by making substitution so that the degree of accordance in the retrieval result stored in the retrieval result storage section is substituted by the corrected degree of accordance; and
   a list transmission section for sorting information identification codes in a large order of the corrected degree of accordance based on information stored in the correction result storage section, creating a list in which headers of store information are arranged in a sorted order, and transmitting the list to the terminal device,
   wherein at least some of said sections use said processor.

2. The information providing system according to claim 1, wherein
   the metadata includes a keyword code including a keyword associated with the store information main data and weighting points given to the corresponding keyword;
   the retrieval condition enter section enters a retrieval condition including terminal position information and a keyword designated by a user; and
   the retrieval executing section carries out retrieval with reference to both a position degree of accordance showing a degree of accordance between the terminal position information included in the retrieval condition and the store position code included in the metadata and a keyword degree of accordance showing a degree of accordance, which is calculated by taking into consideration the weighting point between the keyword included in the retrieval condition and the keyword included in the metadata, and delivers, as the retrieval result, the degree of accordance, in which both of the position degree of accordance and the keyword degree of accordance are taken into consideration.

3. The information providing system according to claim 1, wherein
   the list transmission section creates a list by arranging character strings of the headers in the store information main data in a sorted order.

4. The information providing system according to claim 1, wherein
   the interest degree tables in which time periods for each of the days of the week are made into separate unit sections are used.

5. The information providing system according to claim 1, wherein
   the correction processing section obtains a corrected degree of accordance by multiplying the degrees of interest by the degree of accordance stored in the retrieval result storage section or adding the degrees of interest thereto.

6. The information providing system according to claim 1, wherein
   the table storage section stores a plurality of interest degree tables, and
   the correction processing section recognizes a plurality of degrees of interest with reference to the plurality of interest degree tables and obtains a corrected degree of accordance by using the plurality of degrees of interest thus recognized.

7. The information providing system according to claim 6, wherein
the correction processing section has a function of setting weighting parameters for each of the recognized plurality of degrees of interest and obtains a corrected degree of accordance by multiplying a value, which is obtained by multiplying the respective degrees of interest by the weighting parameters, by the degree of accordance or adding the value to the degree of accordance.

8. The information providing system according to claim 1, further comprising
an interest degree table creating section for newly creating an interest degree table based on information obtained from mobile terminal devices held by a number of users, and updating the interest degree table in the table storage section.

9. The information providing system according to claim 8, wherein
the information distribution section includes a function of delivering, to the interest degree table creating section, interest information including terminal position information of a mobile terminal device, time information showing a point in time when a selection instruction is given, and store genre information showing a store genre of a provision information file pertaining to the selection instruction when the selection instruction is received from the mobile terminal device; and
the interest degree table creating section includes a frequency adding-up section for recording, based on the delivered interest information, a fact that a user is interested in a store genre shown by the store genre information for a unit section corresponding to the time information with respect to a zonal area including a position shown by the terminal position information and for adding-up frequencies at which the users are interested in respective store genres in regard to individual unit sections, and the interest degree table creating section creates a plan scheduling interest degree table based on an adding-up result.

10. The information providing system according to claim 8, wherein
the interest degree table creating section includes:
a neighboring store recognition section for recognizing passing points on a moving route of individual mobile terminal devices based on position changing information which shows positional changes of the individual mobile terminals devices for each of predetermined sampling times, calculating distances to respective stores for each of the passing points by referencing the store position code in the provision information files stored in the provision information file storage section, and recognizing a predetermined number "m" of stores in the ascending order of distance as neighboring stores in regard to the corresponding passing points;
a staying time recognition section for recognizing a time period from passing time of a first passing point to passing time of a final passing point for common neighboring stores common to continuous passing points on the moving route as a staying time;
a staying coefficient calculation section for obtaining a sum of distances to all the passing points from the first passing point to the final passing point for each of the common neighboring stores and calculating a value, which is obtained by dividing the staying time by the sum, as a staying coefficient; and
a staying coefficient adding-up section for adding-up the staying coefficient calculated in regard to an individual common neighboring store as a value showing a degree of interest for a store genre of the common neighboring store with respect to a unit section corresponding to the staying time recognized for the common neighboring store for the zonal area including a position of the common neighboring store;
wherein the interest degree table creating section creates a visit and utilization interest degree table based on an adding-up result by the staying coefficient adding-up section.

11. The information providing system according to claim 10, wherein,
when a staying time includes a time period extending over a plurality of unit sections, partial staying coefficients, which are obtained by a proportional division in accordance with an overlapping degree of the staying time and a partial time period of individual unit sections, are adding-up for each of the unit sections.

12. The information providing system according to claim 1, wherein
the table storage section stores an advertising sponsor intention degree table corresponding to each of the provision information files, unit sections corresponding to those in the interest degree tables are provided in said advertising sponsor intention degree table, and a degree of intention β of an advertising sponsor who provides respective store information is set in the individual unit sections; and
said information providing system further includes an advertising sponsor intention degree table creating section which creates an advertising sponsor intention degree table for each of the respective provision information files based on an enter operation from outside in accordance with an instruction of an advertising sponsor, and stores said advertising sponsor intention degree table in the table storage section;
wherein the correction processing section recognizes the degree of intention set in the corresponding unit sections by referencing the advertising sponsor intention degree table in regard to a provision information file which becomes an object to be corrected for the degree of accordance and obtains a corrected degree of accordance by correcting the degree of accordance by using both the degrees of interest and the degree of intention.

13. The information providing system according to claim 12, wherein
the advertising sponsor intention degree table creating section includes a function of setting a degree of intention of a specified unit section in regard to a specified provision information file based on an enter operation of an advertising sponsor and a function of recognizing a degree of interest set in association with a store genre of said specified provision information file with respect to said specified unit section with reference to the interest degree table in the table storage section and presenting the recognized degree of interest to the advertising sponsor.

14. The information providing system according to claim 13, wherein
the advertising sponsor intention degree table creating section presents an [enter column into which a desired degree of intention is entered in association with the individual unit sections] to an advertising sponsor, and displays respective enter columns in a display pattern responsive to the degrees of interest recognized with respect to the individual unit sections.

15. The information providing system according to claim 12, wherein the advertising sponsor intention degree table creating section includes a function of setting a degree of intention of individual unit sections in regard to a specified provision information file based on an enter operation of an advertising sponsor and a function of recognizing a degree of interest set in association with a store genre of said specified provision information file with respect to the respective unit sections with reference to the interest degree table in the table storage section and presenting the respective unit sections to the advertising sponsor in accordance with the priority order in which an intensity of the degree of interest is taken into consideration.

16. The information providing system according to claim 12, wherein the correction processing section has a function of setting weighting parameters in association with the degree of interest and the degree of intention, respectively, and obtains a corrected degree of accordance by multiplying a value, which is obtained by multiplying the degree of interest by its weighting parameter, and a value, which is obtained by multiplying the degree of intention by its weighting parameter, by the degree of accordance or adding the values to the degree of accordance, respectively.

17. The information providing system according to claim 1, wherein the table storage section stores a user evaluation degree table in association with each of the provision information files, and evaluation degrees of users for respective stores corresponding to respective provision information files are recorded in the user evaluation value table; and said information providing system further includes a user evaluation value table creating section which creates the user evaluation value table in regard to the respective provision information files by collecting evaluation values for respective stores from users, and stores the user evaluation value table in the table storage section;

wherein the correction processing section recognizes an evaluation value for a provision information file which becomes an object to be corrected for a degree of accordance by referencing a user evaluation value table with respect to said provision information file and obtains a corrected degree of accordance by correcting the degree of accordance by using both of the degree of interest and the evaluation value.

18. The provision information system according to claim 17, wherein the correction processing section has a function of setting weighting parameters in association with the degree of interest and the evaluation value, respectively, and obtains a corrected degree of accordance by multiplying a value, which is obtained by multiplying the degrees of interest by its weighting parameter, and a value, which is obtained by multiplying the evaluation value by its weighting parameter, by the degree of accordance or adding the values to the degree of accordance, respectively.

19. The information providing system according to claim 17, wherein the user evaluation value table creating section creates a user evaluation value table in which individual evaluation values of individual users are recorded;

the retrieval condition enter section enters information to identify an accessing user along with a retrieval condition; and the correction processing section recognizes a user inclined to have a similar evaluation to that of the accessing user as a user having similar taste, and carries out correction using an individual evaluation value of said user having similar taste.

20. The information providing system according to claim 19, wherein the correction processing section recognizes the accessing user himself/herself as a user having similar taste when an individual evaluation value of the accessing user himself/herself is described in the user evaluation value table with respect to a provision information file which becomes an object to be corrected for the degree of accordance, and carries out correction using the individual evaluation value of the accessing user himself/herself.

21. The information providing system according to claim 19, wherein the correction processing section includes:

a first unit, adapted to extract user evaluation value tables in regard to provision information files having the same store genre as a provision information file which becomes an object to be corrected for the degree of accordance;

a second unit, adapted to extract a table or tables, in which an individual evaluation value of an accessing user is described, from the user evaluation value tables extracted by the first unit;

a third unit, adapted to calculate a correlation degree between the accessing user and the other users by using the user evaluation value table or tables extracted by the second unit;

a fourth unit, adapted to recognize a user whose correlation degree calculated by the third unit is a predetermined reference value or more, or recognizing a predetermined number of users who are selected in descending order of the correlation degree calculated by the third unit, as a user or users having similar taste with respect to the accessing user; and a fifth unit, adapted to determine an evaluation value used for correction by using an individual evaluation value of the user or users having similar taste recorded in the user evaluation value table in regard to the provision information file which becomes an object to be corrected for the degree of accordance.

22. The information providing system according to claim 21, wherein, the third unit calculates a correlation degree R (X, Y) between user X and user Y, the third unit selects a table in which both of an individual evaluation value of user X and an individual evaluation value of user Y are described, from the user evaluation value tables extracted by the second unit and, based on "n" tables selected, performs a calculation of $$Sxx = \Sigma_{i=1 \text{ through } n}(Exi-Exa)^2$$

$$Syy = \Sigma_{i=1 \text{ through } n}(Eyi-Eya)^2$$

$$Sxy = \Sigma_{i=1 \text{ through } n}(Exi-Exa)(Eyi-Eya)$$

(where, Exi is an individual evaluation value of user X in an i-th table selected, Eyi is an individual evaluation value of user Y in an i-th table selected, Exa is an average value of the individual evaluation values of user X in the "n" tables selected, and Eya is an average value of the individual evaluation values of user Y in the "n" tables selected), and further performs a calculation of $$R(X,Y)=Sxy/(\sqrt{Sxx}\cdot\sqrt{Syy})$$

to obtain the correlation degree R(X,Y), so as to calculates correlation degrees between the accessing user and "K" users having similar taste, and the fifth unit obtains the evaluation value used for correction by executing a calculation of $$\gamma=\Sigma_{k=1\ through\ K}(Ek\times Rk)/\Sigma_{k=1\ through\ K}(Rk)$$

where an individual evaluation value of a k-th user having similar taste recorded in the user evaluation value table with respect to the provision information file which becomes an object to be corrected for the degree of accordance is Ek and a correlation degree with the k-th user having similar taste is Rk (where the individual evaluation value of the k-th user having similar taste is not recorded in the user evaluation value table for the provision information file which becomes an object to be corrected for degree of accordance, Ek=0 and Rk=0 are adopted).

23. The information providing system according to claim 1, wherein
the table storage section stores individual interest degree tables for respective users, and degrees of interest in regard to respective store genres of the respective users are set in the individual interest degree tables;
the information providing system further includes an individual interest degree table creating section which creates the individual interest degree tables for respective users by collecting information regarding the respective users and stores the tables in the table storage section; and
the correction processing section recognizes an individual degree of interest of a user, to whom the list is presented, in regard to a store genre of a provision information file, which becomes an object to be corrected for the degree of accordance, with reference to an individual interest degree table for said user, and obtains a corrected degree of accordance by correcting the degree of accordance using both of the degree of interest and the individual degree of interest.

24. The information providing system according to claim 23, wherein
the individual interest degree table creating section creates an individual interest degree table for a specified user, who has entered a retrieval condition, based on the retrieval condition acquired from the retrieval condition enter section.

25. The information providing system according to claim 23, wherein
the individual interest degree table creating section collects store genres of store information distributed to a specified user acquired from the information distribution section as individual interest information for the specified user, and creates an individual interest degree table in association with the specified user.

26. The information providing system according to claim 23, wherein
the individual interest degree table creating section creates individual interest degree tables, in which individual degrees of interest are set in regard to respective store genres, for each of the unit sections set in association with individual time periods of individual zonal areas, and
the correction processing section carries out correction by referencing an individual degree of interest, in association with the respective store genres set for a unit section corresponding to a present point in time in regard to a zonal area including a position shown by the terminal position information, of the individual interest degree table.

27. The information providing system according to claim 23, wherein
the correction processing section has a function of setting weighting parameters in association with the degrees of interest and the individual degree of interest, respectively, and obtains a corrected degree of accordance by multiplying a value, which is obtained by multiplying the degree of interest by its weighting parameter, and a value, which is obtained by multiplying the individual degree of interest by its weighting parameter, by the degree of accordance or adding the values to the degree of accordance, respectively.

28. A non-transitory computer-readable medium storing a program which, when executed by a computer, functions as an information providing system implemented on a computer having a processor and a memory coupled to said processor for providing store information regarding specified stores to a terminal device, comprising:

a provision information file storage section in which a number of provision information files having store information main data to compose store information becoming an object to be provided and metadata incidental to the store information main data are stored;

a retrieval condition enter section for entering a retrieval condition including at least position information indicating a position for which store information is to be provided and optionally including time information, when an access is made from the terminal device;

a retrieval executing section for retrieving provision information files a degree of accordance of which becomes a predetermined reference level or more with respect to said retrieval condition among a number of provision information files stored in the provision information file storage section;

a list presentation section for transmitting a list of provision information files retrieved by the retrieval executing section to the terminal device; and an information distribution section for reading out store information main data in a provision information file pertaining to a selection instruction from the provision information file storage section when said selection instruction to select one in the list is given from the terminal device, and distributing said read out store information main data to the terminal device;

wherein the metadata includes an information identification code to identify a provision information file, a store genre code showing a genre of a store pertaining to a provision information file, a store position code showing a position of a store pertaining to a provision information file;

the retrieval executing section carries out retrieval with reference to at least a degree of accordance between position information included in the retrieval condition and a store position code included in the metadata and delivers, as a retrieval result, information in which an information identification code of retrieved provision information files and a degree of accordance showing a degree of accordance of said retrieved provision information files are associated with each other to the list presentation section;

the list presentation section includes:

a retrieval result storage section in which the retrieval result delivered from the retrieval executing section is stored;

a table storage section for storing interest degree tables in which degrees of interest corresponding to respective store genres are set for each of unit sections set with individual time periods of individual zonal areas with a map divided into a plurality of zonal areas;

a correction processing section for obtaining a corrected degree of accordance by recognizing degree of interest for respective store genres set for a unit section corresponding to a present point in time or a point indicated by the time information optionally included in the retrieval condition with respect to a zonal area including a position shown by the position information with reference to the interest degree tables when the retrieval result is delivered from the retrieval executing section and by correcting a degree of accordance of respective provision information files stored in the retrieval result storage section using a degree of interest recognized with respect to a store genre pertaining to said respective provision information files;

a correction result storage section for storing information which is obtained by making substitution so that the degree of accordance in the retrieval result stored in the retrieval result storage section is substituted by the corrected degree of accordance; and a list transmission section for sorting information identification codes in a large order of the corrected degree of accordance based on information stored in the correction result storage section, creating a list in which headers of store information are arranged in a sorted order, and transmitting the list to the terminal device, wherein at least some of said sections use said processor.

* * * * *